United States Patent
London

(10) Patent No.: US 9,189,742 B2
(45) Date of Patent: Nov. 17, 2015

(54) ADAPTIVE VIRTUAL INTELLIGENT AGENT

(71) Applicant: Justin London, Chicago, IL (US)

(72) Inventor: Justin London, Chicago, IL (US)

(*) Notice: Subject to any disclaimer, the term of this patent is extended or adjusted under 35 U.S.C. 154(b) by 0 days.

(21) Appl. No.: 14/546,097

(22) Filed: Nov. 18, 2014

(65) Prior Publication Data
US 2015/0142704 A1    May 21, 2015

Related U.S. Application Data

(60) Provisional application No. 61/906,839, filed on Nov. 20, 2013, provisional application No. 62/026,023, filed on Jul. 17, 2014.

(51) Int. Cl.
*G06N 5/04* (2006.01)
*G06N 99/00* (2010.01)

(52) U.S. Cl.
CPC ............... *G06N 5/04* (2013.01); *G06N 99/005* (2013.01)

(58) Field of Classification Search
CPC .......................................... G10L 17/22–17/24
See application file for complete search history.

(56) References Cited

U.S. PATENT DOCUMENTS

| | | | |
|---|---|---|---|
| 5,493,608 A | 2/1996 | O'Sullivan |
| 6,311,159 B1 | 10/2001 | VanTichelen |
| 6,510,411 B1 | 1/2003 | Norton |
| 6,757,362 B1 | 6/2004 | Cooper |
| 7,415,100 B2 | 8/2008 | Cooper et al. |
| 7,440,895 B1 | 10/2008 | Miller et al. |
| 7,451,089 B1 | 11/2008 | Gupta et al. |
| 7,610,556 B2 | 10/2009 | Guo |
| 7,707,131 B2 | 4/2010 | Chickering |
| 7,869,998 B1 | 1/2011 | Di Fabbrizio |
| 7,917,361 B2 | 3/2011 | Li |
| 7,920,678 B2 | 4/2011 | Cooper et al. |
| 7,962,331 B2 | 6/2011 | Miller et al. |

(Continued)

FOREIGN PATENT DOCUMENTS

WO    2013042116 A1    3/2013

OTHER PUBLICATIONS

Huang, Xuedong et al.; "The SPHINX-II Speech Recognition System: An Overview"; 1992; School of Computer Science, Carnegie Mellon University; pp. 1-12.*

(Continued)

*Primary Examiner* — Stanley K Hill
(74) *Attorney, Agent, or Firm* — Dinsmore & Shohl LLP

(57) ABSTRACT

Embodiments of an adaptive virtual intelligent agent ("AVIA") service are disclosed. It may include the functions of a human administrative assistant for an enterprise including customer support, customer relationship management, and fielding incoming caller inquiries. It also has multi-modal applications for the home through interaction with AVIA implemented in the home. It may engage in free-form natural language dialogs. During a dialog, embodiments maintain the context and meaning of the ongoing dialog and provides information and services as needed by the domain of the application. Over time, the service automatically extends its knowledge of the domain (as represented in the Knowledge Tree Graphs) through interaction with external resources. Embodiments can intelligently understand and converse with users using free-form speech without pre-programmed deterministic sequences of questions and answers, can dynamically determine what it needs to know to converse meaningfully with users, and knows how to obtain information it needs.

21 Claims, 17 Drawing Sheets

(56) References Cited

U.S. PATENT DOCUMENTS

| | | | |
|---|---|---|---|
| 8,027,948 B2 | 9/2011 | Akkiraju | |
| 8,161,060 B2 | 4/2012 | Frayman et al. | |
| 8,326,637 B2 | 12/2012 | Baldwin | |
| 8,503,619 B2 | 8/2013 | Baker | |
| 8,504,439 B1 | 8/2013 | Ezzo | |
| 8,515,765 B2 | 8/2013 | Baldwin | |
| 8,620,964 B2 | 12/2013 | Tsatsou et al. | |
| 8,676,583 B2 | 3/2014 | Gupta | |
| 8,682,677 B2 | 3/2014 | William et al. | |
| 8,688,456 B2 | 4/2014 | Bangalore et al. | |
| 8,731,942 B2 | 5/2014 | Cheyer | |
| 8,738,380 B2 | 5/2014 | Baldwin | |
| 2003/0125944 A1* | 7/2003 | Wohlsen et al. | 704/246 |
| 2003/0220917 A1 | 11/2003 | Copperman et al. | |
| 2005/0033582 A1 | 2/2005 | Gadd | |
| 2012/0016661 A1 | 1/2012 | Pinkas | |
| 2012/0016678 A1 | 1/2012 | Gruber et al. | |
| 2013/0031476 A1 | 1/2013 | Coin | |
| 2013/0066921 A1 | 3/2013 | Mark et al. | |
| 2013/0110825 A1 | 5/2013 | Henry | |
| 2013/0152092 A1 | 6/2013 | Yadgar | |
| 2014/0222436 A1* | 8/2014 | Binder et al. | 704/275 |

OTHER PUBLICATIONS

Gish, Herbert et al.; "Text-Independent Speaker Identification"; 1994; IEEE Signal Processing Magazine; pp. 18-32.*

A.L. Gorin, G. Riccardi, J.H. Wright, How May I Help You?, Speech Communication 23 (1997) 113-127, NH Elsevier.

Candace L. Sidner, Building Spoken Language Collaborative Interface Agents, Mitsubishi Electric Research Laboratories, Dec. 2002, Cambridge, Massachusetts.

Ryuichiro Higashinaka, Mikio Nakano, Kiyoaki Aikawa, Corpus based Discourse Understanding on Spoken Dialog Systems. In Annual Meeting on Association for Computational Linguistics, 2003.

Marilyn A. Walker, An Application of Reinforcement Learning to Dialogue Strategy Selection in a Spoken Dialogue System for Email, Journal of Artificial Intelligence Research 12 (2000) 387-416, AT&T Shannon Laboratory, 180 Park Ave., Bldg 103, Room E103, Florham Park, NJ 07932, 387-416.

Dilek Hakkani-Tur, Asli Celikyilmaz, Larry Heck, Gokhan Tur, and Geoff Zweig, Probabilistic Enrichment of Knowledge Graph Entities for Relation Detection in Conversational Understanding. Paper presented at the Interspeech, Sep. 2014.

Blaise Thomson, Steve Young, Bayesian Update of Dialogue State: A POMDP Framework for Spoken Dialogue Systems. Computer Speech and Language, 2009.

Berenike Loos, On2L: a framework for incremental ontology learning in spoken dialog systems. Paper presented at the COLING ACL '06 Student Workshop, Sydney, Australia, Jul. 20, 2006.

Eveline M. Helsper, Linda C. Van Der Gaag, Building Bayesian Networks through Ontologies. In European Conference on Artificial Intelligence, 2002.

Neville Mehta, Rakesh Gupta, Antoine Raux, Deepak Ramachandran, Stefan Krawczyk, Probabilistic Ontology Trees for Belief Tracking in Dialog Systems, SIGDIAL 2010.

Sofilia. http://www.bizjournals.com/prnewswire/press_releases/2014/09/16/MN13450.

Tim Paek and Eric Horvitz, Conversation as Action Under Uncertainty, Proceedings of the Sixteenth Annual Conference on Uncertainty in Artificial Intelligence, 2000, pp. 455-464.

K.A. Papineni, S. Roukos, R.T. Ward, "Free-flow Dialogue Management Using Forms," 6.sup.th European Conference on Speech Communication and Technology: EUROSPEECH '99, Sep. 5-9, 1999, pp. 1411-1414, Budapest, Hungary.

Kyungduk Kim, Cheongjae Lee, Sangkeun Jung and Gary Geunbae Lee, "A Frame-Based Probabilistic Framework for Spoken Dialog Management Using Dialog Examples," Proceedings of the 9th SlGdial Workshop on Discourse and Dialogue, pp. 120-127, Columbus, Jun. 2008.

G.E. Van Zanten, "Adaptive Mixed-Initiative Dialogue Management," IEEE Workshop on Interactive Voice Technology for Telecommunications Applications, 1998.

Eric Horvitz, Michael Shwe, In Pursuit of Effective Handsfree Decision Support: Coupling Bayesian Inference, Speech Understanding, and User Models, 1995.

Masahiro Araki. "OWL-based Frame Descriptions for Spoken Dialog Systems," International Workshop on Semantic Web Foundations and Application Technologies, 2003.

Kyoung-Min Kim, Jin-Hyuk Hong, Sung-Bae Cho, "A Semantic Bayesian Network Approach to Retrieving Information with Intelligent Conversational Agents," Information Processing and Management, 2006, pp. 225-236, vol. 43.

Daphne Koller, Nir Friedman, "Probabilistic Graphical Models: Principles and Techniques," 2009, pp. 345-375, 391-448, 562-576 and 1083-1124, MIT Press, Cambridge, Massachusetts, USA.

Noh, H. et al., "Ontology-based Inference for Information-Seeking in Natural Language Dialog Systems," IEEE International Conference on Industrial Informatics, 2008, pp. 1469-1474, Daejeon, Korea.

Steve Young, "Probabilistic Methods in Spoken Dialogue Systems," Philosophical Transactions of the Royal Society (Series A), (2000). pp. 1389-1402.

Cheongjae Lee, Sangkeun Jung, Kyungduk Kim, Donghyeon Lee, and Gary Geunbae Lee, "Recent Approaches to Dialog Management for Spoken Dialog Systems" Journal of Computing Science and Engineering, vol. 4, No. 1, Mar. 2010.

Junlan Feng, D. Hakkani-Tur, G. Di Fabbrizio, M. Gilbert, M. Beutnagel, Webtalk: Towards Automatically Building Spoken Dialog Systems Through Miningwebsites, Paper presented at the Acoustics, Speech and Signal Processing, 2006. ICASSP 2006 Proceedings.

Pierre Lison, Structured Probabilistic Modelling for Dialogue Management, Department of Informatics, Faculty of Mathematics and Natural Sciences, University of Olso, Norway, Oct. 30, 2013.

Avi Pfeffer, Daphne Koller, Brian Milch, Ken T. Takusagawa, "SPOOK: A System for Probabilistic Object-oriented Knowledge Representation," Proceedings of the Fifteenth Annual Conference on Uncertainty in Artificial Intelligence (UAI), 1999, pp. 541-550, Stockholm, Sweden.

Fernando Fernandez, Javier Ferreiros, Valentin Sama, Juan Manuel Montero, Ruben San Segundo, Javier Macias-Guarasa, Rafael Garcia, "Speech Interface for controlling an Hi-fi Audio System Based on a Bayesian Belief Networks Approach for Dialog Modeling" in Eurospeech, Lisboa (Portugal), 2005, pp. 3421-3424.

International Search Report & Written Opinion relating to PCT/US2014/066513 filed Nov. 20, 2014; Mail Date: Apr. 15, 2015.

* cited by examiner

ADAPTIVE VIRTUAL INTELLIGENT AGENT

CROSS-REFERENCE TO RELATED APPLICATIONS

This application claims the benefit of U.S. Provisional Application No. 61/906,839, filed on Nov. 20, 2013 and entitled "Virtual Intelligent Administrator," and U.S. Provisional Application No. 62/026,023, filed on Jul. 17, 2014 and entitled "Virtual Intelligent Administrator."

COPYRIGHT NOTICE. A portion of this disclosure, including Appendices, is subject to copyright protection. Limited permission is granted to facsimile reproduction of the patent document or patent disclosure as it appears in the U.S. Patent and Trademark Office (PTO) patent file or records, but the copyright owner reserves all other copyright rights whatsoever.

TECHNICAL FIELD

The present disclosure generally relates to adaptive virtual intelligent agents that may be used in interactive spoken dialog systems.

BACKGROUND

Simple enterprise assistants are known. One known example is an "auto-attendant" that answers the phone for an enterprise, but then simply redirects the call to a human or takes a voice message. Such an auto-attendant cannot engage in a conversation with callers. More intelligent enterprise assistants exists that can engage in free-form conversation with existing users for some customer service purposes, but may need to be downloaded and installed on a user's mobile device before use, thereby greatly limiting applicability.

Several so-called "personal assistant" applications assist users with general tasks such as setting reminders, finding weather information, or navigation. However, such personal assistant applications are generally limited to use on mobile phones and are generally limited to voice commands and simple queries. Such personal assistant applications cannot engage in ongoing free-from conversations and maintain context over time.

A need exists for an adaptive virtual intelligent agent that can engage in free-form conversation and interactive dialog with users utilizing any type of communication device to access for any type of enterprise or business.

SUMMARY

An aspect comprises a conversational system comprising at least one server coupled to a telephone system wherein the server further comprises a context-and-meaning engine and a reasoning-and-inference engine. The context-and-meaning engine may be designed to configure a specific knowledge-tree graph instantiation. The knowledge-tree graph instantiation may be derived from a knowledge-tree graph template using at least one input received from a speech recognition engine in a caller session or a type of entity associated with a call session. The context-and-meaning engine may be configured to define a type of relationship existing between the at least one input and one or more nodes in a specific knowledge-tree graph instantiation. The context-and-meaning engine is configured to facilitate and transform caller inquiries and queries into structured meaning. The reasoning-and-inference engine is configured to trigger a method in the specific knowledge-tree graph instantiation in response to the at least one input.

Embodiments may further comprise at least one data repository chosen from the group consisting of a customer-relationship-management (CRM) data repository, a business-specific data repository, and a remotely connected third-party data repository. The CRM data repository stores a set of user preferences and a set of user data. The business-specific data repository includes one or more business-knowledge-items chosen from the group consisting of an employee directory, a product list, an inventory list, a pricing list, and a company's profile further comprising an hours of operation list and a locations list. The context-and-meaning engine is further configured to instantiate the specific knowledge-tree graph instantiation by querying the at least one data repository.

In embodiments disclosed herein, a knowledge-tree graph template may be chosen from the group consisting of a goods template, a services template or a combined template. The goods template further includes a store template. The services template further includes a restaurant template, a medical template, a legal template, and an office template. The combined template further includes a hybrid of the goods template and the services template. The store template includes a set of states for an inquiry and a method to check an item from an inventory stored in the business-specific data repository. The restaurant template includes a set of states for an order placement and a method to order a menu item from a menu stored in the business-specific data repository. The medical template includes a set of states about a patient and a method to schedule an appointment with a medical provider and/or a medical procedure. The legal template includes a set of states about a client and a method to determine the type of legal services required using the reasoning-and-inference engine and a second method to prompt the client for information regarding the type of legal services required. The office template includes a set of states about a caller and a method to schedule an appointment in an electronic appointment book. The service template includes a set of states about service offerings offered by the business stored in the business-specific data repository.

Embodiments may further comprise an adaptive learning engine wherein, if a relationship between the at least one input and the knowledge-tree graph template cannot be determined by the context-and-meaning engine, the context-and-meaning engine is further configured to process the at least one input using a remotely connected third party data repository to determine at least one synonym for the at least one input and send the at least one synonym to the context-and-meaning engine to determine if the relationship between the at least one input and the knowledge-tree graph template can be established. The adaptive-learning-engine may be configured to update lexicons and add the at least one input to a list of acceptable responses associated with a specific node in the knowledge-tree graph template.

In embodiments disclosed herein, the reasoning-and-inference engine may be further configured to determine whether any additional information is required to complete the specific knowledge-tree graph instantiation and, if so, the method iteratively generates a series of prompts to request each piece of missing information from a caller.

In embodiments disclosed herein, a conversational system further comprises one or more feature components chosen from the group consisting of a foreign language engine (FLE): a speech-to-text (STT) engine; a communication engine; and a voice analysis engine. The FLE may be configured to receive the at least one input; determine a language associated with the at least one input; and translate each response by the conversational system to the language before sending it back to the caller. The STT may be configured to produce a written transcript of the caller session and send the written transcript to the caller. The communication engine may be configured to send one or more computer machine outputs chosen from the group consisting of confirmations, alerts, uniform resource locator (URL) links, menus, advertisements, and promotions to the caller and update a CRM data repository associated with the caller with each message sent to the caller. The voice analysis engine may be configured to receive an original input to the conversational system; match a caller's voice to a voice data repository; retrieve a previously created specific knowledge-tree graph instantiation associated with the caller's voice from a CRM data repository.

In embodiments disclosed herein, the reasoning-and-inference engine may be further configured to automatically trigger a method associated with a state stored in the previously created specific knowledge-tree graph instantiation. The conversational system may be an interactive voice response system.

In embodiments disclosed herein, the context-and-meaning engine may be further configured to assign a weight to a relationship between the at least one input and each node to which it is related and wherein a higher weight is assigned to the at least one input if it has either previously occurred or has a high confidence match for contextual relevance to the node with which it is associated.

In embodiments disclosed herein, the conversational system may be further configured to analyze a plurality of specific knowledge-tree graph instantiations to determine if any of the at least one input are more common than others. If a first input, from the at least one input, is more common, it may determine if the conversational system responded appropriately. The adaptive learning engine may be configured to, if the conversational system responded appropriately, increase the weight of the relationship between the at least one input and its node. If the conversational system did not respond appropriately, it may decrease the weight of the relationship between the at least one input and its node.

In another aspect, a conversational system comprising a server is coupled to a telephone system. A speech processing system further comprises a speech biometric engine configured with a speaker identification routine; a language identification routine, and an audio recording mechanism. A reasoning-and-inference engine further comprising one or more agents may be chosen from the group consisting of an artificial intelligence engine, Bayesian inference engine and a decision-making engine and may have an adaptive learning engine further comprising a deep neural network learning engine. It may also have a plurality of data repositories including a data repository of phrase constructs; a customer-relationship management (CRM) data repository; and a business knowledge data repository. The speech biometric engine may identify a caller in a call session. If the caller is recognized, the reasoning-and-inference engine may select a knowledge-tree graph instantiation associated with the caller from the CRM data repository. The reasoning-and-inference engine selects a prompt from the data repository of phrase constructs which has the highest likelihood, using the agent, of being relevant to the call session based on a set of states in the caller's knowledge-tree graph instantiation. If the caller is not recognized, the reasoning-and-inference engine may select a knowledge-tree graph template from the business knowledge data repository associated with a type of business called in the call session. The reasoning-and-inference engine may select a prompt, from the data repository of phrase constructs, which has the highest likelihood according to the agent, of being relevant to the call session based on a set of states in a plurality of knowledge tree graph instantiations stored in the CRM data repository.

Embodiments disclosed herein may further include a natural language processing (NLP) engine; a foreign language translation engine; and a context-and-meaning engine (CME). The NLP engine may be configured to receive and recognize an input. The language identification engine may be configured to determine a language to be associated with the recognized input. If the CME determines that the recognized input is not associated with a default language associated with the conversational system, the conversational system may be configured to process any input through the foreign language translation engine to translate the input into the first language; and process any output through the foreign language translation engine to translate the output into a second language before sending the translated output to the caller.

In embodiments disclosed herein, the reasoning-and-inference engine may be further configured to determine if the recognized input is a data item or a command. If the caller was not recognized, the CME may be further configured to instantiate a knowledge-tree graph instantiation based on the knowledge-tree graph template. If the recognized input is a first data item, the CME may be further configured to fill in the first data item in the knowledge-tree graph instantiation. If the recognized input is a first command, the CME may be further configured to execute a method, stored in the knowledge-tree graph instantiation, associated with the first command. The reasoning-and-inference engine may be further configured to determine if the method associated with the first command has a predetermined, sufficient number of data items filled in on the knowledge-tree graph instantiation to execute the method. If the method can be executed, the conversational system executes the method. If the method cannot be executed, the reasoning-and-inference engine selects and delivers a prompt from the data repository of phrase constructs to elicit one or more missing data items prior to execution of the method.

In embodiments disclosed herein the CME may be further configured to perform historical context analysis to calculate if other callers are calling with regard to a specific reason by analyzing a plurality of knowledge-tree graph instantiations in the CRM data repository, across a plurality of callers, for a defined period of time. If a predetermined threshold is reached, it may increase a weight, associated with a node corresponding to that specific reason, in the knowledge-tree graph instantiation.

An aspect of a methodology disclosed herein which interactively responds to voice may comprise receiving a voice-based input; and sending the voice-based input to a speech biometric engine to identify a speaker associated with the voice-based input. If the speaker is recognized, selecting a knowledge-tree graph instantiation associated with the speaker from a customer-relationship management data repository. If the speaker is not recognized, selecting a knowledge-tree graph template from a business knowledge data repository associated with a type of activity and creating a knowledge-tree graph instantiation which is associated with the speaker. A methodology may further include prompting the speaker with a phrase construct with the highest likelihood of being relevant to the activity based on an analysis of one or more contexts chosen from the group consisting of the knowledge-tree graph instantiation associated with the speaker, and a plurality of knowledge-tree graph instantiations stored in the customer-relationship management data repository associated with the activity.

Embodiments disclosed herein further comprise, if the knowledge-tree graph instantiation is new, pre-populating a set of nodes in the knowledge-tree graph instantiation with, at least, a first data item from a business-specific data repository and generating a prompt to elicit a second data item to fill in an empty node in the knowledge-tree graph instantiation.

In embodiments disclosed herein, if the speaker responds to the prompting step, determining if a first response is a data item or a command or query. If the first response is a data item, it may fill in a node in the knowledge-tree graph instantiation corresponding to the data item and generate a second prompt to elicit an additional data item to fill in an empty node in the knowledge-tree graph instantiation. If the first response is a command, it may check the knowledge-tree graph instantiation to determine if a predetermined number of nodes have been filled in to execute the command and if an insufficient number of nodes have been filled in, iteratively generate additional prompts to complete the knowledge-tree graph instantiation sufficiently to execute the command. If the first response is a query, it may check whether the query is related in context to a dialog; if the query is context-related, checking the knowledge-tree graph instantiation to determine if a node contains a responsive answer; and if there is no responsive answer, generating a responsive prompt.

Embodiments disclosed herein include, if any of the responses received are not recognized, processing an unrecognized response with an ontological semantics engine to determine a context and meaning for the unrecognized response; adding a node to the knowledge-tree graph instantiation and populating the node with the unrecognized response; and evaluating a plurality of knowledge-tree graph instantiations and increasing a weight associated with an added node each time it appears in a knowledge-tree graph instantiation. If a given added node reaches a predetermined threshold, adding a prompt to a data repository of phrase constructs.

Embodiments disclosed herein include processing an unrecognized response by performing one or more actions including: accessing a third party data repository to determine at least one property chosen from the group consisting of a category and/or a synonym for the unrecognized response and attempting to find a node associated with the at least one synonym; searching one or more knowledge-tree graph instantiations stored in a customer-relationship management data repository for a relationship between the unrecognized response and a concept; and adding a new node if no pre-existing node is found.

Embodiments disclosed herein include, if any of the responses received are recognized, filling in at least one node in the knowledge-tree graph instantiation corresponding to the response; defining a relationship between the response and at least one matched node in the knowledge-tree graph instantiation; and calculating and assigning a weight for each relationship, indicative of the strength of the relationship between the response and each of the matched nodes.

Embodiments disclosed herein include receiving an input and associating a set of inputs to one or more nodes in the knowledge-tree graph instantiation. The knowledge-tree graph instantiation may be based upon a home automation template comprising a set of states relating to a set of appliances and a set of commands for controlling the set of appliances. If the set of commands comprises temperature adjustment commands, lighting commands, security commands, and appliance commands; iteratively performing the receiving and associating steps until either a command input is received or the knowledge-tree graph instantiation is complete. Upon completion of the activity, it may increase a weight associated with a setting for an appliance according to a command received for the activity.

DETAILED DESCRIPTION

Glossary

Figure 1:
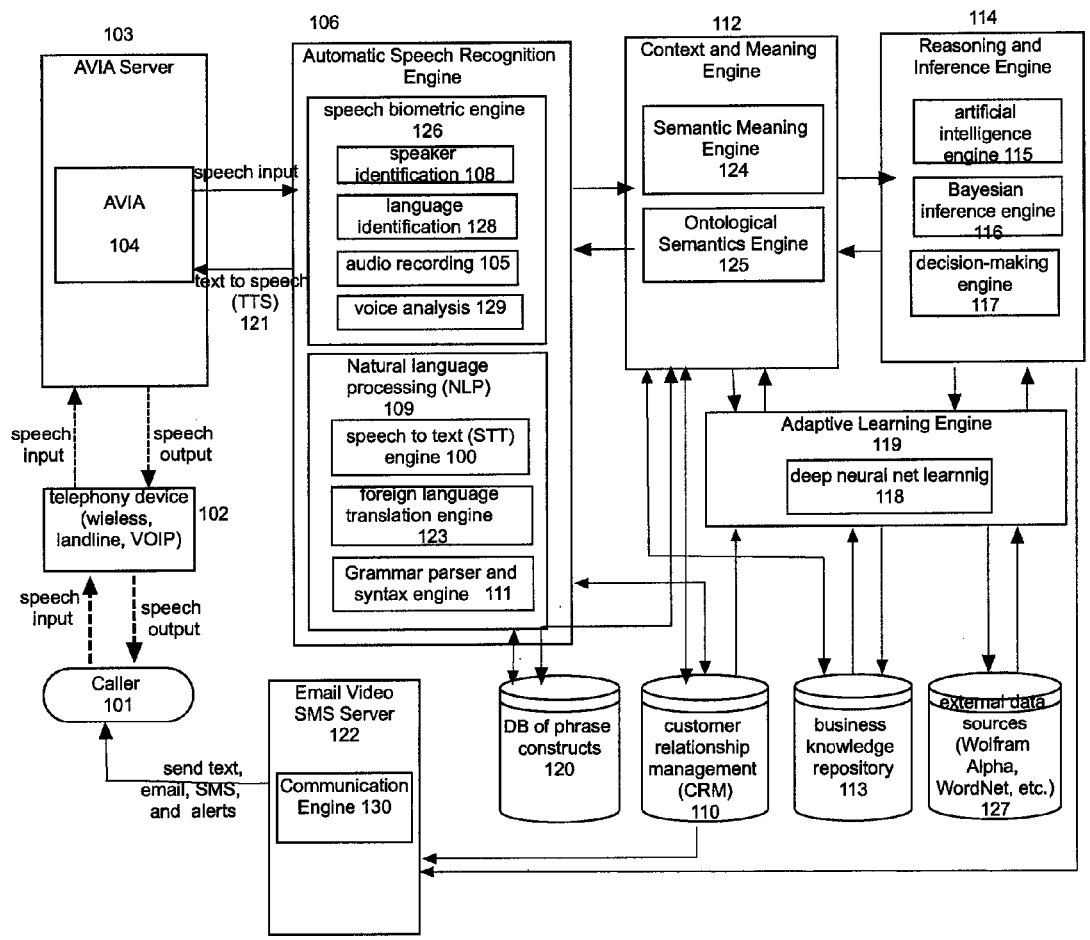
FIG. 1 schematically depicts a system architecture diagram, according to one or more embodiments shown and described herein.

"Adaptive" means that an intelligent agent makes decisions on the basis of rules and that they are ready to modify the rules on the basis of new information that becomes available.

"Auto attendant" allows callers to be automatically transferred to an extension without the intervention of an operator or receptionist. Many auto attendant's also offer a simple menu system ("for sales, press 1, for service, press 2," etc.).

An auto attendant may also allow a caller to reach a live operator by dialing a number, usually "0". Typically the auto attendant is included in a business's phone system such as a PBX. In contrast to IVR which perform a range of functions, an auto attendant serves a specific purpose (e.g. route calls)

"Automatically" means to the use of a machine to conduct a particular action.

"Bayesian Inference" is a statistical method of inference in which Bayes' rule is used to update the probability estimate for a hypothesis as additional information is acquired.

"Bayesian network", or belief network, is a probabilistic graphical model that represents a set of random variables in a domain (e.g. uncertain knowledge) and their conditional dependencies (relationships). Bayesian networks provide a means of parsimoniously expressing or encoding a joint probability distribution over many interrelated hypotheses.

"Calculate" means to automatically determine or ascertain a result using Computer Machine Input.

"Computational Knowledge Engine" is an engine designed to provide computer machine output which describes an item of knowledge as a category, synonym, property, and/or modifying adjective thereof (e.g., WordNet, Wolfram Alpha, OpenCyc).

"Computer Machine" is a machine (e.g., desktop, laptop, tablet, smart phone, television, server, as well as other current or future computer machine instantiations) comprising a computer processor that has been specially configured with a set of computer executable instructions.

"Computer Machine Input" includes input received by a Computer Machine.

"Data Repository" is any digitally-stored, tangible computer-readable data storage mechanism/memory of which arrays, stacks, and databases are possible embodiments.

"Deep Learning" or "Deep Neural Net Learning" is a set of algorithms in computer machine learning that attempt to model high-level abstractions in data by using model architectures composed of multiple non-linear transformations. Deep learning is part of a broader family of machine learning methods involving artificial neural networks based on learning representations of data and may be applied to automatic speech recognition, natural language processing, and adaptive learning.

"Engine" is a set of computer instructions that encapsulates a specific block of functionality.

"Grammar" is a system of rules which allow for the combination of lexicons (or words) into meaningful sentences.

"Intelligent Agent" is an autonomous computer program that carries out tasks and directs its activity towards achieving goals. Intelligent agents may learn or use knowledge from the environment, humans, and/or data sources to achieve their goals. Intelligent "agents" may also be referred to as "assistants" and/or "administrators."

"Knowledge Tree Graphs (KTGs)," also known as "knowledge-trees" for short, are dynamic flexible data structures stored in a tangible computer-readable memory that maintains relationships between concepts and information so as to enable context and meaning to be maintained over time, by means of instantiated (filled) and uninstantiated (unfilled) slots. They may represent ontological concepts in the domain, actions and information about the caller during the caller session, and meanings and contexts of a session or a plurality of sessions. KTGs may exhibit properties of both trees and graph data structures enabling traversal of nodes in one branch in a tree to those in another branch.

"Interactive Voice Response (IVR)" is s a technology that allows a computer to interact with humans through the use of voice and DTMF tones input via keypad. In telecommunications, IVR allows customers to interact with a company's host system via a telephone keypad or by speech recognition, after which they can service their own inquiries by following the IVR dialogue. IVR systems can respond with prerecorded or dynamically generated audio to further direct users on how to proceed. IVR applications can be used to control almost any function where the interface can be broken down into a series of simple interactions.

"KTG templates," also known as "KTG ontology charts," are data structures stored in tangible computer-readable memory and databases that serve as an underlying ontological framework and model for KTGs for different business types. KTG templates organize concepts, actions/events, and properties in a structured hierarchy for general and specific ontology domains of the business that may need to be instantiated as KTG nodes during a dialog and may facilitate the transition from one dialog state to another. KTG templates may be applied to other uses including, but not limited to, home automation and multi-modal device interaction.

"Lexicon" is a catalogue of a language's words (its wordstock or vocabulary). Items in the lexicon are called lexemes or word forms.

"Machine Learning" is a sub-field of artificial intelligence that deals with the construction and study of systems that can learn from data, rather than follow only explicitly programmed instructions. Machine learning algorithms may include, but are not limited to, Bayesian networks, decision tree learning, inductive logic programming, association rule learning, clustering, artificial neural networks, and representation learning.

"Machine Translation" is a sub-field of computational linguistics that investigates the use of software to translate text or speech from one natural language to another. Machine translation may perform simple substitution of words in one natural language for words in another, but that alone usually does not produce a good translation of a text because recognition of whole phrases and their closest counterparts in the target language is needed. In NLP, ontologies can be used as a source of knowledge for machine translation systems. With access to a large knowledge base, such systems can be enabled to resolve many (especially lexical) ambiguities (and therefore disambiguation) on their own.

"Multimodal (human-computer) interaction" refers to users interfacing with automated systems using multiple modes of communication (e.g. the modes involving the five senses) in both input and output. Multimodal systems allow users to interact through multiple input modalities, such as speech, handwriting, hand gesture and gaze, and to receive information by the system through multiple output modalities, such as speech synthesis, smart graphics and others modalities.

"Natural language processing" is the processing and capability of machines to understand human language which may encompass computer analysis and generation of natural language text.

"Natural language understanding" is technology that enables computers to derive meaning from human or natural language input, and others involve natural language generation.

"Ontological semantics" is a semantic theory for natural language processing (NLP) that focuses on the process of generating and manipulating text meaning by using a constructed world model (or ontology) as the central resource for extracting and representing meaning of natural language texts, reasoning about knowledge derived from texts as well as generating natural language texts based on representations of their meaning.

"Ontology" is an organization and/or formal representation of a knowledge domain that is usually hierarchical and contains all the relevant entities and concepts (such as objects, processes, etc.) and some relations between them. An ontology is also a formal specification of a shared conceptualization. A domain ontology (or domain-specific ontology) represents concepts which belong to part of the world.

A "Program" is a set of computer-executable instructions encoded in a tangible computer memory for execution on a computer machine.

"Spoken Language Identification" is a term used to describe the process by which a machine recognizes what language is being spoken.

"Speaker Recognition," or "speaker identification," is a term used to describe the technology for identifying who is speaking.

"Speech Recognition," also known as automatic speech recognition (ASR), is an engine comprising a speech-to-text (STT) component that translates spoken words into text.

"Telephone System" is a mobile/wireless, landline/wired, VOIP system, or any other device that may be used for communication.

"VoiceXML, (VXML)" is a digital document standard for specifying interactive media and voice dialogs between humans and computers. VoiceXML has tags that instruct the voice browser to provide speech synthesis, automatic speech recognition, dialog management, and audio playback. The VoiceXML document format is based on Extensible Markup Language (XML).

"AVIA" refers to embodiments of an adaptive virtual intelligent agent.

—END OF GLOSSARY—

As will be understood from the detailed description herein, the embodiments described herein provide a number of beneficial functions, including but not limited to the following. The embodiments described herein may record and transcribe interactions. The embodiments described herein may send text messages and emails. The embodiments described herein may learn new concepts and dynamically expand a domain of knowledge. The embodiments described herein may dynamically reorder and change the dialog depending on the context. The embodiments described herein may learn a user's preferences. The embodiments described herein may utilize a general domain model (such as model of business with slots for data and information). The embodiments described herein may utilize speaker biometrics to identify users from their speech without the user having make a claim of identify (e.g., entering a username and password) or to say a passphrase. The embodiments described herein may automatically recognize foreign language and converse in the caller's spoken language. The embodiments described herein may handle and process out of domain utterances without human intervention. Furthermore, the embodiments described herein may be device independent, and may include configurations for home and multi-modal devices. The embodiments described herein can use knowledge tree graphs, a new flexible and dynamic data structure. The embodiments described herein may not pre-determine dialog and slots, but may instead, use Bayesian inference and probabilistic rules to dynamically update KTGs in real-time. The embodiments described herein may intelligently determine what information is needed and how to obtain that information. Embodiments described herein may use artificial intelligence and deep neural net learning for adaptive learning. The embodiments described herein may make intelligent inferences and reasoned decisions. The embodiments described herein may dynamically adapt dialog responses and actions to a user's utterances.

Embodiments disclosed herein may be accessed from any phone without any installation process and consequently can help new customers as well as existing customers. Embodiments engage in much more than auto-dialing and may be easily adapted to multiple different enterprises by building a model of the business in the form of a Knowledge Tree Graph (KTG).

Embodiments maintain the context of a conversation in a structured way. Embodiments maintain a memory of past conversations to apply to future interactions with a given user.

Embodiments may be configured to perform administrative and customer relationship functions (e.g., answering calls and queries 24/7, communicating with customers, preparing memos, sending text messages/emails, and booking appointments) through the use of artificial intelligence, ontological semantics, natural language processing (NLP), speaker recognition, automatic speech recognition, dialog management, and computer-telephony integration.

Embodiments enhance customer and caller experience and anticipating callers' needs through intelligent free-form natural language conversation and processing. It is scalable to handle multiple simultaneous callers, speak multiple languages, and can "remember" the details of interactions with many more callers than could be remembered by an actual human agent.

An embodiment may handle all the incoming calls for an organization and create more consistent branding for the organization that would be impossible with human assistants.

Embodiments may not be limited to simply handling many calls at the same time but may coordinate information across callers. For example, if many callers start calling about the same topic, embodiments can dynamically restructure the dialog so that a popular topic is addressed first with new callers. As an example, if there is a general Internet or cable TV outage due to bad weather, many customers will be calling their cable providers about the outage. Based on overall call statistics, both individual and global, an embodiment may be able to intelligently anticipate that callers are calling about a service outage and therefore it is able to ask users if they are calling about internet or cable outage issues. Conventional IVRs may be unable to dynamically reconfigure their dialogs based on information from external sources.

Embodiments may be built on an underlying intelligent dialog system that includes the ability to maintain the conversational context within a call, the context of previous interactions with a specific caller, and the context of all previous calls from multiple callers. Context may be maintained through the use of Knowledge Tree Graphs, a declarative representation of structured domain knowledge. Embodiments may also be configured to automatically learn new concepts.

Embodiments may be easily customized for particular applications. Conventional IVR customization is a complex and expensive process, and requires professional expertise both in design (the Voice User Interface (VUI) designer) as well as in implementation (VXML developer). Embodiments disclosed herein may be customized to respond to callers based on the type of business using it (e.g., law firms, physician's offices, restaurants, retail stores, etc.), and will conduct an appropriate dialog based on the type of business.

Figure 2:
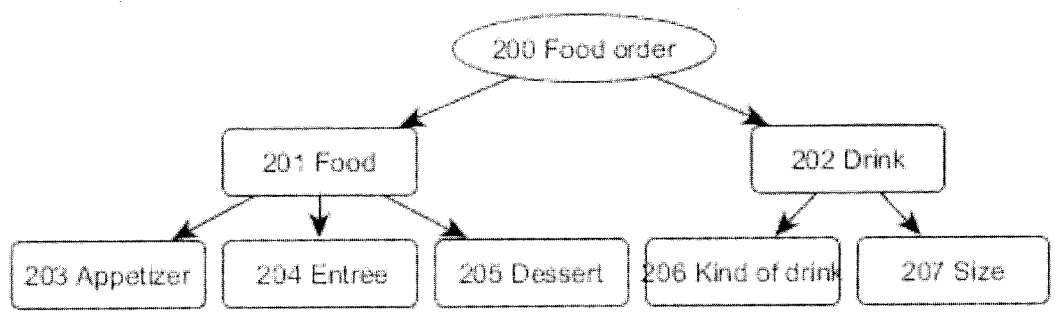
FIG. 2 schematically depicts a food order ontology for a restaurant interaction, according to one or more embodiments shown and described herein.

Embodiments may conduct a dialog based on a declarative ontology represented through structured KTG templates that represent many generic facts about different types of businesses. For example, templates may cover firms that provide goods, firms that provide services, and firms that provide both goods and services. Properties associated with each (e.g., inventory and distributors for goods) may be included in a basic business domain ontology and may be inherited by the KTGs for individual businesses. Referring to FIGS. 2-4, a developer can simply supply the appropriate data field values for the particular business in question (e.g., a restaurant). Many variations on this ontology for other types of organizations could be designed by persons with ordinary skill in the art without departing from the spirit and scope of the embodiments described herein.

In embodiments disclosed herein, both general and business-specific domain ontologies can serve as underlying foundational information sources for the business KTG template which in turn serve as an underlying organizational structure or framework for the KTG. The KTG concept and action nodes may be mapped to corresponding concept and action nodes in underlying KTG templates. KTG templates can be customized and tailored to specific needs and requirements of the business. Moreover, KTG templates contain information/properties to be instantiated during the dialog and thereby help serve as a guide for AVIA to transition from one dialog state to another.

Conventional IVRs are programmed to force the user to respond in a pre-determined sequence of steps. In contrast, embodiments disclosed herein select system actions on the basis of Bayesian inference and artificial intelligence and are able to conduct the dialog in a flexible and dynamic fashion by taking into account information from the current dialog context as well as external information such as information from a database, Web Service, or other external sources. The Bayesian inference engine may utilize a Bayesian network.

Embodiments may assist with planning, organizing, coordinating, facilitating and scheduling events and meetings for an organization, answering the telephone, providing information to callers by means of voice, text message or videos, scheduling appointments, and taking orders for goods and services. Embodiments may carry on a more flexible and natural dialog than traditional customer self-service applications because it is based on an underlying dialog manager that may be driven by rich domain models such as Knowledge Tree Graphs. Knowledge Tree Graphs integrate frame semantics and ontologies to represent properties of both the application and the user. Starting with KTG's specific to an application, a dialog manager may conduct a dialog by attempting to fill in, or instantiate, missing information in the Knowledge Tree Graph for the application; for example, the specific items in a food order. Filling in missing information can be achieved by obtaining it directly from the user, as in current systems, but unlike current systems, missing information in the AVIA can also be inferred from other information available to the system, using Bayesian inference in an embodiment. As the dialog progresses, the partially instantiated KTG serves as a record of the interaction, which enables dialogs to be paused and resumed at the correct state, at a later time such as if the call is interrupted.

Embodiments can determine what it knows at any given time and can determine what else it needs to know to respond intelligently to the user. In contrast, conventional usage of VoiceXML represents a dialog plan as a structured XML form with fields for the various pieces of information that it will try to elicit from the user. For example, consider an application for making reservations at a restaurant. To be complete, a reservation has to have a time, date, and number of people that will be eating. If the user says "I want to make a reservation for three for Tuesday", the VoiceXML browser would be able to fill in the slots for the day and number of people, but it would need to ask the user for the time. Because those slots are unfilled after the user's first utterance, the VoiceXML browser would then prompt the user with a question like "what time would you like to come?", in order to finish getting the information that it needs to complete the reservation. The order of visiting the unfilled fields in a VoiceXML application is strictly fixed by the order of the underlying VoiceXML document, and cannot be varied in any way, unlike the AVIA dialog manager, which can fill the unfilled slots in an ongoing dialog in a dynamic and flexible order. The order may depend, for example, on previous interactions with the caller and other contextual information such as the time of day or season of the year. Consequently, AVIA can intelligently interact with callers who may change the context of the dialog, provide information in a non-sequential order, and speak out of turn (before AVIA has completed its response) just as humans naturally communicate with one another.

An embodiment's dialog manager represents context and meaning in the form of a (fully or partially) instantiated Knowledge Tree Graph (KTG) or set of KTG's. Both the context of previous interactions with the caller as well as the context of the current interaction can be represented. For example, a caller could be a steady customer of a pizza restaurant. When the customer calls in a new order, after the application identifies the customer, it retrieves the stored KTG's from that customer's earlier interactions with the pizza shop, and calculates that this particular customer orders pepperoni 75% of the time, mushrooms 10% of the time, and something else 15% of the time. Based on this history, the application would ask the customer, "Do you want pepperoni today?" When the customer says "yes", the dialog manager will fill in one "topping" slot in the current KTG with the value "pepperoni". The next time this caller calls, the probability that they want to order pepperoni will be even higher because the KTG is storing the history of the interaction with each customer. After the application collects the "topping" value, the current, ongoing, KTG will only be partially instantiated because the slots for "drink type" and "pickup or delivery" have not yet been filled. The dialog manager uses this mechanism to guide the dialog with the customer to capture the rest of the customer's order. In addition, if the call is interrupted for some reason, the dialog manager can use the stored, partially instantiated KTG to resume the conversation at the point of the interruption.

Furthermore, VoiceXML can only execute simple procedures when a slot is filled (through scripting commands contained in the "filled" element), but embodiments including a dialog manager can access a wide variety of other information as it processes the caller's input. It can refer to rich ontological information as well as databases, Web Services, and other external data sources. For example, in a restaurant application, after the user states the time for which he or she would like to make the reservation, if that time was unavailable, the AVIA dialog manager could examine its database for open times and suggest an alternate time. This kind of capability would be prohibitively complex to implement in VoiceXML scripting commands, and a complex implementation using scripting commands for one VoiceXML application would not generalize to other applications.

Embodiments can also dynamically learn new information about its domain from callers. If many callers ask a question that hasn't been anticipated in the existing KTG model of the domain, the dialog manager can learn to proactively ask the question without being asked. For example, if callers frequently ask for public transportation directions to the office of a business, the dialog manager will learn to include a question like "Do you need public transportation directions?" in its subsequent dialogs. VoiceXML in contrast is limited to asking the specific questions that it was programmed to ask.

Context and meaning may be maintained in the form of partially or fully instantiated Knowledge Tree Graphs, which include a declarative method for representing (1) the structure of a task to be performed jointly by a human and a computer through a human-computer dialog, and (2) an execution model for conducting a dialog between the human and the computer that will result in the accomplishment of that task.

KTG's may interface with an reasoning and inference engine, a context manager, and (third-party) databases. KTGs may represent concepts and actions, which may have components known as slots or fields. For example, a food order in a restaurant would have slots for "food" and "drink". Slots may have subslots which may again have their own slots. For example, in a KTG representing a food order, the "drink" slot could have subslots for "size" and "type of drink".

Concepts may be defined in ontologies such as WordNet or OpenCYC.

In addition to the frames representing various tasks which can be accomplished with the dialog system, and the ontologies which contain the concepts which the system knows about, the KTG framework is supplemented by a rich and extensible variety of additional knowledge sources. These additional knowledge sources include but are not limited to databases, business rules, information available via API's to Web Services, information available from the Semantic Web, as well as other knowledge sources which may be defined in the future.

KTG's may be used for task-oriented dialog management in the dialog manager by using an execution model that traverses the KTG, filling in slots based on a combination of information obtained from diverse sources. Knowledge sources, for example, include the caller's utterances, system inferences, database lookup, and as well as other external knowledge sources. Although frame traversal is a dialog management technique known in the art, KTG-based dialog applications are unique in the flexibility of the types of system inferences that are supported. Current systems support very simplistic, hard-coded, system inferences. For example, a dialog system that collects employee information for benefits could ask if the employee has dependent children. If the answer is "no", then the system can be programmed to skip questions about children's ages. KTG's can make much more sophisticated inferences through their use of Bayesian probability. These inferences are based on exploiting the external knowledge sources listed above. For example, in a restaurant ordering application, the probability that any random customer will order pizza may be 50%, but knowing that the particular customer who is calling orders pizza much more often than the typical customer allows the dialog manager to infer that this particular customer is very likely to be ordering pizza. As a result of this inference, the dialog manager can ask the caller "Would you like to order a pizza" instead of "What would you like to order?" thus saving both the caller's and the system's time. The dialog system continually collects statistics on the requests that it receives, both from all callers as well as statistics specific to each individual caller, thus providing a basis for the probabilities underlying these inferences. In this way the system becomes increasingly intelligent over time, unlike other approaches. The embodiment uses individual and global statistics to modify, adapt, and pre-populate KTGs.

Embodiments may support system-initiative in addition to mixed-initiative dialog by both asking questions of the user as well as by allowing the user to volunteer information. For example, if the system is taking a reservation, the user might say "I'd like a reservation for four tonight", thereby filling in slots for the number of people and the date" (a mixed-initiative utterance) but the system would respond with a question "What time would you like to come?" (a system-initiative utterance) because the user has not supplied all the required information. Similarly, the user might need to bring up additional information, such as the need for a seat in a wheelchair-accessible location, that the system might not have explicitly asked for. The AVIA can accept this kind of volunteered information as well, by dynamically adding concepts and slots to the KTG in real time, unlike other approaches to dialog management.

Embodiments may perform actions such as:

(i) transcribe conversations, prepare memos/summaries of call details/actions taken and to be taken, store them, and email them to designated employees/agents of the business for review;

(ii) proactively send out marketing, advertising, and promotional materials, for example, if a caller has asked to be put on a newsletter or subscriber list;

(iii) schedule meetings through integration with a calendar system such as Microsoft Outlook or Google Calendar;

(iv) send scheduled confirmations for meetings or call-backs via SMS and email;

(v) for multi-modal applications in the home or business, the dialog manager can be applied, programmed, and synchronized to regulate temperature (heating and cooling), lighting (turning the brightness of a lights up or off), security (turning and setting alarms on and off), electronics, and automatically dialing 911 to report an emergency if a smoke detector goes off and the owner is not home; and (vi) send callers relevant URL links, video, and audio files via email and SMS during the conversation that are contextually relevant and related to information needed by the user, e.g. to make a decision or help the user provide information that the system needs from the caller.

For instance, if a user calls a restaurant for a carry-out and wants to know what dishes are served and their prices, embodiments can SMS them a URL webpage link containing the restaurant's menu items.

The system includes a telephony device which answers a telephone call from a caller and transmits the caller's speech to a server running the AVIA application. (Note that AVIA can handle multiple simultaneous callers from one or more telephone lines.) The caller's speech may be recorded by an audio recording system and processed by an automatic speech recognition (ASR) engine. The speech recognition engine includes a language identification engine, speaker identification engine, and natural language processing (NLP) engine. The speaker identification engine may identify callers who have called the system previously through the use of speech biometrics, a technique known in the art which identifies speakers by analyzing the unique properties of their voices. Other means of identifying individuals (such as face recognition or fingerprint recognition) can be used if available. When a new caller calls, the system stores the acoustic properties of the speaker's voice in a CRM or voiceprint database associating that voice with the caller's name and other identifying information. Afterwards, in subsequent calls, AVIA will attempt to match the voice with the voiceprints stored in the database to identify a repeat caller. This saves the caller from the inconvenience of having to identify himself/herself after the first call and improves the personalization of AVIA interactions. By identifying the user, the AVIA dialog manager systems are able to address the caller by name, retrieve any previous interactions with the user, avoid having to request information that it already knows about the user, and take up tasks that were initiated in a previous phone call.

Embodiments may adapt the overall system behavior to the history of the system's interactions with the user and may adapt its prompts to the specific user's level of experience with the system. Some embodiments may also adapt prompts to the tone and pitch of the caller's voice (e.g. caller that speaks fast or sound frustrated.)

Embodiments can automatically understand and speak to users in the user's foreign language, using language identification software. With language identification, the user does not have to identify what language they are speaking or press a button to identify their language as in current IVR systems. After identifying the language, embodiments may conduct the interaction in the language it hears.

Embodiments may make use of speech recognition technology such as systems to understand the caller's speech. While many IVR systems have the capability to interact with users using spoken language, conventional IVR's are limited in their ability to converse in multiple languages. Embodiments disclosed herein can speak and understand the most widely spoken languages, as determined by the state of the art in speech recognition. Recognizers for many different languages are available and may be integrated into embodiments disclosed herein as well as utilized in process flows for greater utility. For example the Nuance speech recognizer recognizes over 84 languages and dialects. Similarly, in order to speak in the user's preferred language, text-to-speech (TTS) technology for that specific language may be used. Many languages are currently available in TTS systems; for example, Read-Speaker offers voices in 38 languages. As speech recognition and text-to-speech technology become available for more languages, conversational capabilities may be extended to these new languages. Embodiments may store and remember the user's preferred language in CRM to use in future interactions with that user.

Conventional systems suffer from speech recognition results being incorrect or uncertain. For that reason, most spoken language understanding systems will report a "confidence" in their interpretation of a result, along with a set of possible alternative interpretations and their confidences. This means that any effective spoken dialog system must assume that there will need to be a means of correcting errors or clarifying uncertain recognition results. A standard IVR application will handle uncertainty in the form of low confidence results in one or more of the following ways:
(i) It can present the user with the one or two relatively high-scoring alternatives and ask the user which one was meant. This quickly becomes tedious to the user and leads to an unsatisfying user experience;
(ii) it can simply choose the alternative with the best confidence score, assume that it is correct, and proceed with the dialog. This leads to errors when the system makes the wrong choice, and leads to complex error-correction dialogs; and
(iii) It can use DTMF fallback, that is, the IVR application can ask the user to press a button to input their answer instead of speaking. For example, the IVR might instruct users to "press 1 to speak to a representative, press 2 to hear account information, and so on. This is tedious as the user will have to both speak and then fall back to pressing buttons when speech fails, essentially having to input their request twice.

Embodiments disclosed herein use Bayesian inference techniques, based on past experience with the current and other previous users, to make an intelligent choice among alternative interpretations of the user's speech. This avoids the need to interrogate the user and also reduces the chance of the kinds of mistakes which lead to clumsy clarification dialogs. Some theoretical work has been done in the area of probabilistic dialog management based on Bayesian inference, however, this work makes use of the same probabilities for every dialog, and does not adapt specifically to individual users. Bayesian inference may be used to adapt the parameters in an influence diagram model of a dialog, but this adaptation is used only to assist the system in choosing between an "explore" vs. "exploit" strategy for system behavior, rather than making multiple choices throughout the dialog. In addition, the model being adapted is an influence diagram rather than a structured graph such as a KTG.

The caller's speech may also be transcribed by the speech recognizer and archived along with the audio recording of the speech for post-analysis, statistics, and other archival functions.

Spoken language may be processed through an NLP engine that incorporates techniques known in the art as implemented in computational linguistics software, for example, the Stanford CoreNLP tools, ontological semantics software such as WordNet, or the statistically-based text-classification approaches. The ability to have a natural (human-like) conversation with a virtual agent to perform a task is preferable to using only a restrictive set of commands, which are difficult to remember and often confusing as they exist in current IVR systems.

The NLP engine may interface with grammar, parser, and syntax engines and a Context and Meaning engine. Textual representations of the grammar formats in the embodiment could include, but are not limited to, Java Speech Grammar Format (JSGF) and W3C derived standards like Speech Recognition Grammar Specification (SRGS) and Semantic Interpretation for Speech Recognition (SISR). SRGS is used to tell the speech recognizer what sentence patterns or grammars it should expect to hear. SISR is based on ECMAScript, and ECMAScript statements inside the SRGS tags build up an ECMAScript semantic result object to process. The text that is rendered by the text-to-speech (TTS) engine could be marked up (decorated) by a proprietary format or W3C standard such as Speech Synthesis Markup Language (SSML) and Pronunciation Lexicon Specification (PLS) to improve the accuracy of the pronunciation.

The semantics or meaning of the user's speech can be extracted by a Context and Meaning engine (CME) that may include a meaning generation engine and ontological semantics engine. The CME applies meaning and context to what is said by the caller so that embodiments of the system can respond intelligently. The CME may resolve word senses (homonym), a process that extracts concepts and infers the correct sense of a word from words that are pronounced the same and often share the same spelling but have different meanings as well as perform anaphora and ellipsis resolution. There are two kinds of homonyms, homophones and homographs. Words with the same pronunciation but different spellings (homophones) and different meanings will be resolved by the speech recognizer since it has to pick a spelling (e.g. "a [lion's] mane in [the state of] Maine" or "a [boat] sail on sale.") Consequently, only words with the same spelling and the same pronunciation (homographs), but different meanings, will need to be resolved by the CME (e.g. "I rose [past tense of rise] to see the rose [flower]" or "The [monetary] fine is not fine to me."). The CME may dynamically create Knowledge Tree Graphs (KTG). KTGs are dynamically created in real-time, based on KTG templates, taking into account the inputs from the various engines and are used to manage the spoken dialog with the user. That is, they determine what additional information AVIA needs to prompt the user for and/or what the next response should be, based on the caller's requests, depending on the current state of the dialog.

The CME may use a database of commonly used phrases and constructs to respond quickly to commonly and/or frequently used phrases, queries, and constructs to improve accuracy and processing speed. The CME may also interface with customer relationship management databases (CRM) that store user preferences (including the user's preferred language) user information, and information about previous calls by the same user (e.g. obtained from previous instantiated KTGs). A CME may also use a set of one or more business knowledge databases that include databases of employee directories, products/inventory, pricing, company, and business specific information and facts. Business knowledge databases can be customized to include specific knowledge that is unique to that business such as hours of operations, locations and website URL, represented in the form of KTG templates.

A CME may also make use of a Reasoning and Inference Engine comprising one or more of an artificial intelligence (AI) engine, a Bayesian statistics and inference engine, a decision-making engine, and deep neural network learning engine. A reasoning and inference engine may also makes use deep neural network learning through an adaptive learning engine to allow behavior adaptation to the user's preference over multiple calls.

An adaptive learning engine may also enable augmentation of a business knowledge repository over time by automatically seeking the meanings of unknown concepts referred to by the user using resources such as, but not limited to, WordNet, Wolfram Alpha, OpenCYC, the Semantic Web, or World Wide Web. Embodiments have the ability to expand its knowledge and use of words, terms, and phrases as well as the ability to increase the entire knowledge of the virtual administrator by being able to seamlessly add information from these third-party fact repositories. For example, a caller to a pizza restaurant might request a topping which is not known to the AVIA, such as "asparagus". An adaptive learning engine may consult its resources, learn that asparagus is a vegetable, and thus food, and add it to the business knowledge repository as a topping which is not offered by the restaurant, (but which could be offered in the future). In addition, an adaptive learning engine can learn new relationships between concepts in a similar fashion and may augment a database of phrases and constructs with new phrases and words as they are encountered in interactions with users. This enables the new phrases and constructs to be used in future calls.

An adaptive learning engine may also appropriately handle off-topic utterances. Callers often say things to automated systems which are not appropriate to the context or are otherwise irrelevant in some way (out-of-domain-utterances, OOD). Current IVR systems respond to these OOD utterances in several different ways, for example:
(i) the system will misunderstand the out-of-domain utterance and mistake it for an appropriate utterance, leading to confusion and decreasing the caller's confidence in the system; or
(ii) the system will simply fail to process the utterance, resulting in a "no-match" event where the user must be asked to repeat him or herself. Since the difficulty is not in understanding the literal words of the utterance, but the meaning, repetition is not helpful, and only serves to prolong an interchange that is doomed to be unsuccessful.

In contrast, embodiments of an AVIA dialog manager may distinguish between "in-domain" utterances and OOD utterances, and it can inform the caller that it is unable to process those requests in an intelligent way. Some current personal assistants can also respond to some OOD utterances (for example, "how tall are you?"), but they can only respond to those utterances that they have specifically been programmed to answer. Because the embodiments disclosed herein can maintain context (and meaning) over time, they know that an OOD utterance is out of context and respond intelligently to get the user back to "in-domain" utterances.

Embodiments of a reasoning and inference engine may determine what the response to the user should be, based on the slots remaining to be instantiated in the active KTG, as well as previous interactions with the user stored in the CRM database and business knowledge repository. This response may be spoken to the user via a text to speech system, in the user's preferred language, which is obtained from the CRM database. Current IVR's primarily employ pre-recorded audio files for the system's spoken output. Although pre-recorded audio files are natural-sounding, they are expensive to record, inflexible (because all of the system's outputs have to be anticipated in advance), and are difficult to modify if the human voice talent who did the original recordings is unavailable. Embodiments disclosed herein may use programs such as ReadSpeaker to select among a number of human-sounding voices offered by the speech synthesis vendor, such as a male or female voice, and to choose whether an accent is used by enterprises in countries like the United Kingdom or South Africa.

Responses can be in other forms such as text displayed on a screen, SMS messages, email, images, and videos, and serve for example as alerts, confirmations, or promotionals. These responses may be provided by means of an email/video/text server. Actions may also be performed through integration with external services and third-party application programming interfaces (APIs) which may reside on the local computer, the local area network (LAN), or the Internet, such as home control, interaction with the Web of Things, wearable devices, and robots.

Following each call, information from each user session may be updated into one or more CRM databases that contain caller profile information. This includes keeping track of previously stored dialogs, actions requested by the user and actions taken by embodiments of the system (which can be accessed in subsequent calls and conversations).

In addition, information across sessions with different users may be aggregated in the CRM database to provide statistics to the AVIA about properties of the overall call traffic, such as the frequency of calls on different topics or changes in the types of information requested. The AVIA uses this information to dynamically coordinate information across callers. For example, if many callers start calling about the same topic, the dialog may be dynamically restructured so that that topic is addressed first with new callers. This may be accomplished by storing the instantiated KTG's from every call and collecting statistics about the tasks performed and the values of the slots. Based on this context, suboptimal dialog structures may also be recognized and reconfigured in real time. As an example, if there is a general Internet or cable TV outage due to bad weather, many customers will be calling their cable providers about the outage. Based on overall call statistics, embodiments will then be able to intelligently anticipate that callers are calling about a service interruption and therefore it can modify its dialog to ask users if they are calling about Internet or cable issues at an early point in the dialog.

Current IVR systems have a limited ability to vary their prompts to users, resulting in a mechanical, machine-like user experience. They conduct a dialog by traversing a VoiceXML form or equivalent and filling each field in the order programmed by the developer.

Embodiments of an AVIA dialog manager use KTG templates based on an ontology of the domain and AVIA's inference engine to determine what information it needs to prompt the user for Like the VoiceXML, a programmer can input the fields needed to process information. Also like VoiceXML, databases may be accessed to determine if certain information exists so that it does not have to ask the user. However, unlike VoiceXML, KTG's nodes can be created dynamically and instantiated in real-time while VoiceXML's structure is entirely pre-defined. This introduces tremendous flexibility; unlike VoiceXML which does not have a separate domain model from the dialog script. Unlike VoiceXML, AVIA can dynamically access other relevant ontology domains during the dialog (e.g. for adaptive learning purposes or context changes), seamlessly incorporate and add such needed information into KTG nodes or into new KTG nodes, and determine the proper relationship of this information to other related KTG nodes. AVIA can store such information in a knowledge fact repository for future use.

Embodiments may use Bayesian inference to determine the likelihood that the user meant one thing as opposed to another, and traverse nodes (as a graph) associated with concept properties. Embodiments may also dynamically add new concepts and their properties in the relevant context and place in the KTG and provide edges (to navigate and traverse) and weights based on the importance of the associated relationships and meaning to other concepts and nodes. For instance, if a user called a retailer like Best Buy and asked about what type of laptop computers they have on sale and then during the ongoing dialog talked about games, embodiments of a dialog manager may dynamically create an edge (relationship) because it is possible the user might be interested in games (software) that would run on a laptop, depending on the context. Thus, during the conversation, concepts for computers, software, and games may be created (along with their associated pre-defined properties). In conventional systems, the domain model (Probabilistic Ontology Tree) is fixed and cannot be modified during the dialog. In contrast, the embodiments herein allow multiple domains to be accessed and for domain model to be dynamically expanded.

KTGs track and keep metadata about each node so that KTG knows the type and purpose of the node (e.g. event/action or concept), the number and type of data fields/slots, and how many relationships (edges) the node has with other nodes. Moreover, the edges between KTG nodes are time-stamped at the time of creation to support tracing back the dialog history. This helps AVIA maintain context of the dialog over time as AVIA can trace backwards in the dialog (similar to going in reverse in a sequential timeline) and analyze changes in the progression of dialog context as the caller utters new concepts or lexical items moving forward in the dialog. Time-stamps can be used to detect changes in behavior patterns of callers based on previously stored KTGs.

Embodiments can use an inference engine to infer information and ask a user to confirm if information it believes is correct is valid, without having to prompt the user directly for that information. This allows a dialog manager to have a more flexible and natural conversation with users because it can utilize information it already has access to from previously stored databases, making inferences about what it knows, and only prompting users when it cannot obtain that information otherwise. For example, if a specific user almost always orders their pizza with the same toppings, the AVIA can ask "Would you like your pizza with mushrooms and sausage?" Instead of just saying "what toppings would you like on your pizza?" Similarly, in a home automation application, if the user says "turn on the lights" in a particular room, a AVIA dialog manager system will be able to turn on the subset of the room lights that the user typically prefers, without automatically turning on every light.

The dialog manager's use of Knowledge Tree Graphs enables business concepts to be linked to the associated information that the system knows at any given time and to update them as new information is obtained or when information is accessed in previously stored databases.

A conventional IVR may be able to vary its prompts but it often becomes stuck especially when the IVR does not understand or recognize the caller's speech input and requires the user to connect to a live customer support person to complete the transaction. In contrast, embodiments disclosed herein are able to use the KTG and its underlying KTG template to search and analyze filled and unfilled data slots in node fields to obtain as much information as possible about what is known and unknown, and then make the appropriate inference on the information it was not able to understand without the assistance of a live human.

A Knowledge Tree Graph (KTG) comprises nodes of concepts with associated data/property field information. The AVIA dialog manager can dynamically traverse the edges between nodes in the KTG to associate meanings and maintain context. For instance, a restaurant maintains a KTG that contains nodes for reservations open (times and dates available), reservations filled, number of seats available, food prices, etc. If a user calls and tries to make a reservation and calls back, a dialog manager may provide available times if the user requests a reservation based on updated information it obtained between the time the caller hung up and called back.

Referring now to FIG. 1, a system architecture diagram of the embodiment described herein is depicted.

At 101, the caller provides speech input through a telephony device including, but not limited to, mobile wireless phone, landline, or voice over IP (VOIP) as shown in telephony device 102. The speech input is transmitted to the AVIA server shown in 103 which contains the AVIA software and processing engines shown in 104. The speech input is processed by AVIA through its automatic speech recognition (ASR) engine shown in 106 which is comprised of a natural language processing engine in 109, comprising a grammar parser and syntax engine in 111, a speech-to-text (STT) engine 100, and a foreign language translation engine 123 that automatically converts AVIA's default language (e.g. English) into the foreign language of the caller 101 (if required). The ASR is also comprised of a speech biometric system 126 that may comprise a speaker identification module 108 for recognition of a caller's voice to determine if they have called before. The speech biometric system also comprises a language identification engine/module 128 for automatically detecting and recognizing the caller's spoken (foreign) language, an audio recording engine 105 that automatically records the conversation between AVIA and the caller which gets transcribed and stored for future dialog references, and a voice analysis 129 engine to analyze the caller's voice (including tone and pitch) and to retrieve previously created instantiation(s) associated with the caller's voice from a CRM data repository if the caller is known via speaker identification (e.g. there is a match with known caller voices.)

The ARS in 106 interfaces with the context and meaning engine (CME) shown in 112 which is comprised of a semantic meaning engine 124 and an ontological semantics engine 125 that help facilitate structured meaning to the speech input of the caller. The CME interfaces with the Reasoning and Inference Engine 114 that is comprised of an artificial intelligence engine 115, a Bayesian inference engine 116, and a decision-making engine 117. The artificial intelligence engine assists with computational linguistics and natural language processing to maximize the likelihood and accuracy that the embodiment intelligently responds to the caller's speech input. The Bayesian inference engine computes probabilities about the possible intended meanings of various terms of the caller's speech input based on a priori knowledge and facts known at the time.

The Bayesian inference engine 116 dynamically tracks individual and global statistics for terms, words, and concepts used by callers. Based on these probabilities, the system then assigns weights to edges between nodes in knowledge tree graphs (KTGs) based on the strength of the relationship between known concepts and new information obtained during the dialog with the caller. The decision-making engine helps make system decisions of the most appropriate responses and/or actions to take using probabilities computed from the Bayesian inference engine to determine the most probable inference of what the caller intended if it is not clear or fully understood.

The embodiment consists of an adaptive learning engine 119 that may consist of a deep neural net learning engine in 118 which handles machine learning and machine translation of new unknown concepts. Embodiments may have various configurations and combinations of engine components, including, but not limited to, those in FIG. 1. For instance, some embodiments may include a deep neural net learning component in the reasoning and inference engine 114 while other embodiments may not include it. Likewise, some embodiments may have a deep neural net learning component in both the adaptive learning engine 119 and the reasoning and inference engine 114 while other embodiments may not include one and/or use alternative components such as deep belief networks (DBNs), Bayesian networks, or convolutional neural networks (CNNs). The adaptive learning engine 119 interfaces with the context and meaning engine 112 and the reasoning and inference engine 114 as depicted by the arrows between them indicating the direction data input and output can flow. The adaptive learning engine interfaces with various databases including, but not limited to, a customer relationship management (CRM) database 110 (which stores user preferences, information and caller data) and a business knowledge repository 113 (which stores information and data about the enterprise).

The adaptive learning engine interfaces with external data sources (e.g. Wolfram Alpha, WordNet, OpenCyc, etc.) to access ontologies of concepts and lexicon items it may not know. The ASR engine 106 and CME 112 interface with a database (DB) of phrase constructs 120 that stores commonly used phrases and constructs in understanding speech input from the caller as well as facilitating ASR and construction of speech output to the caller.

The arrows between 104 and 106, 106 and 112, 112 and 114, 112 and 119, 114 and 119 indicate the direction that data input and data output can flow and be exchanged between the system component and engines that interface with one another. Since the ASR engine 106 is a system component of the AVIA system 104, the data transformation (and thus data flow) from text to speech is occurring internally. The arrows between the system engines and databases also show how data flows and is exchanged. For instance, both the NLP engine 109 and context and meaning engine 112 can access, query, and/or retrieve data stored in the phrase constructs database 120. Conversely, the phrase constructs database can be updated with new phrases and constructs obtained and/or learned during dialogs.

Once the embodiment processes the speech input (e.g., represented internally by the NLP engine as Extensible Multimodal Annotation (EMMA)) and decides on the appropriate response, the system converts the appropriate response into speech through text-to-speech (TTS) processing 121 as shown by the arrows from the ASR engine 106 to the AVIA system 104.

The TTS process 121 enables speech output to the caller as shown by the arrows from the AVIA Server 103 to the telephony device 102 that the caller is using. If the caller has requested or indicated that that they want to receive emails, SMS, alerts, ads, etc., their profile in the CRM database 110 is updated and the email video SMS Server 122 will automatically send text, email, SMS, and/or alerts to the caller as shown by the data flow arrow from 122 to 101. The server has a communication engine 130 that contains the communication protocols to send emails, alerts, and SMS. Likewise, if the reasoning and inference engine 114 determines that an action requiring an email, alert, and/or SMS confirmation be sent to the user (e.g. to confirm an appointment), then it will notify the email, video, and SMS server in 122 to take such action.

One skilled in the art may modify the architecture to meet a specific business's needs without changing the underlying innovations in this embodiment.

Referring now to FIG. 2, a food order flowchart for a restaurant interaction is depicted. The information obtained from the caller during the interaction is used to dynamically provide required information for data field or slots in a corresponding knowledge tree graph (KTG) (not depicted).

To process a food order 200 from the caller, the system must know both the food 201 and drink 202 that the caller wants. In the KTG for this caller, a food order node would consist of data fields or slots that must be filled for food 201 and drink 202. To determine what food the caller wants, the AVIA dialog manager may ask the caller what they would like for an appetizer 203, entrée 204, and dessert 205 which are pre-programmed properties of the food 201 ontology concept.

The appetizer, entrée, and dessert property fields may be optional as a caller may just want to order a drink. Similarly, the caller may only want just an appetizer and entrée and no dessert. To take the drink part of the food order, the AVIA dialog manager will ask the caller what kind of drink 206 they want and what size 207. The kind of drink and size are required data fields that must be determined if the caller orders a drink as part of their food order. Thus, the AVIA dialog manager will specifically ask the caller what kind of drink and what size drink they want.

Figure 3A:
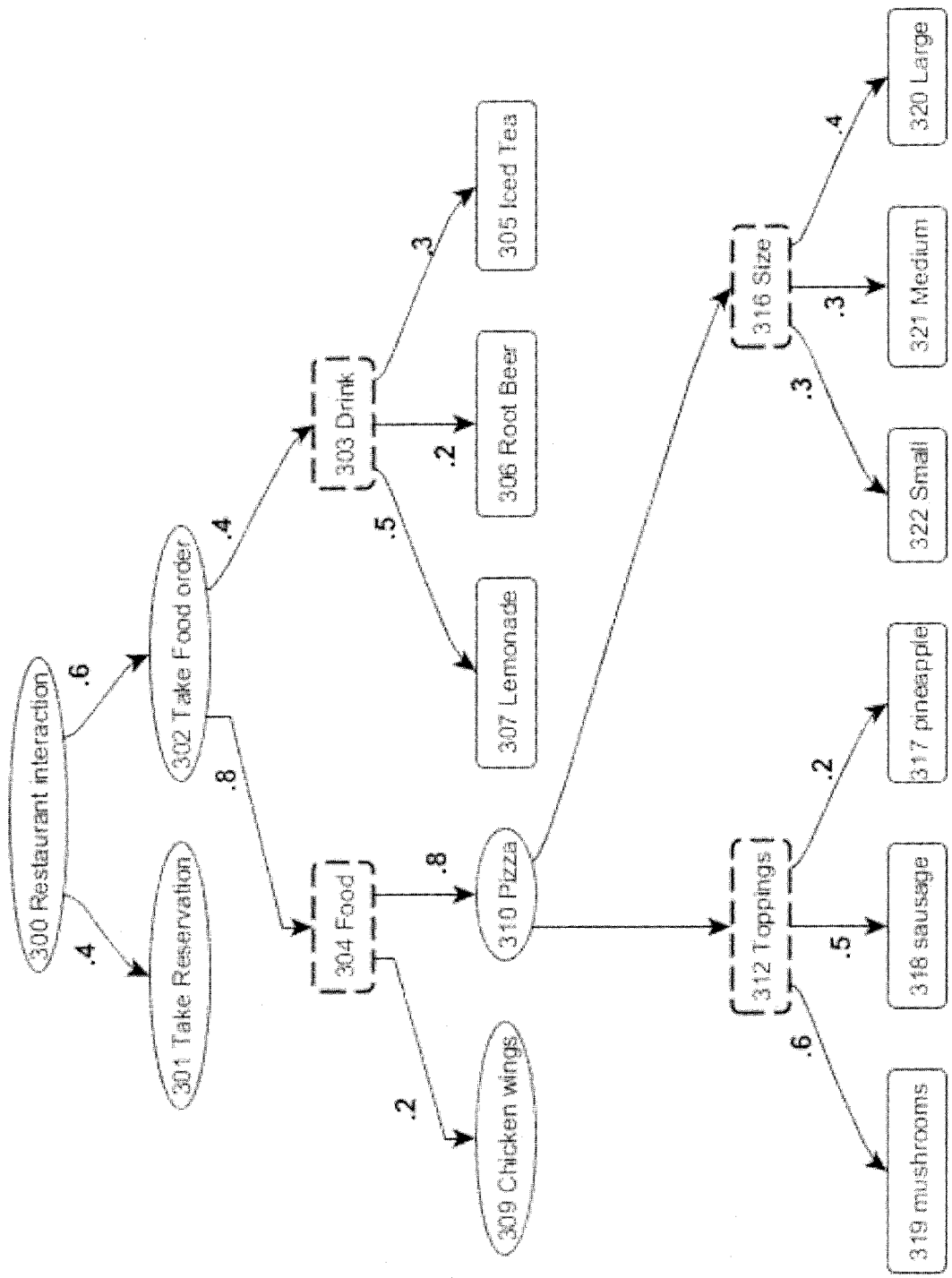
FIG. 3A schematically depicts a detailed food order KTG ontology chart for a restaurant interaction, according to one or more embodiments shown and described herein.

Referring now to FIG. 3A, a detailed food order KTG template (ontology chart) is depicted. A restaurant interaction 300 is initiated when a caller calls a restaurant that has an implementation of the embodiment described herein. The restaurant starts out asking if the caller wants to order food because that is more probable. In this example, based on statistics tracked on the purpose of calls, 60% of the time, a given caller is calling to make a food order and the system takes food orders as shown in the "Take Food order" action node 302. The system will assign a probability and weight of 0.6 to this scenario. 40% of the time callers want to make a reservation and therefore the system prompts the caller for such information to take such a reservation ("Take Reservation") 301. Thus, the system assigns a weight (and probability) of 0.4 to the likelihood that a caller is calling the restaurant to make a reservation. If callers call to make a food order, then 80% of the time they will order Food 304 and 40% of the time they will order a Drink 303 as part of their food order.

These weights are mapped to corresponding edges in the knowledge tree graph (KTG) based on the relationship of data/concepts in one node to data/concepts in another node.

The dashed-lines around the boxes denote properties instantiated during the call (since the caller must provide those details) whereas a solid line around the box denote pre-programmed properties or data fields of its parent node. For a food order, in this interaction example, 20% of the time callers will order Chicken Wings 309 and 80% of the time they will order Pizza 310. Chicken Wings 309 and Pizza 310 are children ontology concepts (types) of food 304.

If the caller orders pizza, then the system must know what pizza Toppings 312 and Size 316 they want. In this example, 60% of the time callers order Mushrooms 319, 50% of the time callers order Sausage 318, and 20% of the time they order pineapple 317 toppings. 30% of the time, callers who order a pizza will order a Small 322, 30% of the time they will order a Medium 321, and 40% of the time they will order a Large 320 size.

If a caller orders a Drink 303, then they order a Lemonade 307 with probability 0.5, a Root Beer 306 with probability 0.2, and an Iced Tea 305 with probability 0.3. The probabilities are updated in real-time as the system handles more interactions with callers and more statistics are computed.

Figure 3B:
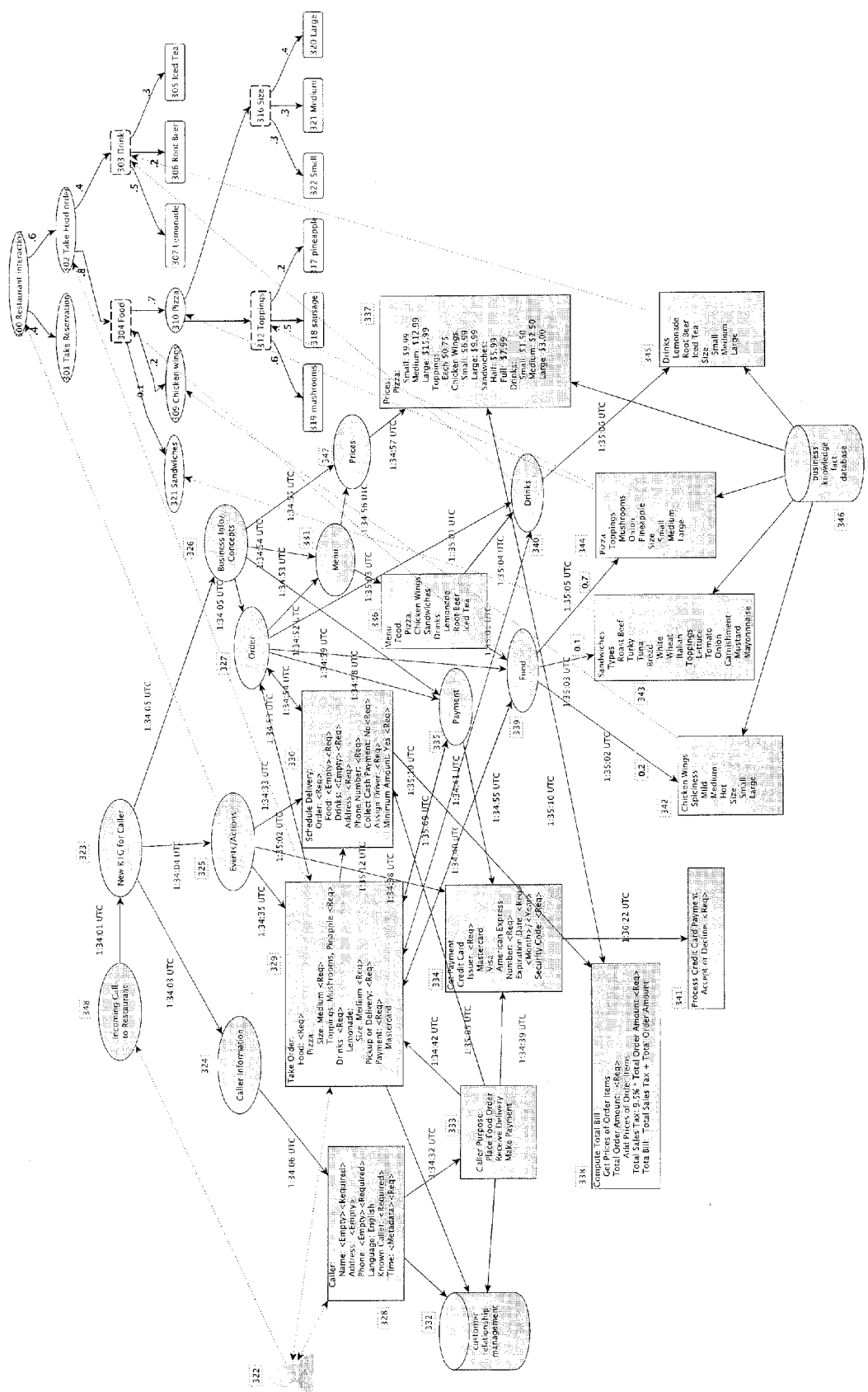
FIG. 3B schematically depicts a dynamically created knowledge tree graph for an incoming call to a restaurant, according to one or more embodiments shown and described herein.

FIG. 3B shows an example of a dynamically generated KTG built in real-time for an incoming call to a restaurant. The caller (who is assumed not to have called before) is shown in 322. Once the call is received, AVIA creates a new KTG for this caller. The KTG starts with three nodes, Caller Information 324, Events/Actions 325, and Business Info/Concepts 326. The Caller Information node will instantiate children nodes to collect caller information 328 details such as Name, Address, Phone, (preferred) language, the time of the call, and whether the caller is known (e.g., does AVIA recognize their voice from a previously stored voice print). It will also include the Caller Purpose 333 which identifies the caller's reason for calling. In most cases of businesses using AVIA, the purpose will be known and/or can strongly inferred based on the type of business called. In this example, a restaurant has implemented AVIA so that taking orders, scheduling deliveries, and taking reservations are the most likely reason for an incoming call to the restaurant. The business can include additional events/actions that it may perform in its KTG template.

The caller's information, voice print, and the associated KTG for the caller is stored in a customer relationship management (CRM) database 332 for future use.

The KTG is built based on an underlying restaurant template that the restaurant pre-programs and completes before AVIA will work. For instance, the restaurant will fill in/pre-program its property fields for menu items and prices in the menu and price slots of the template (not shown) that may also be stored and accessed in its business knowledge fact database. The restaurant template is based upon an ontology domain for the restaurant (partly shown in the upper left hand corner and in FIG. 3A.) The KTG template serves as an underlying map for AVIA to follow when conversing with users as it includes data property fields that need to be instantiated in real-time for different properties depending on what concepts are encountered during the dialog. It may also contain the associated probabilities of the likelihood that those concepts/properties will be encountered during the call. If concepts or lexical items are encountered during the dialog that AVIA is not familiar with, it will attempt adaptive learning by searching third-party ontological data sources like WordNet. This process is detailed in FIG. 6B and discussed below. Once AVIA learns these concepts, these concepts will be dynamically added to the KTG in nodes and mapped to other nodes based on the relationship to them. In addition to storage of the caller's KTG in a CRM database, the newly learned concepts can be stored in a business fact knowledge database 346 for future use.

As shown in the KTG, critical business concepts for the restaurant to interact with the caller are mapped from the KTG template and shown in the KTG under the Business Info/Concepts 326 node such as Order 327, Menu 331, Prices 347, and Payment 335. The Order 327 concept contains Food 339, Drinks 340 and Payment 335 concept nodes. Order 327 also is related to Menu 331 as a caller typically orders from the menu. The Menu has both food and drinks which have an "is-part-of" relationship with the menu. The Menu also has Prices 347 specified for food and drinks in node 337. Food 339, Drinks 340, and Payment 335 have an "is-part-of" relationship with Order as an order requires specified information for food, drink, and payment from the caller. Consequently, these items are obtained from the caller 322 as shown by the dashed line from 322 to the Take Order 329 action. Each business, and in this case restaurant, can customize the underlying template to meet their specific business needs and objectives. For instances, if a restaurant accepted checks, then "Check" would be added to the type of allowed payments in the Get Payment 334 node.

KTGs are dynamically built "on-the-fly" for speed and efficiency and are completely flexible to support new concepts, data property fields or slots, and relationships in real-time as the dialog progresses. Furthermore, KTGs keep and track metadata about each node so that the KTG knows what the purpose of the node is (e.g. event/action or concept), the type of data property fields and information (e.g. required or optional fields), and the number and strength of relationships (edges) the node has with other nodes, etc.

Nodes in the KTG may contain required data fields that AVIA needs to process during a conversation with a user. Some of the information is obtained by traversing the KTG to determine if the information needed can be located in other nodes or elsewhere (e.g. a database). The embodiment could use an adjacency matrix or other data structure to enhance KTG traversal efficiencies to find data in nodes. If AVIA cannot obtain the information (contained in nodes) of the KTG, it will try to obtain the information received in responses to queries prompted by AVIA to callers, while other information may be obtained or acquired from databases that interface with AVIA, previously stored KTGs (if the caller is known), and/or external data sources. It is this ability to "know" how, when, and where to obtain information it needs to process events/actions for a caller that makes AVIA significantly more advanced, flexible, and intelligent than existing IVR systems and personal assistants.

There are edges (shown as arrows) between related nodes (nodes that are associated by context and/or meaning) so that any node can be reached by traversing others depending on whether they are conceptually related to one another. Intuitively, one can think of each node as containing a concept, object, or action with corresponding data property fields.

The edges between nodes help AVIA maintain context of the dialog over time with the user. AVIA can track the progression of the conversation, in part, through the point in time at which KTG nodes and edges are dynamically created and instantiated. Thus, AVIA can go/traverse "backwards" to see whether the current context of the dialog has changed based on whether the caller has introduced concepts (or lexical items) that may be completed unrelated to previous concepts. It is analogous to creating a sequential timeline and being able to go in reverse on a road one is driving on that accounts for all the turns along the way to see where one has been and came from as well as having taken pictures (e.g. nodes) along the way to help remember what one saw while moving forward. As shown, the edges are time-stamped at the time of creation to support tracing back the dialog history. As AVIA learns new information during the conversation, new nodes may be created dynamically during the conversation, added, and placed in the KTG based on its relationship in the organizational structure to other nodes. Data property fields/slots may be filled or updated. The edges to the databases do not contain timestamps because data is accessed and stored when needed during the dialog. However, databases typically track the timestamp of when data is queried or persisted. AVIA can obtain this metadata from the database if needed.

In this diagram, the initial call is at 1:34:01 UTC as shown by the edge between 348 and 323. AVIA can track the timing sequence of when edges between nodes based on their relationship to one another are created so AVIA knows when certain concepts or actions were needed during the dialog. Many of these concepts and events/actions are automatically instantiated without the caller having to discuss them based on the KTG template business type. In this diagram, concepts like Order 327, Menu 331, Prices 347, Payment 335, Food 339, and Drinks 340 are common to all restaurants so AVIA will automatically include them. On the other hand, events/actions like Schedule Delivery 330 may not be added in the KTG until the caller indicates to AVIA that they want to have a takeout delivery. Some embodiments may add KTG nodes for all events/actions (programmed in the underlying KTG template) at the time of KTG instantiation (e.g. before they are encountered in the dialog). However, there may be a trade-off between increased processing speed for node data access and greater memory resource allocation (especially if there are many nodes and/or nodes that may not be used during the dialog.)

When AVIA asks the caller what they would like to order, the caller may not know what food items the restaurant serves. AVIA can access the restaurant's menu and provide it to the caller, e.g., reading it to the caller or more likely sending it via email/SMS to the caller as the case may be (not shown, but see FIG. 4A, 432). If the user told AVIA to send the restaurant's menu to the caller, AVIA would ask for caller's email and that field would be dynamically populated/filled under Caller Information in 328. Since the caller indicated they want a food delivery (which requires a food order), there are relationship edges from the Caller Purpose 333 node to the Take Order 329 and Schedule Delivery 330 nodes. The Schedule Delivery 330 node, which is a type of Events/Actions 325, contains required data fields or slots to process the delivery, including the Order (food and/or drinks), Caller's Address, Phone Number, whether the driver needs to Collect Cash payment (at time of delivery from caller), and an assigned driver to handle the delivery.

The Take Order 329 node is related to the Schedule Delivery 330 node because the Take Order node contains the order information needed to populate the Order field in the Schedule Delivery node. The Take Order 329 is also related to the Menu 336 node (which in turn contain Food 339 and Drink 340 children nodes since Food and Drinks are part of or contained in the Menu) so that AVIA knows where to check that what the caller orders is served by the restaurant and is available. The Take Order 329 is also related to the Payment 335 node which in turn is related to the Get Payment 334 node. AVIA can traverse the Take Order 329 node to get to the Get Payment 334 node via the Payment 335 node.

Consequently, the Events/Actions 325 node contains action nodes that AVIA must perform to serve the caller. In this case, the call is to a restaurant. Suppose after AVIA has asked the caller how they can help them, the caller has indicated that they want to order a take out and have it delivered. Therefore, AVIA will dynamically instantiate nodes based on these actions, Take Order 329, Schedule Delivery 330, and Get Payment 334.

The Take Order 329 node contains required fields for Food, Drink, Pickup or Delivery, and Payment. In other words, AVIA must prompt the user to obtain information regarding each of these fields to process an order. While the caller does not have to order both food and drink, they do have to order a minimum amount to be able to get delivery as shown by the required Minimum Amount field in Schedule Delivery 330. Based on their order, AVIA will compute the total bill 338. If the total bill computed in 338 does not meet or exceeds the restaurant's threshold pre-programmed amount in the restaurant template (not shown), AVIA will notify the caller that to get delivery their order needs to total at least the threshold amount such as $12 which is common among restaurants that provide delivery services.

The restaurant's Menu 336 contains Food items for Pizza 344, Sandwiches 343, and Chicken Wings 342. Each of these food items has its own node and contains the property fields specific to that item. For instance, pizza contains topping and size fields that are required. Sandwiches 343 contain types, bread, toppings, and garnishment property fields and chicken wings 342 contain spiciness and size fields. Each restaurant can customize these fields based on their own menu, food items, etc. These food items are mapped to the restaurant's KTG template which contains the dynamically instantiated fields that AVIA must get from the caller during the dialog. For instance, for pizza, AVIA must find out what toppings (if any) and pizza size the caller wants.

The restaurant's interaction KTG template contains weights (probabilities) that get mapped to the underlying KTG edges based on the frequency that callers order specific foods, toppings, sizes, and drinks. For instance, based on the restaurant's KTG template for a food order, shown in FIG. 3A, the corresponding KTG edges will reflect that 80% (0.8) of callers order food and 40% (0.4) order drinks. (To reduce complexity of the diagram, the weights are not shown along the KTG edges since the timestamps are there.) Likewise, the KTG will reflect AVIA's knowledge that for those that order pizza, 60% (0.6) get mushroom, 50% (0.5) sausage, and 20% (0.2) pineapple toppings. Similarly, 30% (0.3) of callers get a small, 30% (0.3) get a medium, and 40% (0.4) get a large pizza size. The probabilities are based on global statistics that AVIA keeps track of (that are dynamically updated) and may used by AVIA's Bayesian inference engine in computing a priori probabilities. These weights may be used as measure of the strength of the relationship shown by the edges between nodes. They are also used to make reasoning and inference decisions.

AVIA knows from which nodes to dynamically add edges to other nodes that are dynamically added to the KTG based on the correlation between information/data property fields inside a given node and the information/data property fields in another node. For instance, the Take Order 329 node has Food and Drinks fields. Clearly, these fields are correlated and directly related to the Food 339 and Drinks 340 nodes, which in turn part of the Menu 336. Therefore, edges are created between the Take Order 329 and Food 339 and Drinks 340 nodes. Note that the KTG can be traversed to get from the Take Order 329 node to the Food 339 and Drinks 340 nodes via the edge to the Order 327 node (which has edges to these nodes.) Note also that concept nodes (e.g. 331, 339, 340, 347) may be separated from the specific detail nodes (e.g. 336, 337, 342, 343, 344) to encapsulate the data from the concept thereby allowing the business to make changes to the data property fields in the KTG template without impacting the underlying structured ontology domain. For instance, the restaurant may want to include both a lunch and dinner menu with different foods and/or prices, but ensure that detailed menus will still be children nodes of their parent Menu concept node. The Minimum Bill Amount field in the Schedule Delivery 330 node is correlated with the total bill field in the Compute Total Bill 338 node since AVIA must compare whether the total bill meets or exceeds the minimum bill amount threshold.

Even though the caller did not ever state they need to make a payment, AVIA knows that it must Get (credit card) Payment if the caller is paying by credit card especially as all orders require payment by either cash or credit card (e.g., there is a required Payment field in Take Order 329.) The Caller's purpose will also include Make Payment (a caller must expect to pay if they are going to make a delivery order). AVIA knows that it must find out how the caller intends to pay and therefore will prompt the user for this information. If the caller wants to pay by credit card, then AVIA knows it must get the issuer, credit card number, expiration date, and security code which are required data fields in the Get Payment 334 information action node. AVIA will confirm the credit card information details provided by the caller to ensure that AVIA correctly processes the numbers and information given. Likewise, the Compute Total Bill 338 action node is correlated with the menu Prices 337 node because AVIA must use these prices to calculate the total bill amount, Using reasoning and Bayesian inference, AVIA can calculate the likelihood probability that two nodes are related and/or have information that is correlated and statistically significant.

Once it obtains this information, it can Process Credit Card Payment 341. AVIA will find out if the card has been accepted or declined by the credit card issuer. If it has been declined, AVIA will notify the caller and request another card and will suspend processing the order until a valid credit card has been accepted. If it has been accepted, the order will be processed and the delivery to the address of the home provided.

Figure 4A:
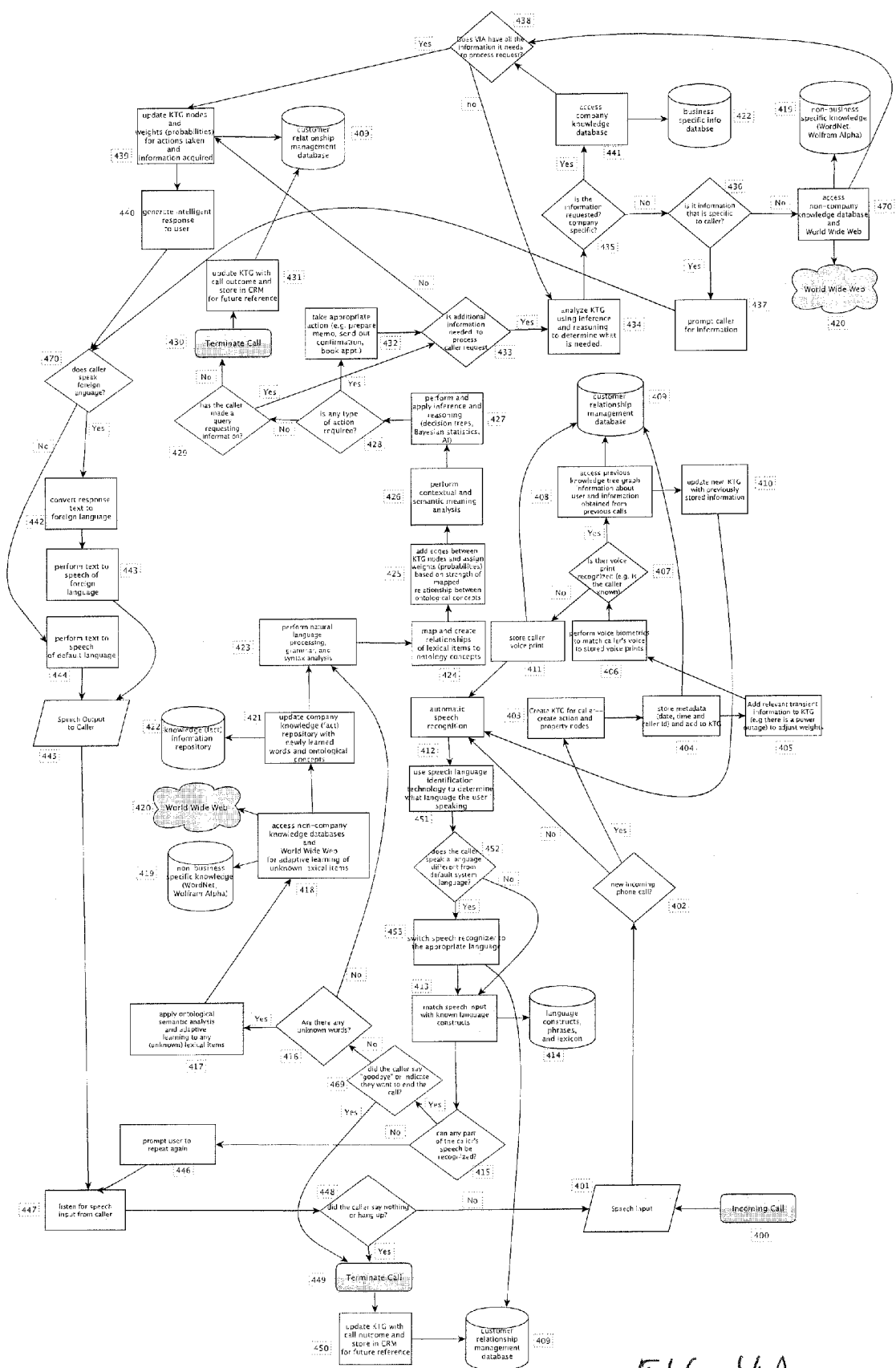
FIGS. 4A-4B schematically depict flowcharts of call flow processing, according to one or more embodiments shown and described herein.

Referring now to FIG. 4A, a flowchart of a call flow process is schematically depicted. At block 401, speech input is received from an incoming caller 400 where a caller uses a telephone device including, but not limited to a mobile phone, landline, and voice over IP (VOIP) to communicate with AVIA. After receiving the speech input, AVIA must determine whether it is a new incoming phone call 402 or the continuation of an ongoing phone call. If the call is new, a knowledge tree graph (KTG) is instantiated and created for the caller at block 403. The knowledge tree graph contains action and caller information nodes that will be dynamically filled in and updated during the conversation. The caller information node contains fields or slots about the caller such as name, address, and phone number. Depending on the purpose of the inquiry, some of these fields are required, meaning the system must get the information from the caller in order to properly serve or handle the caller's request. For instance, if a caller wants a food delivery to their home, the system will need their address for the delivery driver and therefore AVIA will ask for it.

AVIA then stores metadata associated about the call (for example, date, time, caller id, etc.) and adds it to the KTG as shown in 404. AVIA then adds any relevant transient information to KTG (e.g., there is a power outage) to adjust weights based on the high frequency of callers making the same type of inquiries as shown in 405. Using voice biometrics, AVIA will then attempt to match the caller's voice with stored voice prints as shown in 406. Depending on whether a match is found, AVIA will determine whether the caller's voice print is recognized (e.g., whether the caller is known or not) as shown in decision node 407. If the voice print is recognized, then AVIA will access previous KTG information about the caller and information obtained from previous calls in 408 which is stored and accessed from the customer relationship management (CRM) database 409. AVIA will then update the new KTG with previously stored information (from previous KTGs) as shown in 410 and then initiate the automatic speech recognition process in 412.

If the caller's voice is recognized, (e.g., the caller is determined to be known and has called before as there is a voice print biometrics match) based on a yes answer to the decision in diamond 407, a previously stored KTG for the specific caller is accessed in block 408 from the CRM database 409. Information known and obtained from the caller based on previously stored dialogs and KTGs for that customer is used to populate and update any fields in the newly instantiated KTG automatically as shown in block 410, such as their name, address, preferences, etc. that are stored in the CRM database.

If the voice is not recognized (e.g., the caller is new and/or has not called before) many of the data fields of the KTG will be empty in the KTG (other than metadata in 404 and relevant transient information in 405) and the system will have to prompt/query the user and/or obtain the information from third-party data sources to populate required fields as the case may be. The speech input 401 is processed by the automatic speech recognition engine shown in block 412.

If VIA does not recognize anything the caller has said as shown in decision node 415, the system will prompt the user to repeat the unrecognized speech input again as shown in box 446. AVIA then listens for speech input from the user as shown in box 447. If the caller has not hung up or not said anything in decision node 448 (prompting AVIA to terminate the call), once again any speech input in 401 goes through the automatic speech recognition process again beginning with decision node 402. In this case the speech input is not from a new incoming phone call, but is a response to the system's request for a repetition so the process goes from 402 to 412.

If AVIA recognizes any part of the speech input from automatic speech recognition, AVIA then performs natural language processing, grammar, and syntax analysis as shown in 423. At this step AVIA will perform such tasks like using syntactic context to decide whether a noun is a proper noun (e.g. name of a business or person) or a common noun. The system will also use its language identification technology to decide what language the user is speaking as shown in box 451. AVIA must decide whether or not the caller is speaking a different language from the default system language as shown in decision node 452. If the caller is speaking a different language, then AVIA must switch the speech recognizer to the appropriate language as shown in 453 and store the language preference in the CRM database 409.

AVIA will then attempt to match the speech input with known language constructs 413 stored in the language, constructs, phrases, and lexicon database in 414. The system must decide whether any part of the caller's speech (e.g., the speech input) can be automatically recognized and/or matched up with known constructs in the phrase construct database as shown in decision node 415. If the answer is yes, then the system must then decide whether or not the user has said "goodbye" or indicated they want to end the call (e.g. without having their task or inquiry completed) as shown in decision node 469. If the answer is yes, AVIA will terminate the call in 449 and then update the KTG with the call outcome and store it in the CRM 409 for future reference 450. If the caller has not said "goodbye" and has not indicated they want to end the call (the answer is "no" in decision node 469), AVIA must then decide whether there are any unknown words that it does not recognize as shown in decision node 416.

If there are unknown words in the speech input, then AVIA must apply ontological semantic analysis and adaptive learning to any unknown lexical items as shown in box 417 in order to determine their meanings. As part of the adaptive learning process, AVIA will then access non-company third-party knowledge fact source repositories (e.g. WordNet, Wolfram Alpha, OpenCyc) 419 and/or the World Wide Web in 420 as shown in box 418. Access to third-party databases, libraries, and repositories is typically done through application programming interface (API) integration. AVIA then updates the company knowledge (fact) repository with newly learned word and ontological concepts as shown in 421. The newly learned words and ontological concepts are stored into the knowledge fact information database shown in 422. These steps are described in detail in the discussion of FIG. 6A.

Once concepts in the speech are understood by structuring a real-time ontology, the system maps and creates relationships of lexical items to concepts based on the ontology of the domain as shown in step 424. In step 424, word sense (homonym) disambiguation occurs to decide whether a given word such as "arms" refers to the arms of a person or to weapons. These are different concepts so the mapping process needs to pick the right concept, depending on the context, and in doing so, it disambiguates the word sense to either "human arms" or "weapons." These relationships are established in the KTG by creating edges between nodes and assigning weights based on the strength of the ontological relationship concepts as shown in 425.

The system then performs contextual analysis and then semantic meaning analysis as shown in step 426.

Context analysis would mean understanding contextually-determined expressions like "tomorrow", as in "I need to make an appointment for tomorrow" is "Oct. 1, 2014" for instance. In addition to generic context, like time, AVIA analyzes application-specific sense of context. For example, if the caller is calling a store that has a lot of locations and asking for the nearest location, the system could take into account the user's location, which is also part of the context.

Both the meaning and contextual analysis are performed in the context and meaning engine of AVIA. This entails extracting the context and meaning of the structured ontological relationships in the KTG template that are mapped to the KTG. Once the context and meaning of the speech input is analyzed and determined by the CME, the system performs and applies reasoning and inference using artificial intelligence (AI), Bayesian inference, and decision-trees as shown in block 427.

Step 427 is the step where AVIA figures out what to do (e.g. what actions to take) about what the user said. For instance, step 427 is where AVIA has filled out the KTG with a pizza order, and the system then decides what to do next. In most cases that would be just finalizing the order—confirming the order, telling the caller how much it cost, giving the caller an estimated delivery time, etc. But there might be special circumstances that would lead to a different action. For example, if the caller almost always orders mushrooms, but didn't this time, AVIA might double check to make sure the caller did not simply forget the mushrooms. Or the pizza parlor might want to try to get the caller to add extra items to their order ("You know, we're having a special on breadsticks, do you want to add that to your order?").

Based on the reasoning and inference analysis in 427, the system determines whether or not any action is required as shown in decision node 428. If an action is required, the system will perform the action based on the action needed, e.g., prepare memos, send out confirmations, book an appointment, etc., as the case may be as shown in box 432. AVIA must then determine whether additional information needed to process caller request as shown in decision node 433. If additional information is needed, then AVIA analyzes the KTG using inference and reasoning to determine what is needed in 434. The system must then decide whether the information requested by the caller is company specific as shown in decision node 435.

If the information needed is company specific, then the system accesses the company knowledge database as shown in box 441 which in turn pulls the stored data from the business information database in 422. This business specific database contains information about employees, inventory, prices, item descriptions, etc. If the information needed is not company specific, AVIA must decide whether it is information that is specific to the caller as shown in decision node 436. If it is information specific to the caller, then AVIA prompts the caller for information as shown in box 437. If the information needed is not caller-specific (and also not company specific), then the system accesses non-company databases including, but not limited to, third party external sources (e.g. WordNet, Wolfram Alpha, OpenCYC, Semantic Web, etc.) 419 and the World Wide Web 420 as shown in box 470.

AVIA then must decide whether it has all the information it needs to process a caller's request as shown in decision node 438. If AVIA does not have all the information it needs, then AVIA must analyze the KTG using the inference and reasoning engine to determine what is still needed and goes back to the process in 434. This analysis will determine what required data field slots in the KTG nodes are still empty. After determining what information is needed and where to obtain the information, the system generates an appropriate intelligent response to the user including prompting the user for needed information or taking a needed action as the case may be. If AVIA has all the information it needs, then AVIA will update the KTG nodes and weights (probabilities) for actions taken and information acquired as shown in 439 which in turn involves updating the CRM database 409 that contains data inputted in the caller's KTG.

If no type of action is required as determined in decision node 428, then AVIA must decide whether the caller has made a query requesting information as shown in decision node 429. If the caller has made such a query, then AVIA must determine whether additional information is needed to answer the caller's question in decision node 433. If the caller has not made any query requesting information (and no type of action is required as determined in 428), then AVIA will terminate the call as shown in 430. Subsequently, AVIA will update the KTG with the call outcome 431 and store it in the customer relationship management database 409 for future reference.

AVIA, through its automatic speech recognition engine (speech identification), determines whether or not the caller speaks a foreign language as shown in decision node 470. If the answer is no, AVIA performs text to speech of the default language (e.g. the language that the system normally speaks) as shown in box 444 which in turn sends the speech output to the caller in 445. If AVIA determines that the caller does speak a foreign language (different from the default language), then it converts AVIA's response text (internally represented in AVIA as text in the default language) to the caller's foreign language (speech) in 443. Subsequently, AVIA sends the foreign language speech output to the caller in 445.

AVIA will then listen for speech input from the caller (as part of the dialog) in 447. If AVIA does not hear anything further from the caller, then AVIA will ask the caller if there is anything further it can do to assist the caller. AVIA then determines whether the caller has hung up or not said anything as shown in decision node 448. If no action or additional assistance is needed (e.g. the caller has hung up or said "goodbye") whereby the caller just wants to end the call without completing the their task, the system terminates the call as shown in 449. AVIA will then update the KTG with the call outcome and store it in the customer relationship management database in 409 for future reference. If the caller does speak, then the entire process repeats itself for the new speech input starting at 401.

Figure 4B:
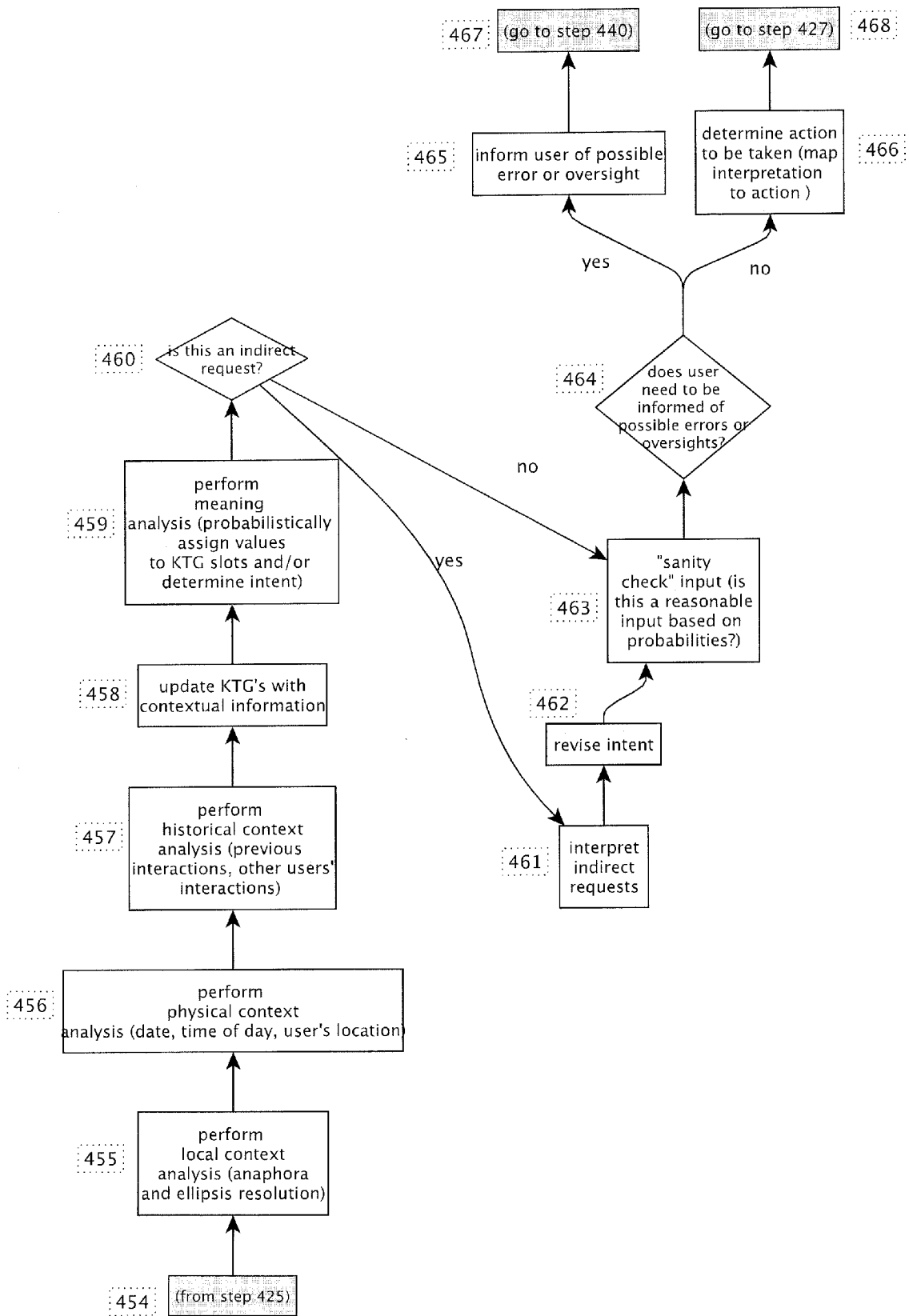

FIG. 4B details sub-steps of what is entitled Step 426 of FIG. 4A based on the embodiment described herein.

Step 426 in FIG. 4A is where the results of natural language processing (423), lexical to ontology mapping (424) and updating the KTG's probabilities (425) are integrated to provide a full analysis of the meaning of the user's input, taking the context into account. AVIA breaks up the processing into understanding the sentence first, and then contextualizing the sentence meaning in a further step. Understanding the sentence using semantic meaning analysis involves adding specific information to the KTG from the user's utterance. So AVIA would do things like fill in the "size" slot of "pizza" with "large", etc.

The specific mechanism for role filling in the KTG's can be any of several techniques known in the art. One strategy is a rule-based approach where rules are authored to map between syntactic functions ("subject", "object" "verb", etc.) to general, application-independent, semantic roles (such as "agent" or "patient") and then mapping the fillers of those roles to application-specific roles, such as "size", or "destinationCity").

An alternative to rule-based role mapping is another technique known in the art, where words or phrases are mapped directly to application-specific roles. This mapping is based on a corpus of annotated training data with many hundreds or thousands of examples of role mappings. To these standard techniques, AVIA adds the innovation that the probabilities for mapping concepts to specific slot fillers can be influenced, through Bayesian statistics, by external contextual information, such as the user's previous interactions with the system.

Referring now to FIG. 4B, from Step 425 in FIG. 4A (shown as 454 here), AVIA will perform local context analysis (anaphora and ellipsis resolution) as shown in step 455. Anaphora and ellipsis resolution are important tasks in resolving ambiguities in computational linguistics. The local context analysis would mean understanding contextually-determined expressions and/or determining the referents of pronouns and other referring expressions.

Anaphora refers to the use of a word as a regular grammatical substitute for a preceding word or group of words, as the use of it and do in I know it and he does too. An example of anaphora resolution with AVIA is:

User Question 1: "Do you sell ties?"
AVIA: "Yes."
User Question 2: "How many of them are silk?"
AVIA: "About half of the ties we sell are silk."

An ellipsis is the omission from a sentence or other construction of one or more words in order to avoid repeating the identical or equivalent items that are in a preceding or following construction, as the omission of been to Paris from the second clause of I've been to Paris, but they haven't.

Ellipsis resolution involves producing a non-elliptical paraphrase or linking the elliptical expression to its antecedent. Anaphora and ellipsis resolution involves interpreting pronouns and elided structures by the dynamic identification in discourse of type constraints on their semantic representations. In this case, AVIA does anaphora resolution to replace "them" in the second question with "ties", since the user is referring to ties. An example of ellipsis resolution:

User Question 1: "Want to book a flight to Atlanta."
AVIA: "For you?"
User Question 2: "Yes, and so does my colleague."

Note that AVIA sought clarification that the user wanted to book a flight for just the user. This clarification was important since the user informed AVIA that both she and somebody else wanted to book such a flight to Atlanta which was not clear from the user's initial utterance. Anaphora and ellipsis resolution are natural language understanding tasks and may be accomplished by a number of techniques known in the art.

Following local context analysis, AVIA will perform physical context analysis (date, time of day, user's location, etc.) For instance, if a user says "I want to book an appointment for tomorrow," AVIA will substitute the actual date e.g. Oct. 1, 2014, for the word "tomorrow." Likewise, if a user says "I want my pizza delivered in two hours," AVIA needs to know (and therefore will calculate) what time it will be in two hours from now to fill in a "delivery time" slot. Specifically, "context" analysis in step 426 of FIG. 4A means understanding expressions like "tomorrow" whose meaning is determined by reference to the context external to language; that is, deictic expressions. Examples of deictic expressions, in addition to "tomorrow", include "today", "yesterday", "here", "now", and "I". Techniques for resolving deictic expressions are known in the art.

In an embodiment, AVIA resolves deictic expressions by maintaining a list of known deictic words, along with specific procedures for resolving each of their meanings. For example, "now" would be resolved by reference to the system clock. This is done in step 426 in FIG. 4A where AVIA understands that "tomorrow" means "Oct. 1, 2014." As another example, if the word "here" is used, in an embodiment, AVIA can access the user's phone's GPS to determine the user's actual location, which it interprets as the meaning of "here". If this information is not available (for example, if the user is calling from an ordinary landline) AVIA can simply store the fact that "here" is "user location". In that case, AVIA must ask the user where he or she is located if the exact location is required later on (for example, to deliver a pizza). Finally, if the caller is calling a store that has a number of locations and asks for the nearest location, the system would take into account the user's location to calculate the location of the nearest store.

The third type of contextually based interpretation goes beyond the immediate linguistic and physical context to look at the historical context of other interactions, either with the same user, or with other users. This is done in step 457. For instance, if the call is to a pizzeria for carry-out, AVIA will look in its database of previous KTG's for this application and this caller to see what the caller has ordered in the past, what toppings they have previously requested on their pizza, and other details to improve the intelligence in the conversation. If a caller usually orders only mushrooms as a topping, AVIA can save the user time by checking to see if the user would like to repeat their previous order by asking "Would you like only mushrooms as your pizza topping?" AVIA will also look across multiple users' KTG's to make recommendations or suggestions based on the popularity of a specific item across users.

Following the collection of contextual information in steps 455, 456, and 457, AVIA updates the current KTG with this contextual information, as shown in step 458. In addition, AVIA also updates any other relevant KTG's, such as the KTG representing the caller, with the information from this utterance. For example, AVIA will update the caller's KTG with the caller's current location, if available. Finally, AVIA will revise any data field slots with the results of processing contextual information, such as the date "Oct. 1, 2014" as a substitute for "tomorrow" (e.g., the user says "I want to book a salon appointment tomorrow").

Next AVIA decides whether this is an indirect request as shown in decision node 460. Users do not always express their requests directly. For example, AVIA says "What kind of drink do you want?" and the user says "I'm on a diet", the user has not directly told the system the drink that they want. The first interpretation of the user's intent might be that the user wants to inform the system that he/she is on a diet. But this intent is a non-sequitur in the current context, since it seems to have little to do with the system's question. However, in a natural conversation, the system must take into account the possibility that the user is making an indirect request and wants the system to deduce that the user wants a low-calorie drink. Detecting and interpreting indirect requests is a well-known task in natural language processing. In response to this apparent non-sequitur, a typical system might say something like "please repeat", because it is assuming all the user's utterances will be direct, literal, responses, and it cannot find the name of the expected drink in the user's utterance. If the literal answer cannot be found in the user's request, AVIA will try to interpret the user's request as an indirect one.

To interpret an indirect request (step 461) AVIA will apply techniques known in the art to assume that the user is actually providing a relevant answer to the system's question. It then reasons from the indirect request back to the user's actual intention. The answer "I'm on a diet" would be relevant to the system's question if the user wanted to hear the low-calorie options, because being on a diet means that the user wants to reduce the amount of the calories they're eating. So a more helpful option would be to respond, "Our sugar-free options are Diet Coke, Diet Sprite . . . . ", understanding the user's response as an indirect request for sugar-free drinks. If the request is indirect, this requires revising AVIA's understanding of the user's intent (as a request for drink options in this example) as shown in step 462. It is to be understood that applying the Maxim of Relevance and determining the user's actual intent is a heuristic process, and in some cases the system may not be able to determine the user's actual intent without further conversation. This is due to the fact that in some cases the chain of reasoning that leads to understanding the user's actual intent can be quite complex, and difficult even for humans to perform. For this reason the methodology for applying the Maxim of Relevance relies on heuristic techniques such as starting from a set of known intents and finding the best match of a known intent to the utterance. Various techniques for determining the intent of indirect requests are known in the art.

Whether the request is direct or indirect, at step 463 AVIA performs "sanity checks" of the input; that is, AVIA must determine whether this is a reasonable input based on the context and probabilities. In one sanity check, it will look for attempts to fill a slot in the KTG with a disallowed value, such as an attempt to make an appointment for a time when the office is closed. Similarly, AVIA will compare the history of the user's interactions with the system as recorded in KTGs stored in the customer relationship management database (step 409 in FIG. 4A) to flag possible but unlikely requests. For example, if the user's previous orders have nearly always included mushrooms, but this order does not, this may be an omission on the user's part. AVIA can determine this by reviewing the customer's order history. It should be noted that these are only examples of possible sanity checks and that one skilled in the art could devise other sanity checks without departing from the spirit of the invention.

If a possible error or oversight is detected by one of the sanity checks in step 463, AVIA must decide whether the user needs to be informed, as shown in decision node 464. This is a probabilistic step, depending on the likelihood that this is an actual error or oversight. For example, if the user has ordered mushrooms on 99% of previous orders a failure to order mushrooms is more likely to be an error than if the user has only ordered mushrooms on 80% of previous orders. The threshold of when to inform the user of an error or oversight is set by the developer during system development.

If AVIA does need to inform users of possible errors or oversights, then AVIA will proceed to do so, as shown in step 465. Step 465 then goes to step 440 in FIG. 4A (shown as step 467 in this diagram) and prepares an intelligent response to inform the user of the possible error or oversight. If AVIA determines that it does not need to inform the user of possible errors or oversights in 464, then AVIA determines what action needs to then be taken by mapping interpretation of intent to action as shown in step 466. Finally, AVIA will then proceed to step 427 in FIG. 4A (shown as step 468 here.)

Figure 5A:
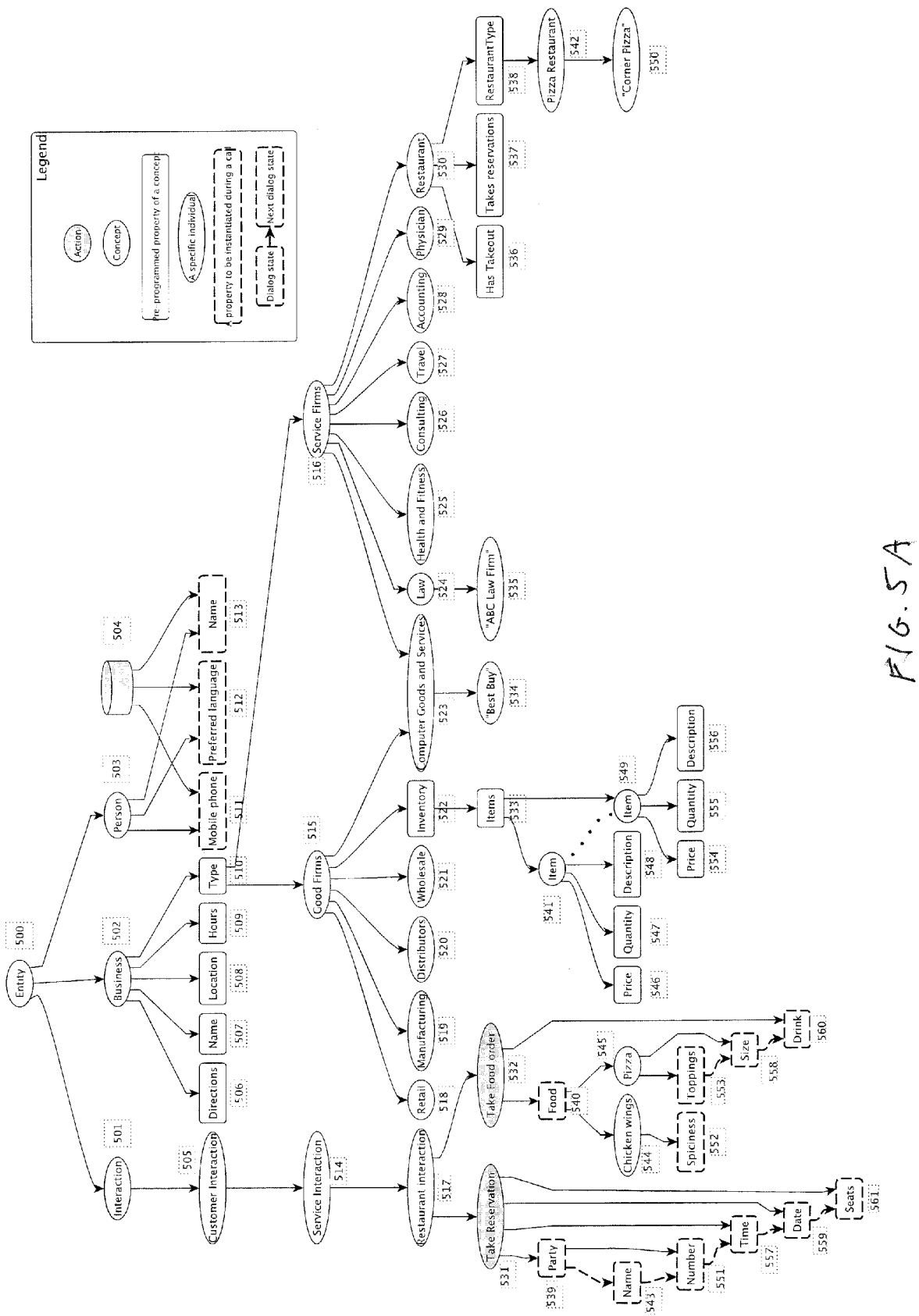
FIG. 5A schematically depicts a knowledge tree graph architecture, according to one or more embodiments shown and described herein.

Referring now to FIG. 5A, the parent business ontology concept in a KTG template is the Entity shown in oval 500. An Entity concept can have, include, and/or be related to an Interaction ontology concept in oval 501, a Business ontology concept in oval 502, and a Person ontology concept in oval 503. An ontology concept can be viewed as an object that possesses properties and/or has other sub-ontology concepts/objects that are related to it via an "is-a" or "has-a" relationship. Conceptually, relationships between ontology concepts (a "has-a" relationship) are represented as edges between nodes in the KTG and ontology concepts that are ontology sub-concepts of another (an "is-a" relationship) are conceptually represented as a sub-node nested within another node where a node (represented as an oval) contains properties (conceptually represented as data fields or slots either pre-defined or dynamically instantiated fields of an object within a node depending on whether the property is known by AVIA prior to run time (time of the call) or after.

The Interaction 501 ontology concept can include a Customer Interaction 505 which in turn can have a Service Interaction 514. The Business ontology concept has pre-programmed properties of ontology concepts Directions 506, Business Name 507, Location 508, Hours 509, and Business Type 510. These properties are determined and pre-defined by the business entity running AVIA during the implementation stage by filling in the data fields for these properties in the template.

A Person concept may have properties a Mobile Phone (Number) 511, Preferred language 512, and Name 513, which in turn are stored in a customer relationship management (CRM) database 504. A Business Type 510 property can either be a Goods Firm 515 or a Services firm 516 or both (providing and possessing properties of both goods and services firm) such as Computer Goods and Services firm 523 of which Best Buy 534 would be a specific individual firm type of Computer Goods and Services Firm ontology concept.

A Goods Firm concept could be a Retail 518, Manufacturing 519, Distributor 520, or Wholesale 521 type. In addition a Goods Firm has pre-programmed property of Inventory 522, which in turn has a pre-programmed property of Items 533.

Items contain an Item 541 concept which in turn have a Price 546, Quantity 547, Description 548, and possibly are related to another Item 549 (also with a Price 554, Quantity 555, and Description 556) as shown by the dashed line between Item 541 and Item 549.

Service Firms may be Law 524, Health and Fitness 525, Consulting 526, Travel 527, Accounting (or Banking) 528, Physician/Medical 529, and Restaurant 530. The type of Service Firms can be expanded by those skilled in the art to include many others. In this figure, "ABC Law Firm" is a specific individual type of Law firm as shown in 533. One can view each level in the KTG hierarchy as inheriting the properties and/or objects that supersede it. Conceptually, in the KTG, a node can be viewed as an object or ontology concept that contains property/data fields or slots. For instance, the ABC Law Firm is a Law firm and a Services Firm (which in turn is a Business Type 510), and ultimately an Entity 500. Consequently, in the KTG, if ABC Law Firm is using AVIA, it will contain nodes that have properties needed for a generic business (Directions, Name, Location, Hours, Type) as well as properties needed for a Law firm (practice areas, directory of attorneys and legal staff) (not shown.) When a caller calls "ABC Law Firm," the KTG will add nodes and properties based on the concepts discussed and obtained from the caller. For instance, a caller, which is a Person concept/object 503, may not only have the properties of Mobile Phone, Preferred Language, and Name, but also have a case-injury type (e.g. personal injury, bankruptcy, divorce, etc.) as the case may be which becomes a property field in a node that AVIA automatically creates in the KTG since a caller who is calling a Law Firm for legal help must have a case-injury type.

The Restaurant 530 ontology concept has or possesses other ontology concepts of Has Takeout 536, Take Reservations 537, and Restaurant Type 538 which in turn may be a Pizza Restaurant 542 ontology concept which in turn may be the specific individual restaurant Corner Pizza 550. Corner Pizza will have all the KTG ontology concepts and properties of an Entity that descend in the hierarchy to Restaurant 530 such that in the KTG for Corner Pizza, there are actions nodes for the pre-programmed properties of the Restaurant ontology concept, Has Takeout 536 and Take Reservations 537. Conversely, when a caller calls a business like Corner Pizza, there are Customer Interaction 505 ontology concepts that contain Service Interaction 514 ontology concepts that in turn contain Restaurant Interaction 517 ontology concepts that have Take Reservation 531 and Take Food Order 532 actions that correspond to pre-programmed properties of the Restaurant 530—Has Takeout 536 and Takes Reservations 537.

If a caller seeks to make a reservation (whereby the restaurant will Take Reservation 531), then AVIA will dynamically instantiate the properties during the call including Party 539, which in turn will transition the dialog state (shown by the dashed lines) to obtain the property Name 543, which in turn will transition the dialog state to obtain the property Number 551, which in turn will transition the dialog state to obtain the property Time (for Reservation) 557, which in turn will transition the dialog state to obtain the property Date 559, and then Seats 561. All these properties are required to Take a Reservation 531. Therefore, VIA will ask the caller for these information details to fill in the data property fields or slots. The Take Reservation action also depend on the state of reservations already booked in the system. A caller may request a specific Date 559 and Time 557, but if there are already reservations in those slots (based on currently stored Reservations obtained by AVIA from other KTGs) then AVIA will intelligently only allow Take Reservation for available (date, time, and seating) openings.

The diagram shows solid lines from Take Reservation 531 to Time 557, Date 559, and Seats 561. This means that AVIA can dynamically obtain this information from the caller at any time during the conversation and does not have to go in a pre-determined sequence of steps as current IVR systems must do. In other words, AVIA can intelligently figure out what data fields it needs, when it needs it, and how to obtain it. For instance, if the caller provides the Name, Number, and Date to AVIA, AVIA will know that it still needs to determine the Time of the Reservation 557 and the Seat (Location) 561. While the diagram shows that the dialog state could transition from Date to Seats, it is not required to do so as the Seats can be obtained directly from the caller without having to go through the prior transition dialog states.

Likewise, the Restaurant Interaction 517 has a Take Food Order Action 532 which includes a Food property that is instantiated during the call and is represented as a node in the KTG. In this example, Food contains Chicken Wings 544 and Pizza 545 concepts which are also represented conceptually as data objects in KTG nodes. Chicken Wings have Spiciness 552 properties that must be instantiated and obtained from caller during the call. For Pizza orders, AVIA must obtain what Toppings 553 the caller wants as Toppings (e.g. mushrooms, sausage, and pepperoni) are instantiated properties of Pizza concepts that appear as data fields or slots under Pizza ontology concepts in the KTG nodes. If a caller asks what toppings the Pizza Restaurant such as Corner Pizza has, AVIA will be able to email or SMS a menu link to the caller or provide them via speech response output to the caller as the case may be (e.g. AVIA will ask the caller if they would like the menu URL emailed to them).

From Toppings, the dialog state may transition to Pizza Size 558, (e.g. small, medium, or large), which in turn may transition to Drink 560 (e.g. lemonade, root beer, Coca-Cola.) As with the Take Reservation Action which contain direct transitions to certain properties, Pizza has direct transitions to Toppings, Size, and Drink such that VIA can obtain the data for these properties directly without having to go in a pre-determined transition state like current IVR systems.

Figure 5B:
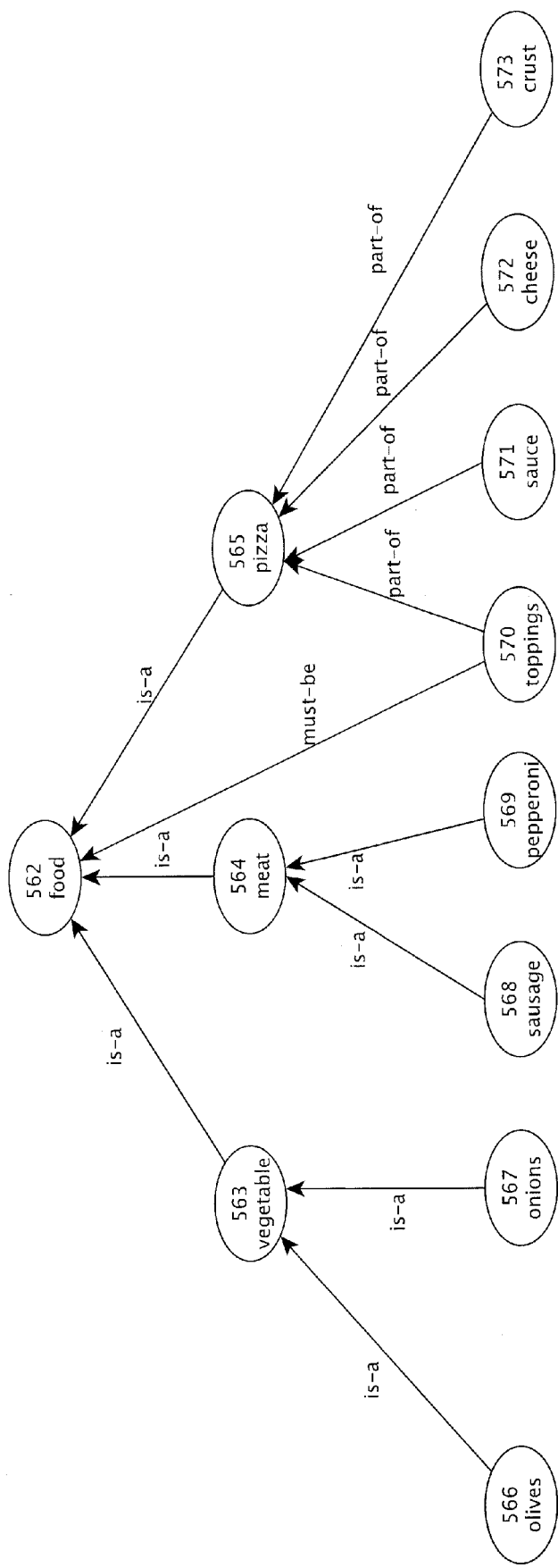
FIG. 5B schematically depicts a pizza ontology graph, according to one or more embodiments shown and described herein.

FIG. 5B is an ontology graph for pizza showing the relationships and associations between parent and child nodes. At the root parent concept node is food shown in 562. At the second level of the graph, there are concept nodes for vegetables 563, meats, 564, and pizza 565, which have an "is-a" relationship with their parent node "food" given that they all are types of food. In the third layer, olives 566 and onions 567 have an "is-a" relationship to their parent node vegetable 563 and in turn are food since a vegetable is a food. The "sausage" 568 and pepperoni 569 nodes have an "is-a" relationship to their parent node "meat" in 564 as sausage is a meat and pepperoni is a meat.

The "toppings" node 570 has a "must-be" relationship to food 562 and "part-of" relationship to pizza 565. The "sauce" 571 node has a "part-of" relationship to "pizza" 565 as sauce is a part of pizza. Likewise, the "cheese" 572 and "crust" 573 (concept nodes) have a "part-of" relationship to "pizza" 565 as both cheese and crust are parts of a pizza.

The relationships in the pizza ontology graph is a powerful tool for AVIA especially when taking a food order from a customer as AVIA knows how various lexical items (word concepts) are related to other lexical items (word concepts) so that AVIA knows what concepts must be instantiated during the call (along with the relationships) to other concepts in the KTG during a pizza order as well as the properties of those concepts.

Figure 6A:
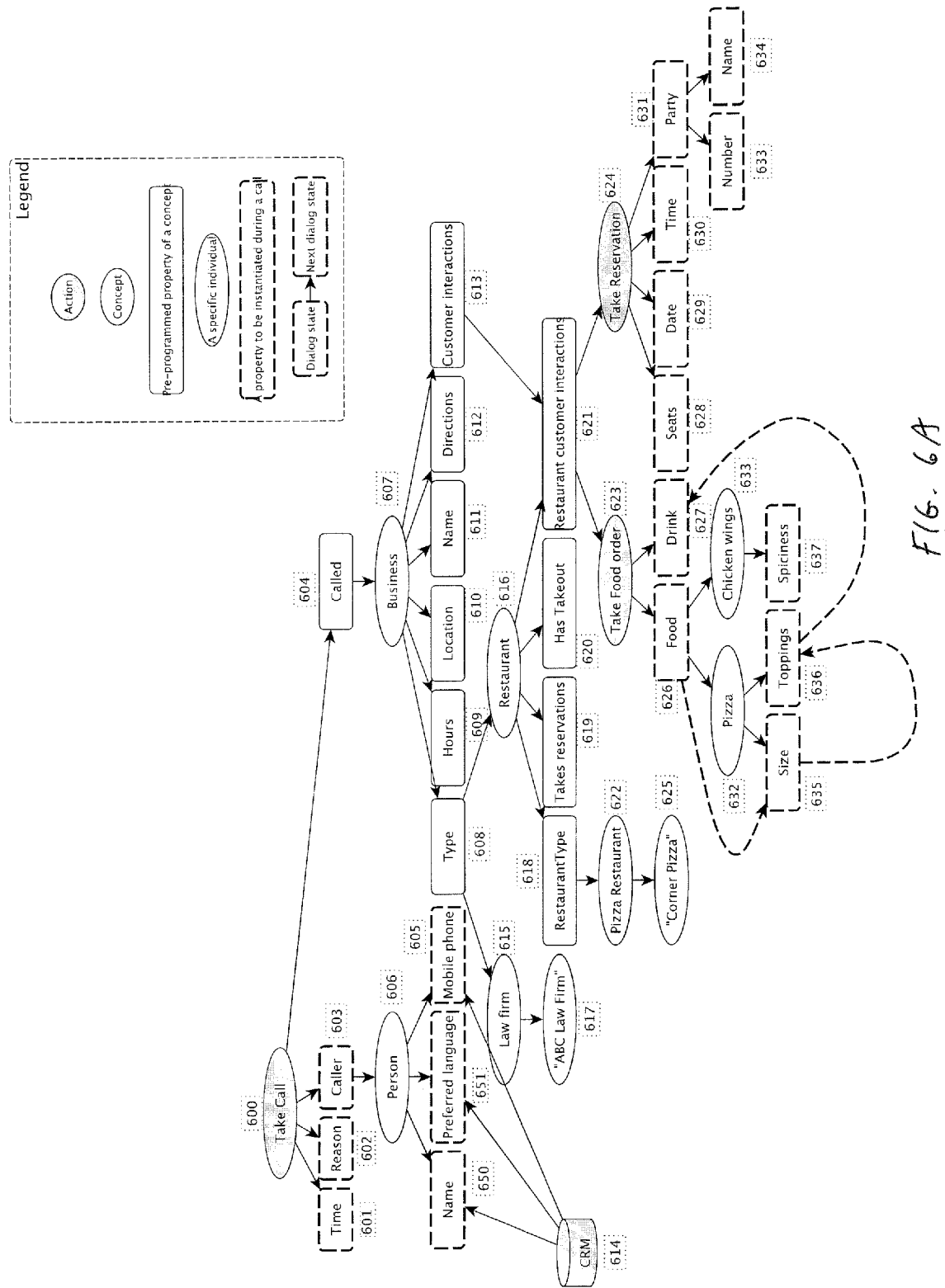
FIG. 6A schematically depicts a knowledge tree graph dialog, according to one or more embodiments shown and described herein.

Referring to FIG. 6A, the ontology concepts are Person 606, Business 607, Law Firm 615, Restaurant 616, Pizza Restaurant 622, Pizza 632, and Chicken Wings 633. The actions are "Take Call" 600, "Take Food Order" 623, and "Take Reservation" 624. The specific individuals or instances of a concept are "ABC Law Firm" 617 and "Corner Pizza" 625. The pre-programmed properties of a concept are 604, 608, 609, 610, 611, 612, 613, 618, 619, 620, and 621. The properties of both concepts and actions to be instantiated during a call are shown in 601, 602, 603, 605, 626, 627, 628, 629, 630, 631, 633, 634, 635, 636, 637, 650, and 651.

FIG. 6A shows a KTG Dialog based on the embodiments described herein. AVIA receives an incoming call from a caller and therefore the process of customer interaction begins by an action to Take Call shown in 600. The Take Call action has the following properties that are instantiated during the call, Time 601, Reason for Call 602, and Caller Identity 603. Thus, in order for AVIA to take the call it needs to determine the time, reason/purpose of the call, and caller id. In addition, the Take Call 600 action has a pre-programmed property Called 604. A Caller property has a relationship with a KTG Person ontology concept, shown in oval 606, which in turn has the properties (instantiated during the call) Name 650, Preferred Language 651, and Mobile Phone 605. These properties are stored and mapped to a customer relationship management (CRM) database as shown in 614.

A Called 604 property of the Take Call 600 action is related to the Business 607 concept as a Call is made to a Business. A Business has the pre-programmed properties of Type 608, Hours 609, Location 610, Name 611, Directions 612, and Customer interactions 613. In other words, the data fields or slots for these properties are entered by the business into the related business template for AVIA when implementing and setting up AVIA prior to use by callers. In this diagram, the Type property can be a Law firm 615 or a Restaurant 616. ABC Law Firm 617 is a specific individual law firm and possesses all the properties that all Law firm businesses would have in addition to any pre-defined properties specific to just ABC Law Firm.

Each Business Type will have a suitable template that contains business properties that are specific to the business using AVIA. In this case, the Law firm would have a law firm template containing concepts, actions, and properties related to law firms and a Restaurant would have a restaurant template containing concepts, actions, and properties related to restaurants. A Restaurant has pre-programmed properties of Restaurant Type 618, Takes Reservations 619, Has Takeout 620, and Restaurant customer interactions 621. Restaurant customer interaction 621 is a pre-programmed sub-property of Customer interactions 613 and property of the Restaurant 616 concept. The Take Food order 623 action has Food 626 and Drink 627 properties that are instantiated during a call such that for AVIA to Take Food order for the caller, it needs to know what food and/or drink the caller wants to order by asking the caller.

Because AVIA is intelligent, if a caller has called before to place a food order, AVIA will know his food order preferences and be able to ask the caller if they want a specific food and/or drink that they previously ordered. A Food property may be Pizza 632 or Chicken wings 633. Pizza has properties of Size 635 and Toppings 636 that are dynamically instantiated during the call as AVIA must obtain them from the caller. Chicken wings 633 has a Spiciness property 637 that is also instantiated during the call. Conceptually, this means that in the KTG, the nodes containing the foods of Pizza and Chicken wings add data fields or slots for each type: Pizza will have data property fields or slots for size and toppings and chicken wings will have a data property field or slot for spiciness. The Restaurant customer interaction also has a Take Reservation 624 action which has Seats 628, Date 629, Time 630, and Party 631 properties that are instantiated during the call because AVIA only instantiates properties related to actions that it must take which AVIA does not know until after the Caller has Called 604. The Party 631 property of the Take Reservation 624 action has Number 633 and Name (sub-) properties 634 that are also instantiated during the call. Conceptually, this is represented as property fields nested in the Party property field of the Take Reservation action node of the KTG.

In this diagram, if the caller wants to make a food order, then AVIA will prompt the user for what type of food they want, either Pizza 632 and/or Chicken wings 633. If the caller wants Pizza, then AVIA will transition the dialog to query or prompt the caller on the size of the Pizza (e.g. small, medium, or large). After obtaining the size and entering that data in the Size 635 property field of Pizza 632, AVIA then prompts the caller on what Toppings they want (e.g. mushroom, sausage, and/or pineapple). After the Size 635 and Toppings 636 property fields of Pizza are populated/filled, AVIA transitions the dialog state to prompt the user and what Drink they want (e.g. lemonade, root beer, or Pepsi) This transition is shown by the dashed lines from Food 626 to Size 635, then to Toppings 636, and then to Drink 627. It should be noted that the transition states are one possible path that AVIA can take. AVIA is intelligent enough to get the size of the pizza from the user, get the drink details, and then go back to prompt the caller about what toppings they want on their pizza. The reason AVIA can do this is because those are dynamically instantiated fields or slots in the KTG that are required to be filled (e.g. non-empty) before AVIA can complete the Take Food Order 623 action. In other words, AVIA knows what it needs to know to properly process a food order. This ability of AVIA to not be confined to a pre-determined sequence of transition states makes it much more flexible, dynamic, and powerful than current IVR systems.

Figure 6B:
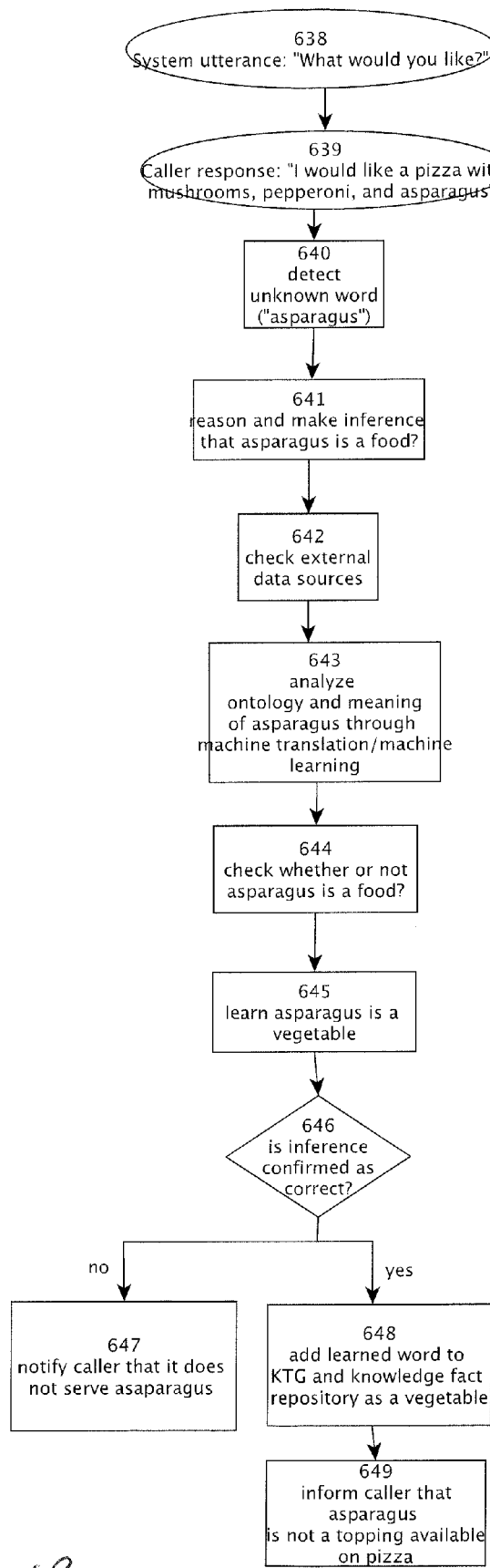
FIG. 6B schematically depicts a flowchart for an adaptive learning process, according to one or more embodiments shown and described herein.

FIG. 6B shows an adaptive learning dialog based on the embodiments described herein. Suppose a caller calls a pizzeria carry out to order a pizza with toppings. AVIA (the system) utters: "What would you like?" in 638. Suppose the caller mentions a topping that AVIA is not familiar with like asparagus such as "I would like a pizza with mushrooms, pepperoni, and asparagus" in 639.

AVIA detects an unknown word in 640 (e.g. asparagus). AVIA will then reason and infer that asparagus is a food as shown in 641 using its reasoning and inference capabilities. That is, it knows that toppings must be food (as shown in block 570 in FIG. 5B). Since AVIA does not know what "asparagus" is, but has inferred it is a food (topping) based on the context of the dialog (the caller orders a pizza with other known toppings), AVIA will check external data sources (e.g. WordNet, Wolfram Alpha, OpenCYC, the Semantic Web, etc.) in 642. Next, AVIA will analyze the definition and meaning of asparagus in 643 through analysis of the information returned from these external data sources. It will then check whether or not asparagus is a food in 644 by comparing its inference that the unknown lexical item (word) "asparagus" is a food with the external data analysis in 643. From the analysis of the word from the external data source, AVIA learns that the unknown word "asparagus" is a vegetable in 645. The analysis may entail searching and examining third-party ontological data structures and applying ontological semantics to transform text into an appropriate conceptual representation whereby AVIA learns that asparagus is a concept of a vegetable which in turn is a concept of food in the ontology hierarchy.

Since AVIA knows that vegetables are a type of food, then it can confirm that "asparagus" is in fact a food as initially inferred. AVIA must then decide whether or not it has successfully confirmed whether or not "asparagus" is confirmed as food as shown in decision node 646. If AVIA cannot confirm that its inference is correct as shown in decision node 646 based the analysis in 643, then it will notify the user that the restaurant does not serve asparagus as shown in 647. If, as in this example, it can confirm that asparagus is a food since it has learned that asparagus is a vegetable (and therefore a food), it will add the learned word "asparagus" to the KTG as a vegetable and store this information for future use in its knowledge fact repository database in 648. It will then inform the caller that it does not serve asparagus as a topping on pizzas as shown in 649. However, since it has learned what "asparagus" is, if another caller requests it, it can tell the caller it does not have asparagus on its menu since it now knows it is a vegetable and it is not on its menu.

Figure 7:
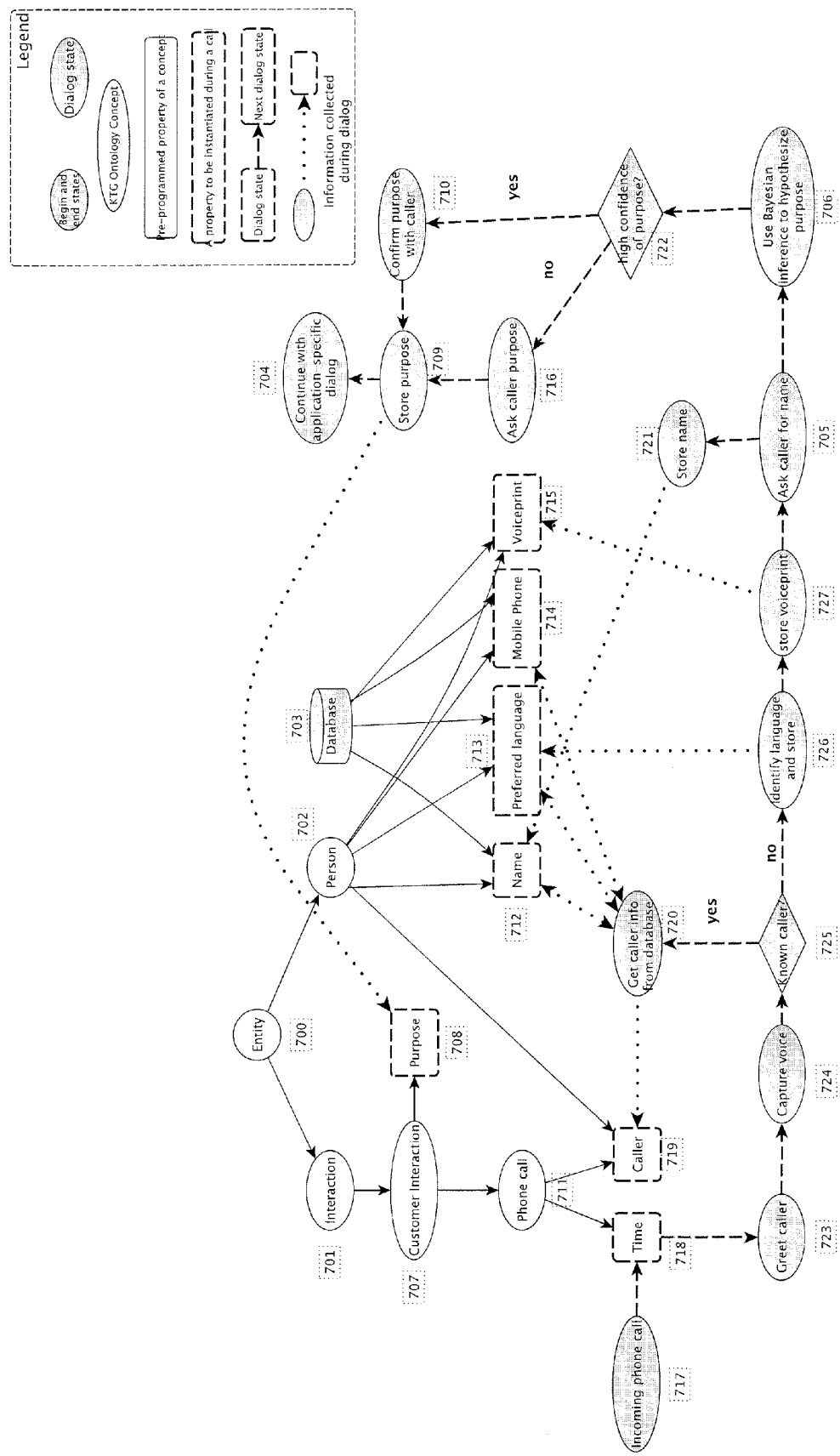
FIG. 7 schematically depicts a flowchart for knowledge tree graph processing, according to one or more embodiments shown and described herein.

FIG. 7 is a diagram of a KTG Dialog Processing flow chart based on the embodiment described herein.

The begin and end states are the Incoming Call (begin state) in 717 and the "Continue with application-specific dialog" (end state) in 704. The ontology concepts include the Entity 700, Interaction 701, Person 702, Customer Interaction 707, and Phone Call 711. The boxes with rounded edges and dashed-line borders are properties to be instantiated during the call (Purpose 708, Time 718, Caller ID 719, Name 712, Preferred Language 713, Mobile Phone 714, and Voiceprint 715). They are also pre-programmed properties of a concept. The remaining oval nodes are dialog states (705, 706, 709, 710, 716, 720, 721, 723, 724, 726, 727) while diamonds are decision states nodes (722, 725).

The initial parent/base ontology concept is a generic Entity concept which has and consists of an Interaction 701 and Person 703 ontology concept. KTG concepts can have properties and/or actions. Interaction and Person have an "is-a" relationship to Entity—both are types of entities. The Interaction 701 concept has a Customer Interaction 707 ontology concept which has Purpose 708 property and a Phone Call 711 concept. A Phone Call is a part of a Customer Interaction which in turn is a type of Interaction. These concepts are related to one other. The Phone Call 711 concept has pre-programmed properties of Time 718 and Caller identity 719.

The dialog process begins with an Incoming phone call 717. The dialog transitions to the Time 718 property whereby AVIA collection information during the dialog to determine the time of the call (metadata about the call). In this case, AVIA can obtain the time from a programmed function that can access the AVIA server's built-in clock or may obtain the time from incoming caller id. Next, AVIA transitions to the Greet caller 723 state. For instance, AVIA might say "Hello, this is the AVIA for ABC Corp. How may I help you?" The dialog transitions to the Capture Voice state in 724 which in turn transitions to the decision node "Known caller?" in 725. AVIA must determine whether or not it recognizes the caller by analyzing the caller's voice print with the voice biometric engine (step 406 in FIG. 4A.) If it recognizes the voice, it transitions to the "Get Caller info from database" state in 720 which in turn transitions to obtain the Caller 719 identity which is a property field of the Phone call 711 and Person 702 ontology concepts. These are represented as nodes in the KTG with edges to other ontology concepts (nodes) in the KTG based on their relationship. Weights are assigned to the edges based on the strength of the relationship between them.

The Person 702 ontology concept has the pre-programmed properties of caller Name 712, Preferred Language 713, Mobile Phone 714, and Voiceprint 715. These properties are stored and maintained in a customer relationship management database 703. The "Get Caller info from database" state in 720 is can retrieve the values of the Name 712, Preferred language 713, and Mobile Phone 714 properties that exist in the CRM database 703 as shown by the dashed lines with arrows on both ends that indicates that AVIA may retrieve information about these properties from the database (from previously instantiated and stored KTGs) since the caller is known.

If AVIA is unable to determine that it is a known caller (e.g. the answer to decision node 725 is no), then AVIA will transition to the dialog state of Identify (caller) language and store 725. During this dialog state, the caller's preferred/spoken language 713 is collected during the dialog and stored in the CRM database 703. The dialog then transitions to the Store voiceprint dialog state 727. At this dialog state, AVIA obtains the voiceprint of the caller in 715 (through biometric voice analysis of the caller's speech) which in turn is stored in the CRM database in 703. The dialog state then transitions to "Ask Caller for Name" 705 state where AVIA collects the caller's Name by prompting the caller for their name and then transitions to the Store name 721 state where the name is filled in the name data field property/slot of the Caller (Person) node in the KTG and then stored in the database 703.

The dialog then transitions to "Use Bayesian inference to hypothesize purpose" (of call) dialog 706 state. This is where AVIA utilizes its Bayesian inference engine to determine the most likely or probable purpose for the call by knowing the type of business called and the type of goods and/or services the business provides and information about the purposes of previous calls. The dialog state transitions next to the decision node 722 state where AVIA must determine whether or not it has a "High confidence of purpose?" If the answer is yes, then the dialog state transitions to the "Confirm purpose with caller" 710 dialog state where AVIA confirms its hypothesis of the purpose with the caller. The dialog then transitions to the "Store purpose" 709 state. AVIA fills in the Purpose 708 data property field/slot of the Customer Interaction 707 concept node in the KTG and stores it in the database 703. If the answer is no, then AVIA will transition to the "Ask caller purpose" 716 state which in turn transitions to the Store Purpose 709 dialog state—the same state that the "Confirm purpose with caller" 710 dialog state transitions to.

Finally, the dialog state transitions to the "Continue with application-specific dialog" 704 end state in which AVIA will continue the dialog with the caller and take the appropriate actions, obtaining the required information needed (either by prompting the caller or obtaining it from third-party data sources as the case may be), and providing responses and information back the caller until AVIA has successfully handled and served the caller's purpose. After completion, the call can be terminated.

Figure 8:
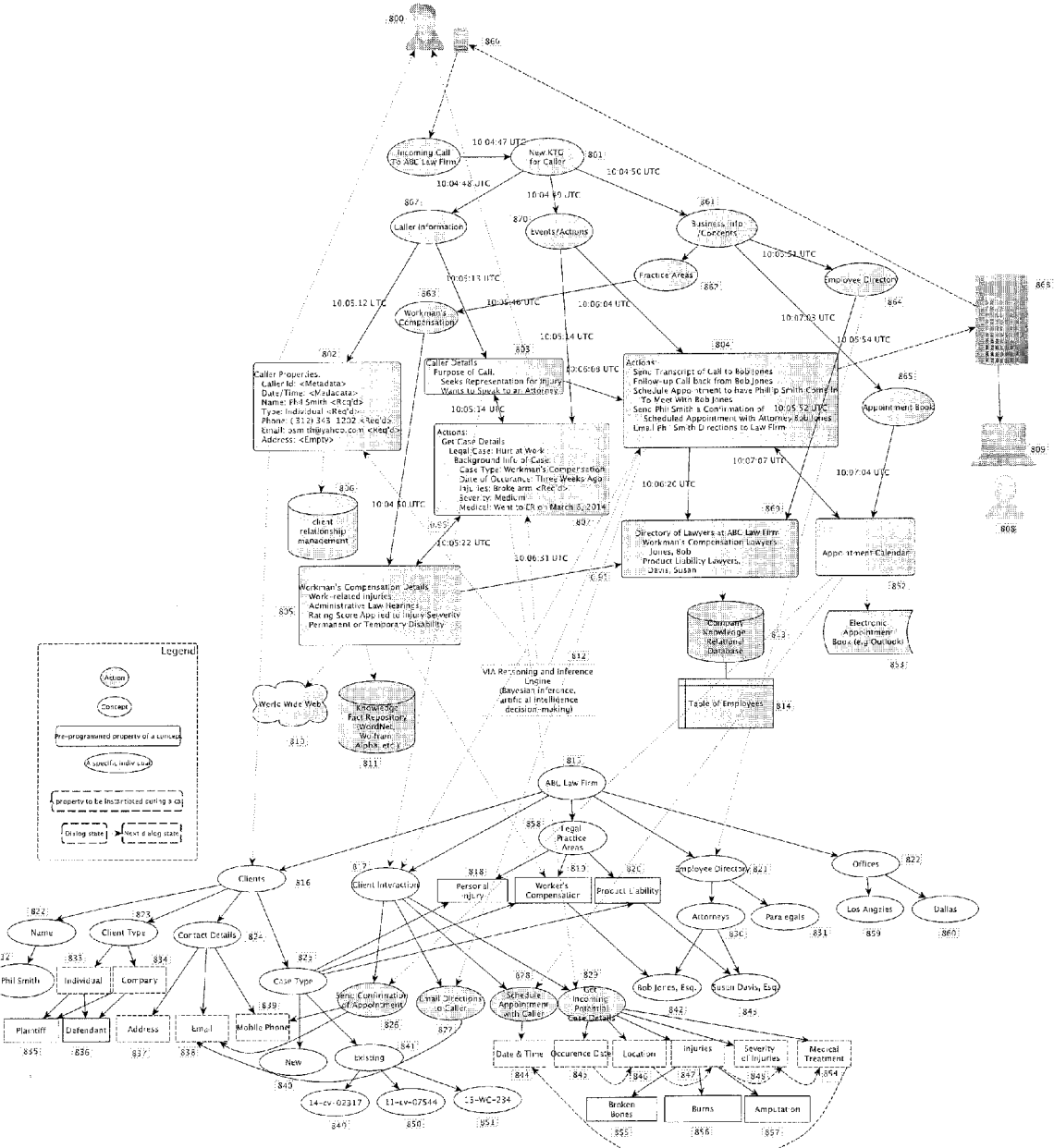
FIG. 8 schematically depicts a mapping between a knowledge tree graph and an KTG template, according to one or more embodiments shown and described herein.

FIG. 8. shows a schematic representation of the mapped relationship between a knowledge tree graph (KTG) and its underlying structured KTG template for ABC law firm (a firm providing legal services) based on the embodiments described herein.

In the KTG template (bottom part of FIG. 8), the KTG ontology concepts are Legal Practice Areas 858, Clients 816, Name 822, Client Type 823, Contact Details 824, Case Type 825, New 840, Existing 841, Employee Directory 821, Attorneys 830, Paralegals 831, and Offices 822. The action nodes are in 826, 827, 828, and 829. The specific individuals (instances of an ontology concept) are in 815, 849, 850, 851, 842, 843, 859, and 860. The pre-programmed properties of a concept include 818, 819, 820, 835, 836, 855, 856, and 857. Properties instantiated during a call (shown as boxes with dashed line borders) include 833, 834, 837, 838, 839, 844, 845, 846, 847, 848, and 854. Possible transitions from one dialog state to another are shown by dashed arrows between properties instantiated during a call (e.g., information that AVIA must get from the caller).

The top part of FIG. 8 shows a graphical representation of the new KTG that is dynamically built in real-time. The lower part is a KTG template (ontology domain) for a law firm. As with KTGs, a node is created for Caller Information 867, Events/Actions 868, and Business Info/Concepts 861. The concepts in the (law firm) KTG template get mapped to the KTG as the dialog progresses with the caller. Business information/concepts that are needed and related to already existing concepts in the domain get instantiated in new nodes in the KTG based on the relationship of these concepts to other concepts and related actions and data properties of such concepts.

In this example, since ABC Law Firm is a law firm providing legal services, the underlying ontological domain is based on actions, properties, and concepts needed to run a law firm such as getting case details and scheduling appointments with clients. Many of these properties are data values that are pre-programmed by ABC Law Firm such as locations and directions of its law offices, employee directories (via interface with its firm database), and legal practices areas. In other words, some of the knowledge that will populate the data fields in the KTG are already known and pre-existing before the caller even calls ABC Law Firm. Unknown data property fields (or slots) are populated during the dialog from either the caller who is prompted for the information (if it is caller-specific information) such as the contact information about the caller and their case details. If the caller is recognized through speaker identification, AVIA may obtain the caller's contact information from the CRM database and not have to prompt the caller for details already known. Previously instantiated KTGs for the caller can be accessed to obtain information and to resume previously stored dialog states. Other information is obtained from company databases, knowledge fact (ontology) repositories, and external data sources as the case may be such as where AVIA is learns a new concept or lexical item obtained during a conversation that is does not know.

The caller, shown in 800, calls ABC law firm in 801 from a mobile phone shown in 866 (but could also call using a landline or voice-over-IP.) In this example, based on the call flow diagram in FIG. 4A, AVIA determines that it is a new caller (that has not called before) and instantiates a new KTG with nodes for caller properties 802, purpose of the call (call information) 803, and action. In this figure, we will assume that the caller is calling ABC Law Firm to discuss their case with an attorney and therefore seeks potential representation. The information is populated in the KTG nodes during the dialog as it becomes known.

The first thing that AVIA will do is acquire the metadata of the call as shown in 802, namely, the caller identification and data/time of the call. AVIA knows that to create a new file for a client, it must know their contact details, e.g., their name, phone number, email and possibly their mailing address. The required fields are shown with <Req'd> next to them in 802. AVIA will prompt the caller for this needed information. Since the information needed for these fields must come from the caller, a dashed line is shown from 802 to the caller in 800. It is important to note that unlike IVR which can only receive data input in a pre-determined sequences of steps, AVIA can obtain this information from the caller dynamically at any point and at different points during the dialog. AVIA must then get information about the caller's case in order to properly assist them and get their case details to the appropriate attorney. AVIA will then store this information in its client/customer relationship management (CRM) database shown in 806.

In this example, we assume that during the dialog that the caller has told AVIA that they have been injured at work and want to speak to an attorney. Consequently, in node 803 of the KTG we see information related to the purpose of the call, e.g. the caller seeks representation for an injury and wants to speak to an attorney about their case. This information is obtained and provided during the dialog by the caller 800 as shown by the dashed line from 803 to 800. Since the caller wants to speak to an attorney, an edge is created from 803 to 804 which contains the action for Bob Jones (the attorney that the caller needs to speak to) to follow-up with a call. AVIA automatically instantiates concepts related to the caller purpose 803 as well as the dialog progresses such as Practice Areas 862, Employee Directory 864, and Appointment Book 865.

The edges between the nodes contain the timestamp of when they were created during the dialog so that AVIA can trace backwards (in time) to maintain context moving forward as the caller speaks, possibly uttering new concepts and lexical items that may or may not be related to what was previously discussed and documented in the KTG.

Using its reasoning and inference capabilities, AVIA will infer that because the caller was injured at work, that they have a workman's compensation case. AVIA knows this two ways: from the pre-programmed law practice properties defined in the law firm template and if necessary, from third-party fact repository data sources (e.g. WordNet, Wolfram Alpha, OpenCyc, etc.) 811 and/or the World Wide Web (e.g. Internet) 810. Schematically, this is shown by a dashed line from box 805, containing factual information about workman's compensation claims, and 819, pre-programmed information that ABC law firm would provide for its legal practice areas. Such pre-programmed information would likely include a descriptive field that workman's compensation claims involve work-related injuries. Box 805 contains various information about the workman's compensation ontology concept, e.g. it entails administrative law hearings, rating scores are applied to injury severity, and a worker may be classified as having a permanent or temporary disability. AVIA will create a Workers Compensation node 863 that is part of Practice Areas 862. The Workers Compensation node is then connected to a Workman's Compensation Details Node 805.

If AVIA did not know this information from pre-programmed information provided by ABC Law Firm into its law firm template containing the law firm ontology domain, then using its adaptive learning capabilities (discussed in the embodiment described herein, AVIA could acquire this knowledge from third-party data sources as show by the dashed lines from box 805 to 810 and 811 and therefore populate data information fields in the Workman's Compensation node 805. There is a solid double arrow (double directed edge) from box 807 to 805 as AVIA can traverse these edges given there is a relationship between the information in the Purpose of Call node and the Workman's Compensation Node. Since AVIA knows that work-related injuries are likely workman's compensation claims, then it will populate the case type in node 807 as a "workman's compensation." It will assign a weight (probability) using Bayesian inference of the relationship (represented by the double edge) between the likely case type given the information provided by the user. In this example, AVIA assigns a weight of 0.95 in real-time (e.g. during the dialog) shown along the solid line edge between 807 and 805 based on the calculated probability via Bayesian inference that the caller has a workman's compensation claim given that he has a work-related injury.

This weight can be dynamically changed up or down as AVIA learns more information. For example, suppose the caller said that he was injured at work by a co-worker that punched him, the weight would go down and another node for battery, an intentional tort, would be created with a higher weight assigned between that node and node 803 because it is possible the caller could have both a workman's compensation against their employer and a battery case against the co-worker that hit him. AVIA can do this because AVIA has "knowledge" of a battery concept from pre-programmed properties of legal practice areas like personal injury (which can encompass injuries such from intentional as well as negligent conduct) as well as from third-party data and ontology sources.

Each KTG node may represent an ontology concept or action(s) with their related or associated property fields/slots. Therefore, the caller details of the purpose of call in 803 (containing details of the purpose of the call) is in different node then the action node to get the caller's case details in 807. Since information might be shared or accessed between both 803 and 807, there is double directed solid edge between both nodes that allows traversal between both nodes.

During the dialog conversation with the caller, AVIA must know what types of injuries the caller has sustained because without damages, the caller does not have a case. Therefore, in this example, the caller has indicated they broke their arm as shown in the "Get Case Details" action node 807. They have also indicated they went to the emergency room on Mar. 8, 2014 and that the date of the accident (occurrence) was three weeks ago. AVIA can reason what "three weeks ago" (from today) is (say, e.g. Feb. 9, 2014) which is essential to know as ABC Law Firm would not take any case whose claims are barred by the statutes of limitations.

There is a dashed line mapping going from KTG node "Caller Details" 803 to KTG template node "Client Interaction" shown as 817 because to get new client/caller details requires a "Client Interaction." The "Client Interaction" node in the KTG template has action nodes "Send Confirmation of Appointment" 826, "Email Directions to Caller" 827, "Schedule Appointment," 828, and "Get Incoming New Potential Case Details" 829. The "Get Incoming New Potential Case Details" action has nodes for "Occurrence Date" 845, "Location" 846, "Injuries" 847, "Severity of Injuries" 848, and "Medical Treatment" 854. The "Injuries" 847 node has the pre-programmed properties of "Broken Bones" 855, "Burns" 856, and "Amputation" 857. AVIA will prompt the caller to obtain the details as they are only known and obtained from the caller during the dialog (as represented by the dashed boxes around the property fields of the "Get Incoming New Potential Case Details" action node 829. The information obtained from the caller for this action node is shown in KTG "Get Case Details" node 807.

In this example, dashed line directed edges go from the KTG template nodes in 845 to 846, from 846 to 847, from 847 to 848, from 848 to 854, and from 854 to 844. This is a possible dialog path showing a transition from one dialog state to another dialog state as AVIA prompts the user for case each detail of the case it needs in the "Get Incoming Potential Case Details" 829 action node. After AVIA obtains this information and other caller details (not shown in the dialog transition states), it would then logically prompt the caller for the Date & Time 844 they would like to schedule an appointment before checking the Appointment Calendar 852 to ensure no conflict.

Since the caller is seeking representation for their work-related injuries, AVIA knows they will need to speak with a lawyer at ABC Law Firm. Consequently, AVIA will instantiate (create) a KTG node for the Directory of Lawyers at ABC Law Firm as shown in 869. Since employee information about firm attorneys is stored and contained in the company knowledge database shown in 813, AVIA knows to acquire this information from this data source which in turn contains a table of employees 814.

This is depicted using the dashed dot directed edge from node 869 to database 813 (which has a solid line to the database table 814.) In this example, since the caller, Phil Smith, likely has a workman's compensation case, he will likely need to speak with a workman's compensation lawyer at the firm. In this case, AVIA assigns a weight (probability) of 0.91 between node 805 and 869 suggesting a very strong relationship that Phil Smith needs to speak with workman's compensation attorney, Bob Jones, given that they have a workman's compensation case.

Moreover, KTG node 805 has a dashed line directed edge mapped to the corresponding the KTG template node "Employee Directory" shown in 821 which contains both "Attorneys" 830 and "Paralegals" 831. In this example, both Bob Jones 842 and Susan Davis 843 are specific individual attorneys at the firm. Bob Jones 842 practices in the workman's compensation area as shown by the directed edge from 819 to 842. Susan Davis practices in the product liability area as shown by the edge from 820 to 843. Thus, the data information retrieved from the company employee database maps specific attorneys in the ontology graph to their respective practice areas (pre-programmed properties of Legal Practice Areas).

Since AVIA has determined that the caller likely needs to speak and meet with Bob Jones, AVIA will help set up an appointment with him. This is shown as an action item to be performed by AVIA in KTG node 804 based on the mapping to the "Client Interaction" 817 node in the KTG template containing the "Schedule Appointment with Caller" 828 action node. Consequently, AVIA will instantiate the Appointment Calendar KTG node shown in 852 which maps to the action "Schedule Appointment with Caller" 828 in the KTG template as shown by the dashed edge from 852 to 828. There is a double directed edge between 852 and 804 because information flows between both KTG nodes. In order to schedule an appointment, the appointment calendar node 852 must be added to the KTG (via the edge from 804 to 852). The appointment calendar can book and retrieve existing scheduled appointments from the electronic appointment book (e.g. Microsoft Outlook) shown in 853.

In order to book this appointment, AVIA knows that it will need to prompt the caller for the date and time they would like to come to ABC Law Firm to meet with Bob Jones given that the Date & Time property fields/slots, shown in 844, are needed to schedule an appointment. AVIA will then determine if the requested date and time meeting does not conflict with other scheduled appointments in the electronic appointment book. If it does, AVIA will propose other dates and times to the caller (not shown.) Once an appointment is acceptable to the caller, AVIA will book the appointment in the electronic appointment book so that that date and time (with Bob Jones) is no longer available for future appointments with Bob Jones. Note it is possible that the same date and time could be available for another attorney in another practice area so that AVIA needs to check not only the date and time, but also the attorney's schedule.

Once AVIA determines whether the caller's proposed dates and times will work based on checking the available appointment slots in the electronic appointment book 853, it will provide this information to the caller in the confirmations (both over the phone once the caller accepts the chosen date and time and in the email or SMS confirmations sent from the AVIA email/SMS server 868) If there is a conflict with the caller's proposed dates and times, AVIA will propose available dates and times for the user to select for the caller to choose from. The appointment calendar 852 KTG action node maps to the "Send Confirmation of Appointment" 826 action node in the KTG template as shown by the dashed edges from 852 to 826 and 852 to 828. In addition, the KTG action node 804 maps to the "Email Directions to Caller" 827 action node in the corresponding KTG template as shown by the dotted edge from 804 to 827. In other words, AVIA knows its underlying ontological structure and required property fields (that must be filled in) of the KTG in order to successfully complete the entire client interaction. The ontological structure is pre-defined (but can be modified) based on the template needed for the type of business (e.g. retailers, manufacturers, etc.) and specific requirements of the business using AVIA. For instance, another law firm might need to include different legal practice areas and/or types of client interaction actions into its ontology domain structure that ABC Law Firm might not offer or perform, e.g. tax advisory services and estate planning.

AVIA will also send a confirmation to Phil Smith of the upcoming appointment with Bob Jones and send directions to ABC Law Firms' Office via email or SMS to Phil Smith's mobile phone 866. Property fields required for these actions as shown by the solid directed edges from KTG template action nodes in 826 and 827 to the Email 838 property field (slot) and Mobile Phone 839 property field (slot) of the Contact Details node 824 concept (that are obtained from the caller during the dialog and stored in the CRM database for future use).

AVIA will also email a transcript of the entire call to Bob Jones and notify Bob Jones via email to also call and follow-up with caller Phil Smith about his workman's compensation case as shown in the KTG action node 804. The transcripts and emails are sent from the AVIA email/SMS server shown in 868 (corresponding to 122 in FIG. 1) to Bob Jones laptop computer shown in 809 that Bob Jones 808 will access.

Figure 9A:
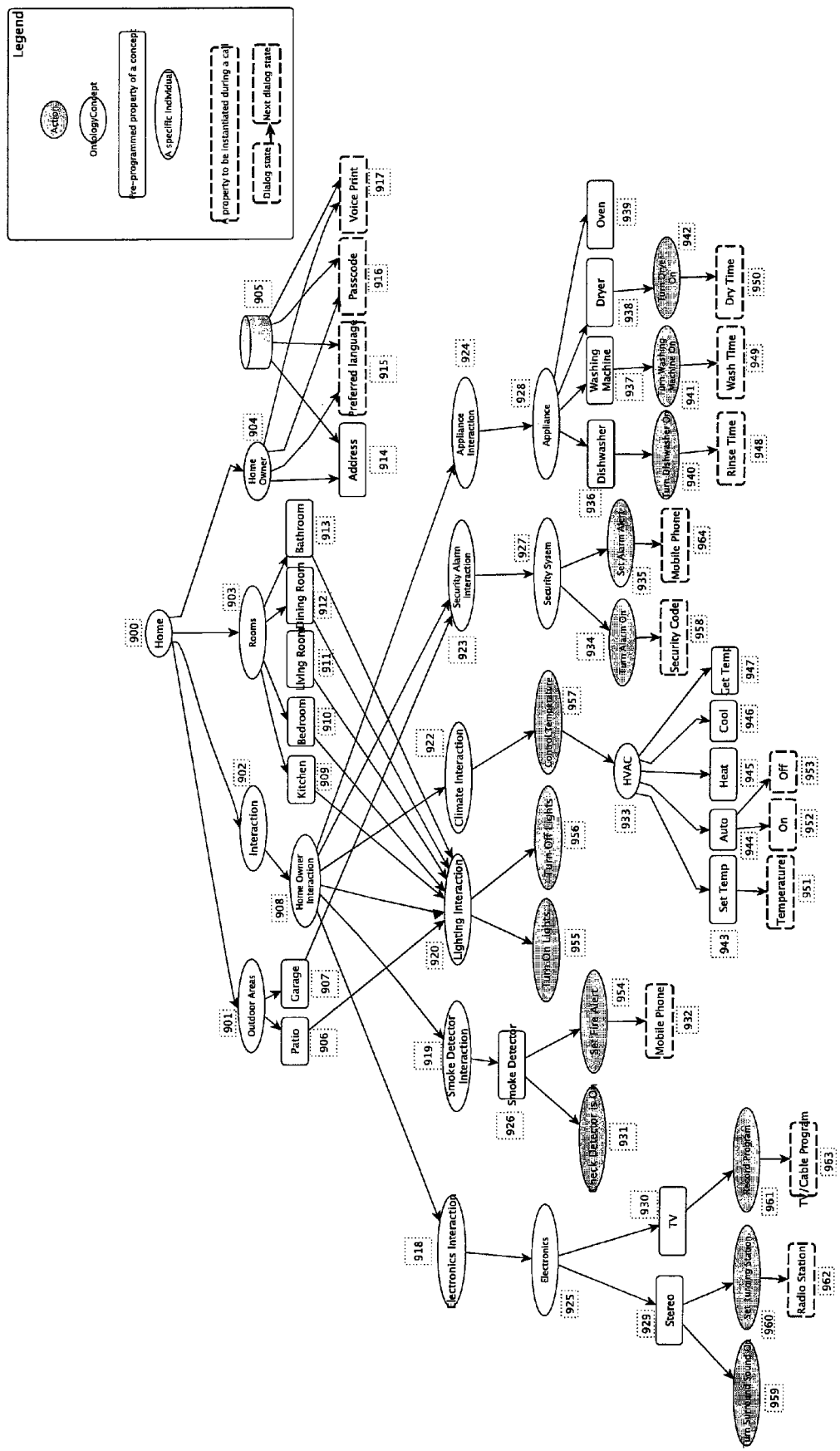
FIG. 9A schematically depicts a home KTG template, according to one or more embodiments shown and described herein.

FIG. 9A shows an AVIA multi-modal home KTG template based on the embodiment described herein. In FIG. 9A, the KTG ontology concepts include the ovals 900, 901, 902, 903, 904, 908, 918, 919, 920, 922, 923, 924, 925, 927, 928, and 933. The actions nodes include the ovals 931, 934, 935, 940, 941, 942, 954, 955, 956, 957, 959, 960, and 961. The boxes with dashed line borders are properties instantiated during a call (915, 916, 917, 932, 948, 949, 950, 951, 952, 953, 958, 962, 963, 964) The boxes with solid line borders are pre-programmed properties of an (ontology) concept (909, 910, 911, 912, 913, 929 930, 936, 937, 938, 939, 943, 944, 945, 946, 947) Arrows (directed edges) from one (parent) item to another (child) item in the home KTG template means that the parent item possesses a "has-a" or "is-a" relationship with the child.

Referring to FIG. 9A, the parent ontological concept in the hierarchy is Home 900 which has a relationship to the ontology concepts Outdoor Areas 901, Interaction 902, Rooms 903, and Home Owner 904. The template shows a possible configuration for how AVIA for Home can be set up as a multi-modal interface for various interactions within the home that can be done remotely through a mobile device, landline, and/or VOIP thereby enabling the home owner/user to control climate, lighting, appliances, etc. AVIA for Home is not restricted to control from within the home, simple voice commands, or pre-determined sequence of dialog steps like existing interactive voice response (IVR) systems, but can handle free-form speech and advanced commands through interactive dialog with the user.

A Home Owner has both pre-programmed properties, Address 914 (because it is static and will likely not change) and dynamically instantiated properties of Preferred Language 915, Passcode 916, and Voice Print 917. The Preferred Language 915 is the language that the owner typically speaks which could be a foreign language that AVIA for Home will understand and be able to converse in. When the home owner calls his AVIA for Home, AVIA will request his passcode and match his voice print to the one stored in the (home) database shown in 905 (analogous to the CRM database used by businesses), which also stores all these properties. For security purposes, the passcode and voice print must match the ones in the database 905 or the home owner/user cannot interact with AVIA for Home. This prevents intruders and impersonators from trying to interact and access the Home features. The Rooms 903 ontology concept has pre-programmed properties of Kitchen 909, Bedroom 910, Living Room 911, Dining Room 912, and Bathroom 913. These rooms can each have a Lighting Interaction as shown in 920 in which the lighting in each of these rooms can be turned on or off through the home owner's dialog interaction with AVIA for Home through the Turn On Lights action 955 and Turn Off Lights action 956. Thus, a Home Owner can interact with AVIA for Home to turn lights on and/or off for different Rooms.

From an implementation perspective, in an embodiment, an electrician might wire at least one switch/circuit for lighting in each Room that interfaces with an AVIA for Home panel in the home so that when the home owner tells AVIA for Home to turn on the lights for specified (one or more) rooms, A/C current (analog) is turned on or off through the switch/circuit to the electrical outlets and ceiling lights in the specified room as the case may be.

A Home Owner Interaction 908 has a Smoke Detector Interaction 919 ontology concept which has a pre-programmed property of Smoke Detector 926 which in turn has "Check Detector is On" 931 action and "Set Fire Alert" 956 action. The Set Fire Alert has a Mobile Phone 932 property which could be pre-programmed, but which may also be dynamically instantiated so that AVIA for Home can prompt the home owner for the mobile phone they want a fire alert sent to via email/SMS.

A Home Owner Interaction 908 has an Electronics Interaction 918 ontology concept which has an Electronics 925 ontology concept having or possessing two pre-programmed properties of Stereo 929 and TV 930. These pre-programmed properties enables the Home Owner to specify the make and model of the stereo and TV. Through infrared repeaters and/or auxiliary cables that connect into the stereo and TV (typically in the back), AVIA for Home (panel) can interface with these electronics. The Stereo 929 has a "Turn Surround Sound On" 959 action and a "Set Turning Station" 960 action which in turn has a Radio Station 962 property to be instantiated during the dialog as AVIA for Home will prompt the home owner for what radio station they want the stereo to be tuned to. Similarly, the TV 930 property of the Electronics 925 ontology concept has a "Record Program" 961 action which in turn has TV/cable Program 963 property that is instantiated during the dialog as AVIA for Home will prompt the home owner for what TV/Cable program they want their TV to record. Such an implementation can be accomplished by interfacing AVIA for Home with a TV that has a cable box like TiVo or another DVR.

In practice, one skilled in the art could place a AVIA for Home panel box in different rooms that interface with the AVIA for Home Server and the various electronic devices. There are various ways in which to implement the interactions including hardwiring and even wireless configurations where AVIA for Home can send data wirelessly to the various devices that can be enabled to receive and respond to them.

The Home Owner Interaction 908 ontology concept has a Climate Interaction 922 ontology concept which in turn has an associated Control Temperature 957 (e.g. thermal control) action. The Control Temperature Action has a (heating ventilation and air conditioning) HVAC 933 ontology concept which in turn has pre-programmed properties of Set Temp 943, Auto 944, Heat 945, Cool 946, and Get Temp 947. The Set Temp property has a Temperature 951 property that is instantiated during the dialog with the home owner. Conceptually, an HVAC node is created in the KTG containing static properties (known before the dialog) and dynamic properties (known by prompting the home owner for the information during the dialog).

The Home Owner Interaction 908 has a Security Alarm Interaction 923 ontology concept that has a Security System 927 ontology concept. The Security System 927 ontology concept has a "Turn Alarm On" 934 action and a "Set Alarm Alert" 935 action. The Security Alarm Interaction 923 allows a home owner to set the alarm of his home by prompting the home owner for a security code 958 during the dialog. The home owner can also "Set Alarm" alerts 935 so that if the alarm does go off, the home owner will be notified on their mobile device 964 via email/SMS message. As with "Set Fire Alert" of the Smoke Detector, the Mobile Phone 964 property information could be pre-programmed or instantiated during a call as shown in the diagram with the dashed-line border.

The Home Owner Interaction 908 also has an Appliance Interaction 924 ontology concept which in turn has an Appliance 928 ontology concept which in turn has Dishwasher 936, Washing Machine 937, Dryer 938, and Oven 939 pre-programmed properties that may include data fields or slots for make and model (not shown.) The Dishwasher has a "Turn Dishwasher On" 940 action that has a Rinse Time 948 property that is instantiated during the dialog between the home owner and AVIA for Home. Similarly, Washing Machine has "Turn Washing Machine On" 941 action that in turn has a "Wash Time" 949 dynamic property obtained during the dialog where the home owner is prompted for how long they want the washing machine to run. The Dryer 938 has a "Turn Dryer On" 942 action that in turn has a "Dry Time" 950 dynamic property obtained during the dialog when the home owner is prompted for how long they want the dryer to run.

The implementation of the AVIA for Home is accomplished by one skilled in the art through appropriate electrical wiring, circuitry, and interfacing with AVIA for Home (liquid crystal display/LED) panels that in turn interface with a centralized AVIA for Home server running the AVIA for Home software. For implementation of the Appliance Interaction, the home owner could utilize appliances that use digital (programmable) and/or sensor controls for being turned on, off, and changing settings and which (through programming) can interface with the AVIA for Home system. One skilled in the art can modify the Home KTG template, adding and removing ontology concepts, properties, and/or actions without changing the underlying innovation embodiments. For instance, for the Security System 927 and/or Lighting Interaction 920 ontology concepts, one could include a "Set Movement Sensor" that causes an alarm to go off or lights to be turned on if movement is detected in the home.

Likewise, one skilled in the art could add a CO (carbon monoxide) interaction that would have a CO detector that in turn could have "Set CO" alert that could be used to send alerts to the home owner if the CO detector alarm goes off due to a detection of CO in the home.

One could include a Telephone Interaction with a Telephone ontology concept for the home owner with KTG actions to forward calls from the home phone to the home owners mobile phone, retrieve missed call numbers, and retrieve voice messages on a home answering machine. Such interactions lie within the spirit and embodiment of a AVIA for home multi-modal interface for enabling he home owner to control the devices in his home remotely in a seamless integrated manner.

One skilled in the art could include a Water Interaction with a Faucet ontology concept with actions to control turning various faucets on or off in the home and possibly even measuring water usage. It is reasonable to believe AVIA for Home can help a home owner cut utility expenses and live in a more efficient and comfortable home.

Implementation of a Water Interaction would likely entail using digital control sensors placed on or near the faucets for turning water on and off via (analogous to faucets that automatically turn on when hands are placed under them) whereby they can receive and respond to (wireless) data signals sent from AVIA from Home panel.

Figure 9B:
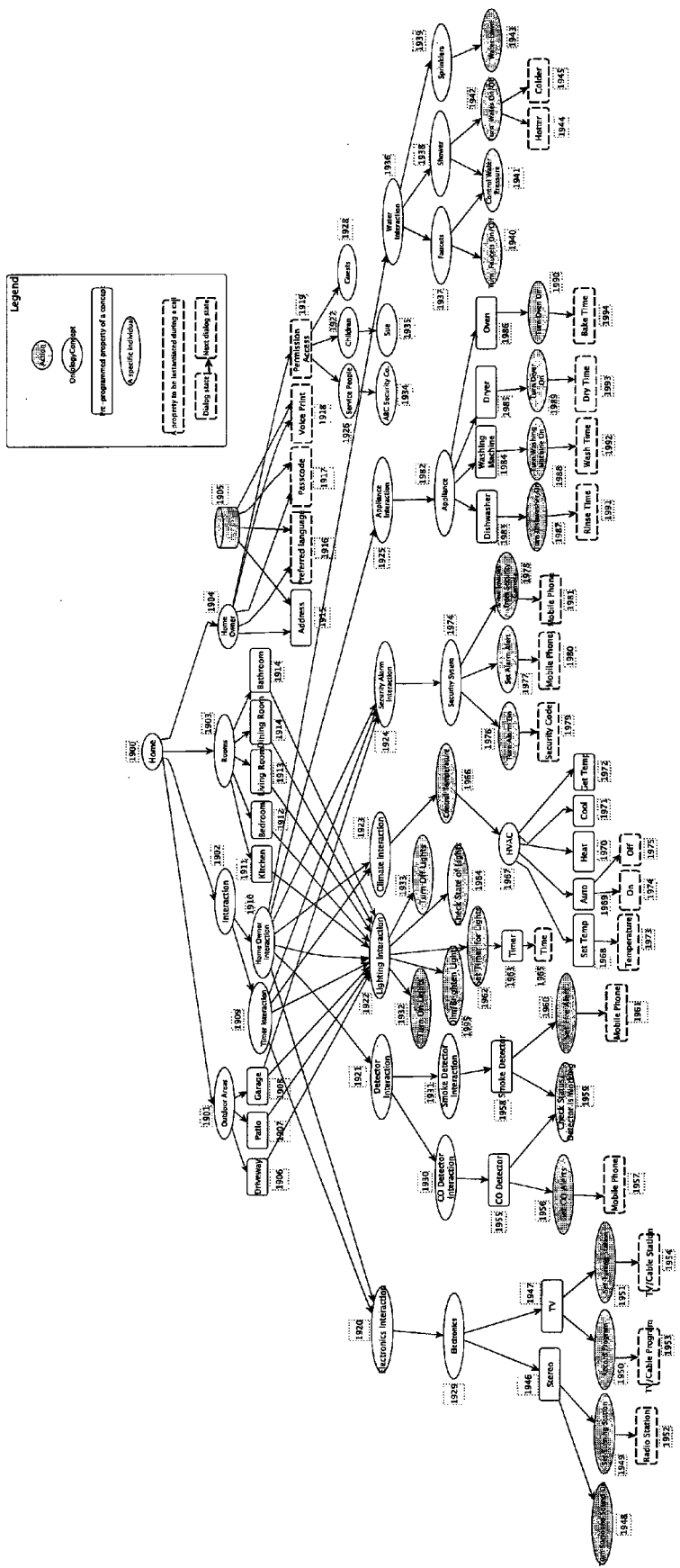
FIG. 9B schematically depicts a detailed home KTG template, according to one or more embodiments shown and described herein.

A more detailed home ontology KTG template incorporating some of these features is included in FIG. 9B. FIG. 9B is a more detailed home KTG template than the one depicted in FIG. 9A. FIG. 9B shows how another home owner can have an ontology domain specific and/or customized to their needs, perhaps more advanced and comprehensive than the one in FIG. 9A. The detailed description of FIG. 9A is fully incorporated herein though the same node label numbers in FIG. 9A are different numbers here.

The ontology concepts are 1900, 1901, 1902, 1903, 1904, 1909, 1910, 1920, 1921, 1922, 1923, 1924, 1925, 1926, 1927, 1928, 1929, 1930, 1931, 1936, 1937, 1938, 1939, 1967, 1974, and 1982.

The actions are 1932, 1933, 1940, 1941, 1942, 1943, 1948, 1949, 1950, 1951, 1956, 1959, 1960, 1962, 1964, 1966, 1976, 1977, 1978, 1987, 1988, 1989, 1990, and 1995.

The specific individuals are 1934 and 1935. The concept properties instantiated during the call are those with dashed-line borders. These are properties whose value has to be obtained from the caller during the dialog. Concept properties that are pre-programmed have solid line borders.

In addition to all the ontology domain details shown for FIG. 9A, FIG. 9B has a Home Owner Interaction 1910 which has a Detector Interaction 1921 which has a Carbon Monoxide (CO) Detector Interaction 1930, which has a carbon monoxide detector 1955 pre-programmed property. The carbon monoxide detector 1955 property has a "Get CO Alerts" 1956 action which has Mobile Phone 1957 property that can be pre-programmed or instantiated during the call. The CO detector property also has a "Check Status/Detector Is Working" 1959 action.

The Home Owner Interaction 1910 concept has a Water Interaction 1936 concept which has Faucets 1937, Shower 1938, and Sprinkler 1939 concepts. The Faucets 1937 concept has a "Turn Faucets On/Off" 1940 action and a "Control Water Pressure" 1941 action. The Shower also has a "Control Water Pressure" 1941 action and a "Turn Water On/Off" 1942 action which has Hotter 1944 and Colder 1945 properties instantiated during the call. In other words, the user can instruct AVIA for Home to make the water hotter or colder. The Sprinklers 1939 concept has a "Water Lawn" 1943 action.

The Security System 1974 has a "View Images from Security Camera" 1978 action and a Mobile Phone 1980 property that may be pre-programmed or instantiated during the call if not pre-programmed.

The Home Owner 1904 has a Permission Access 1919 pre-programmed property which has Service People 1926, Children 1927, and Guests 1928 concepts. The Service People 1926 concept has "ABC Security Co." 1934 as a specific individual type while the Children 1927 concept has "Sue" 1935 as a specific individual type. This structure enables the Home Owner to give access permission to others to use AVIA for Home.

The Interaction 1902 concept has both a Timer Interaction 1909 and Home Owner Interaction 1920 concept which both have Lighting Interaction 1922, Climate Interaction 1923, and Security Alarm Interaction 1924 concepts. The Lighting Interaction 1922 concept has "Turn On Lights" 1932, "Dim/Brighten Lights" 1995, "Set Timer for Lights" 1962, "Turn Off Lights" 1933, and "Check State of Lights" 1964 actions. The "Set Timer for Lights" 1962 action has a Timer 1963 pre-programmed property that has a Time 1965 property instantiated during the call.

The Appliance 1982 concept has an Oven 1986 pre-programmed property which has a "Turn Oven On" 1990 action which has a "Bake Time" 1994 property instantiated during the call.

The Electronics 1929 concept has a TV 1947 pre-programmed property which has a "Set Turning Station" 1951 action, which in turn has a "TV/Cable Station" 1954 property instantiated during the call. One skilled in the art can configure and customize the detailed home KTG template to include different types of interactions, ontology domain concepts, actions, properties, and relationships to increase efficiencies and/or automation needs without changing the spirit of the underlying embodiment described herein.

Figure 10A:
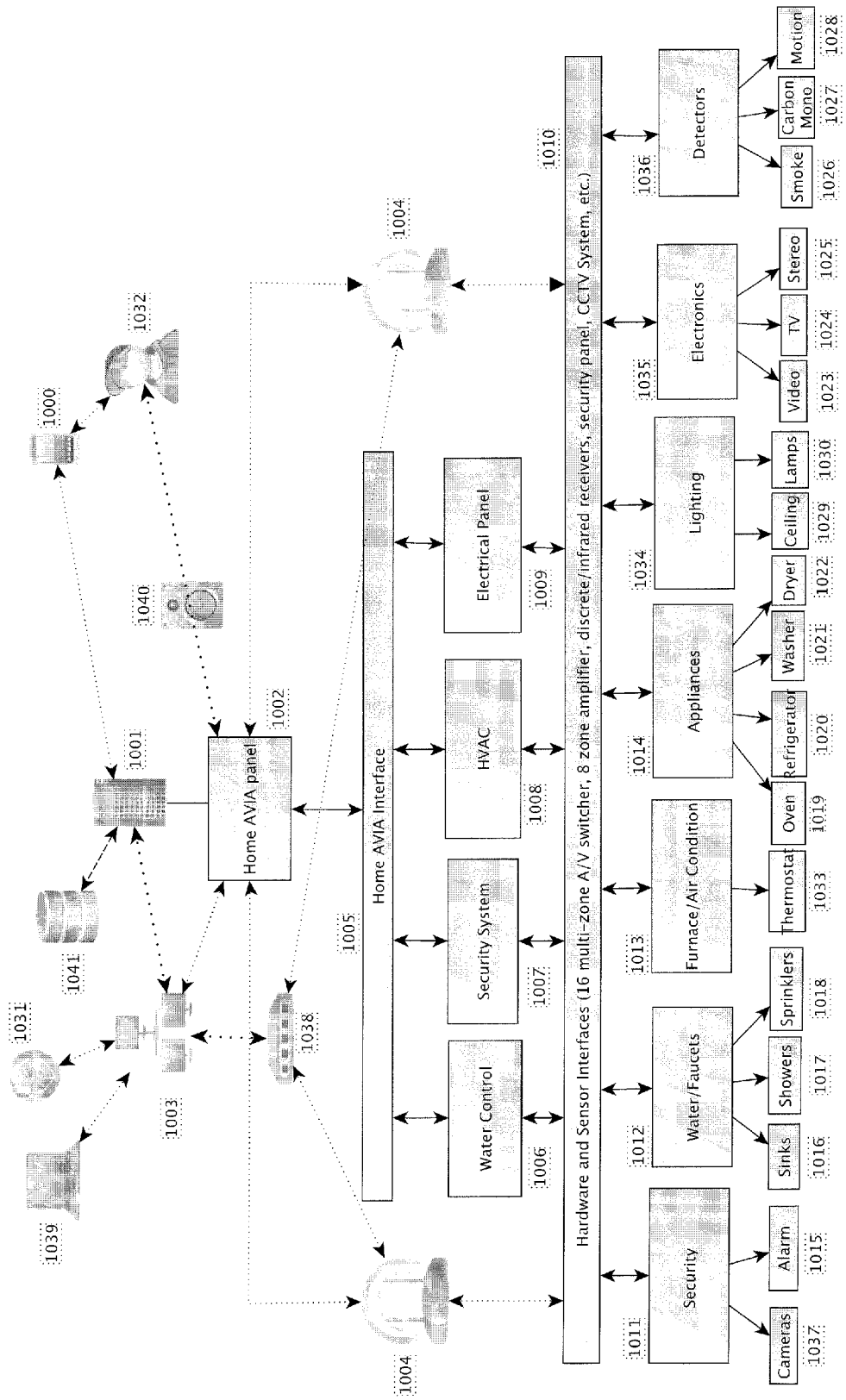
FIG. 10A schematically depicts a system architecture diagram for a home embodiment, according to one or more embodiments shown and described herein.

FIG. 10A shows the AVIA Home Architecture based on the embodiments described herein.

To communicate with Home AVIA remotely, the home owner (or any authorized user) in 1032 calls via cell phone 1000 (or other mobile device, or from a networked computer) to AVIA Home which is the software running on a server 1001 connected to a local area network (LAN) as shown in 1003 and connected to a network storage database as shown in 1041. The LAN is connected to other laptop notebook computers 1039 and the World Wide Web 1031. The LAN is connected to a network switch/router as shown in 1038. If the user wants to change the temperature in the home, they may want to first check how warm it is outside. Thus, AVIA Home can access the local temperatures in the area, for instance, via the Internet in 1031 and notify the user.

If the home owner (or any authorized user) is inside the home, they may communicate with Home VIA by speaking. Their speech input goes through (amplified) audio speaker(s) in 1040. The audio may be transmitted from one room to another via infrared repeaters. The owner basically interfaces and is communicating with the Home AVIA panel in 1002 and may do so throughout the home as long as the speech is loud enough for the speakers to capture and transmit to the microphone connected to AVIA for natural language processing.

The server includes a server operating system, a file system, and a services manager that may include service components such as media library manager, LAN monitoring, user state/preferences (chat, email, location), alerts, announce, server monitoring, contacts manager, Home Definition and a natural language processing (NLP) interface. The natural language processing interface interfaces with the NLP engine incorporated into AVIA as shown in FIG. 1.

To use Home AVIA, the inside of the home will have an AVIA panel as shown in 1002 that will transmit received audio into wireless signals sent to various sensors throughout the home. The Home AVIA panel as shown in 1002 which serves as the front end panel (connected to the server) that the user can use inside the home and which is also connected to the Home AVIA interface 1005 which serves as the connector to all the home systems. The Home AVIA Interface interfaces with the water control system 1006, security system 1007, HVAC 1008, and electrical panel 1009 so that Home AVIA Interface via the Home AVIA panel serves as the front end to access these home systems.

These home systems have hardware and sensor interfaces to control the security 1011, water/faucets 1012, furnace/air condition 1013, appliances 1014, lighting 1035, electronics 1036, and detector components in the home. In particular, the security component controls cameras 1037 and security alarm 1015. The water/faucets 1012 component controls the water pressure to sinks 1016, showers 1017, and sprinklers 1018. The furnace/air condition component controls the thermostat in 1033. The appliances component controls the oven 1019, refrigerator 1020, washer 1021, and dryer 1022. The lighting component controls the ceiling lights 1029 and lamps 1030. The electronics component controls the video 1023, TV 1024, and stereo 1025. The detectors component 1036 controls the smoke 1026, carbon monoxide 1027, and motion 1028 detectors.

The hardware and sensor interfaces as shown in 1010 may include, but are not limited to, 16-multi-zone A/V switchers, 8 zone amplifiers, discrete/infrared repeaters, CCTV System, PBX SMDR, CallerID, OneWire, Projector, driveway sensor, and a security panel (door, window, floor strain gauges, motion sensors, water sensors). In an embodiment, infrared repeaters can be used to transmit remote control signals from one room to another. For instance, if stereo components are in a separate room, then one will need an IR repeater to transmit the infrared signals from one room to another. The hardware and sensor interfaces send and receive wireless signals through wireless access points in the home as shown in 1004 which in turn send and receive signals from and to the Home AVIA panel in 1002. One skilled in the art can configure and wire the various hardware and sensor interfaces required and necessary to interface with AVIA Home Interface and Panel including setting up the wireless access points to send signals that are sent and received by the various devices and appliances in the home via the wireless/infrared receivers.

Intelligent switches can be used to control lighting on/off or fade in/out. The AVIA Home panel can interface with these intelligent switches such as through a CR-Bus Communication protocol (which in turn interfaces with the home's electrical power supply box). Infrared and wireless receivers can control appliances with infrared sensors such as through an RVWSwitch 4-Wire Twisted Pair Cable.

The local area network switch/router in 1038 is also connected to the wireless access points 1004 to route data information to the appropriate hardware and sensor interfaces. For instance, if a user says "dim the lights in the living room," AVIA will understand that the user wants the lights turned down in the living room. Therefore, the signal will be transmitted to the closest wireless access point to the living room which will in turn transmit it the lighting sensor for the living room.

Figure 10B:
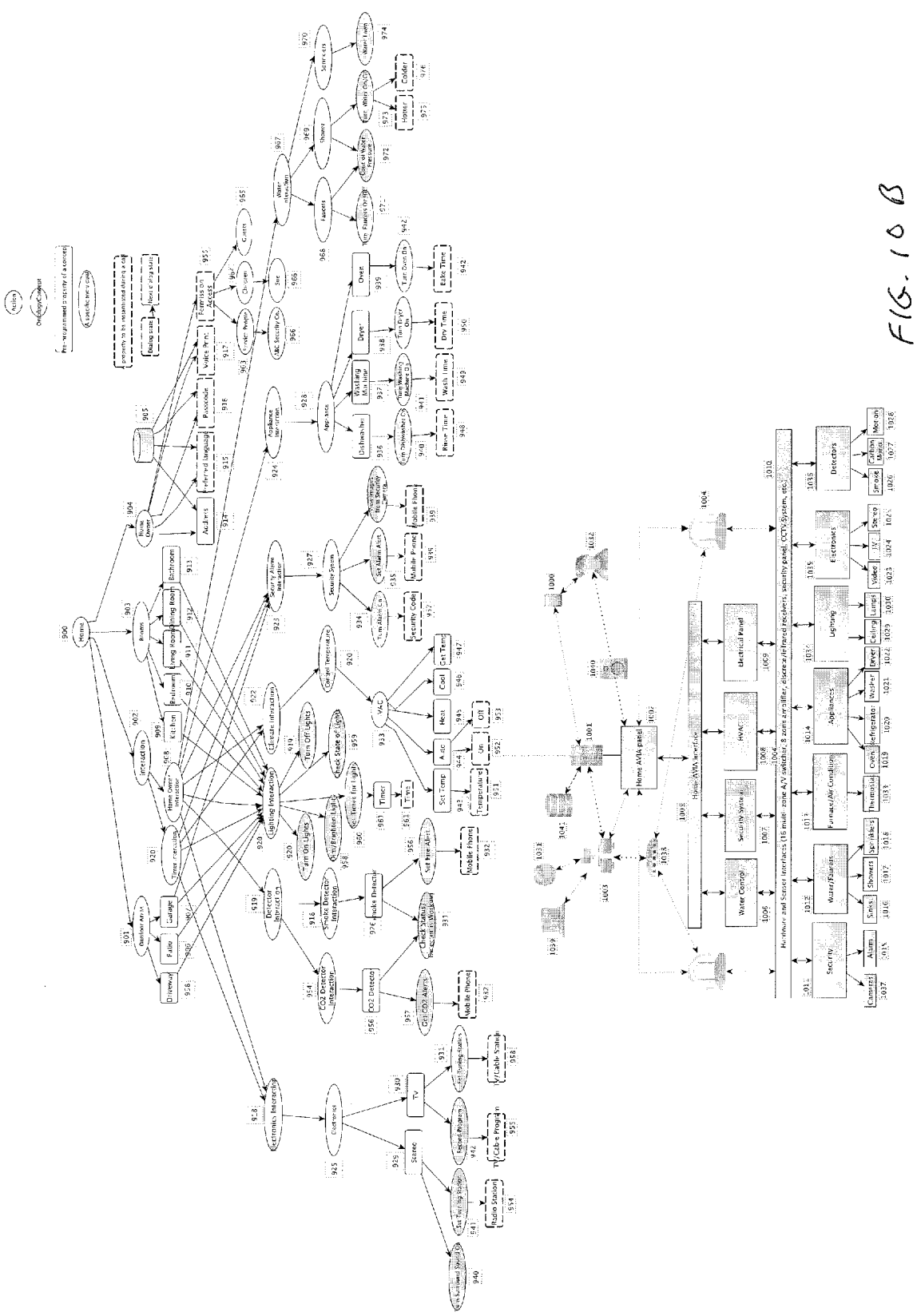
FIG. 10B schematically depicts a home embodiment and a home KTG template, according to one or more embodiment shown and described herein.

FIG. 10B shows the AVIA Home Architecture in FIG. 10A with its underlying Home KTG template in FIG. 9B. The underlying home KTG template runs on the AVIA server and is the underlying foundation of what AVIA uses to build its Home KTG in real-time. The Home KTG action nodes (most of which are instantiated in real-time) map and relate to the appropriate corresponding home KTG template action nodes which in turn interact/communicate with the Home AVIA interface 1005 via the Home AVIA panel 1002.

Figure 11:
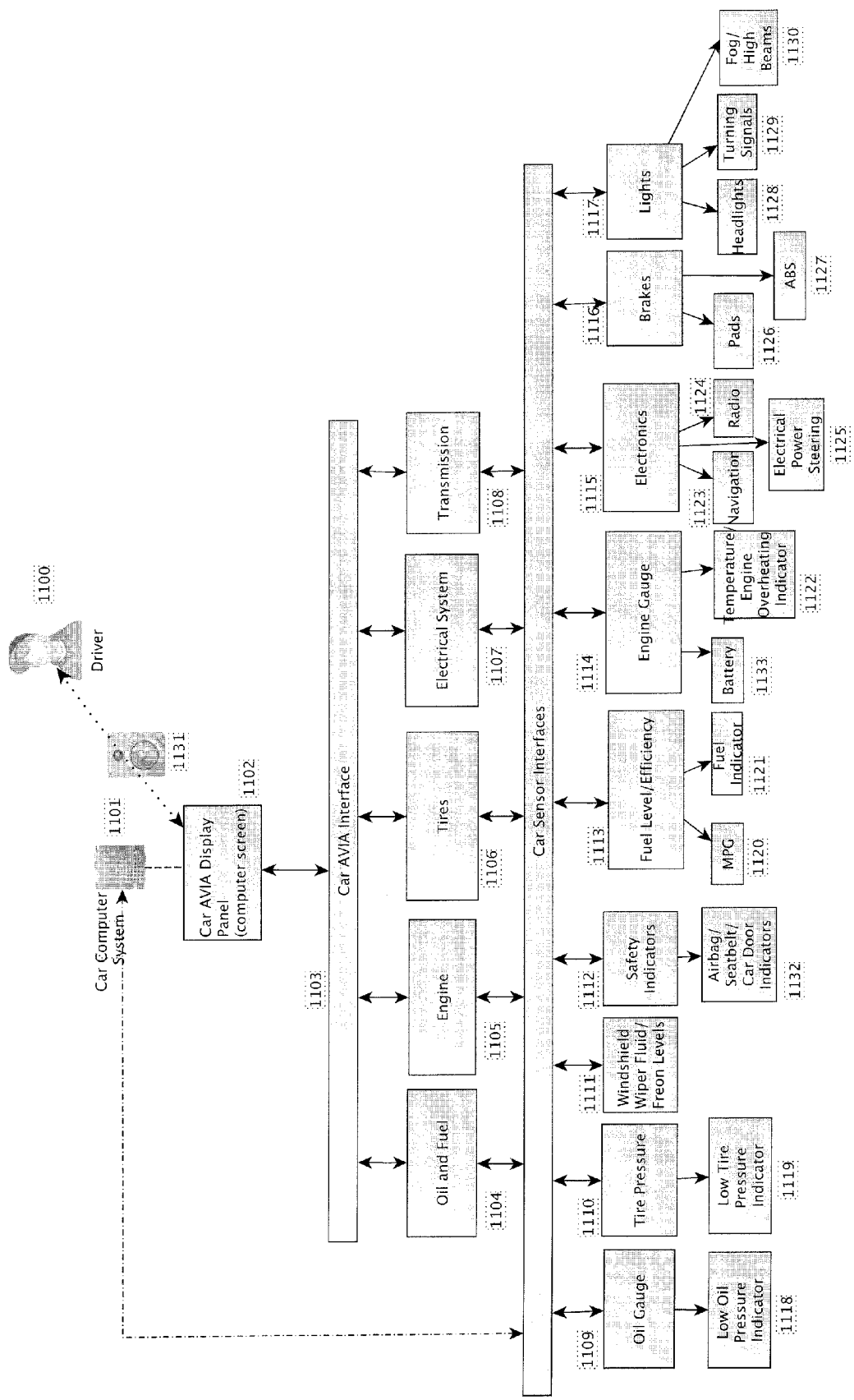
FIG. 11 schematically depicts a system architecture diagram for a car embodiment, according to one or more embodiments shown and described herein.

FIG. 11 is an architecture overview for use of AVIA in cars.

The AVIA software system is installed in the car's computer shown in 1101. It contains the pre-programmed detailed car KTG template (ontology domain) for cars (not shown) that contains all the concepts, properties, and actions needed for Driver Interaction with the Car analogous to the Home AVIA KTG template.

The driver, shown 1100, can interact and have a dialog with the Car AVIA. After pushing a button or saying an attention word (so the Car AVIA may recognize that the driver is not speaking to a passenger), the driver speaks. The speech input is picked up and heard by the car's built-in audio speakers shown in 1131. The conversation is displayed on the Car AVIA Display Panel (computer screen) shown in 1102 (which interfaces with the audio speaker in 1131.) The Car Computer System (and Car AVIA Display Panel) has a Car AVIA Interface shown in 1103 that interfaces with the main car system components, Oil and Fuel 1104, Engine 1105, Tires 1106, Electrical System 1107, and Transmission 1108. The Car AVIA Interface allows information from the car's main system components to be accessed. The car system components in turn have corresponding car sensor interfaces for Oil Gauge 1109, Tire Pressure 1110, Windshield Wiper Fluid/Freon Levels 1111, Safety Indicators 1112, Fuel Efficiency 1113, Engine Gauge 1114, Electronics 1115, Brakes 1116, and Lights 1117. Most, if not all of these, sensor interfaces are already built into the car by the car's manufacturer as shown by the indicator lights on the dashboard panel.

The Oil Gauge 1109 component has a Low Oil Pressure Indicator 1118. The Tire Pressure 1110 component has a Low Tire Pressure Indicator 1119. The Safety Indicators have Airbag/Seatbelt/Car Door Indicators 1132. The Fuel Level/Efficiency component has miles per gallon (MPG) 1120 and a fuel indicator 1121.

The Engine Gauge has a battery 1133 indicator and temperature engine overheating indicator 1122. The Electronics component of the Electrical System has navigation 1123, electrical power steering 1125, and radio (antenna) 1124 indicators that detect that these items are working properly. The Brakes 1116 component may have brake pads 1126 and ABS 1127 indicators. The Lights 1117 component may have headlight 1128, turning signal 1129, and fog/high beam indicators 1130.

The car sensors detect that each of these components is working properly. A driver can interact with their car through free-form conversation. For instance, the driver might ask, "Are all my signal lights working properly?" Car AVIA will check whether they are. Suppose the rear right signal's bulb is burned out. Car AVIA will respond, "No, the rear right signal light is not working."

Since the driver is in close proximity to the Car AVIA Display Panel and speakers, the driver can just speak naturally and the Car AVIA will be able to receive his speech input for processing by pressing a button or using an attention word (e.g. "AVIA (do something)") so that AVIA can tell the difference between speech addressed to it and speech addressed to a passenger. Car AVIA can also automatically alert and speak to the driver (e.g. about issues with the car that arise.)

In addition to the applications described here, the AVIA can also be adapted, configured, and customized for different purposes and solutions including but not limited to advanced intelligent personal assistant for users and employees at companies, for back-office administration, and customer support management. AVIA is also applicable to other uses and fields such as home and business security where AVIA can interact with users based on facial and finger print recognition and thus open and close security doors as they enter and leave a business. AVIA can also be configured and customized to be used internally by employees of the organization who can converse with AVIA and customize it to perform specific tasks needed, manage settings with receiving memos, and/or set AVIA to obtain needed information from callers in the future.

An intelligent voice-controlled home automation system could be built on the AVIA dialog platform, allowing users to control the lighting, entertainment, HVAC, and other home systems through interactive conversational spoken dialogs. AVIA could also be incorporated and applied to handle multimodal control interfaces used in homes by administering and monitoring through infrared receivers, sensors and speech recognition security, heating and cooling, lighting, smoke and carbon monoxide detectors, and so on. Just as the AVIA is based on a KTG ontology of businesses and their properties, a home automation system could be built on a KTG ontology of home systems. AVIA is also applicable to organizations that use product order management and reservation systems. AVIA can be configured to take product and food orders from customers, take and process credit card and payment information, and book restaurant and travel reservations including, but not limited, to application programming interfacing (API) with third-party systems and databases for receiving and sending information. AVIA verifies that orders and reservations are correct, by repeating back such orders and reservations and/or sending email or text message confirmations, to the caller to confirm accuracy, before accepting and processing.

Additional or Alternative Embodiments

Assistant

An adaptive virtual intelligent agent (AVIA) application may perform customer support, relationship management, and (front and back) administrative office functions such as answering the phone, making appointments, sending emails, etc. based on an ordinary telephone interface, similar to the functions performed by a human administrative assistant or customer support agent. Interaction with AVIA is personalized for each user based on capabilities such as automatic recognition of the user's spoken language, and stored information about previous interactions with the user.

Dialog Manager

An intelligent dialog manager (DM), on which a AVIA may be based, may be able to conduct intelligent meaningful spoken or multimodal interactive dialog with users, including dynamic selection of dialog stages depending on an integration of information from the user's utterance along with prior knowledge of the application, the user and the context.

Automatic Learning of Concepts from the Internet

An adaptive learning engine may enable a AVIA to augment its business knowledge repository over time by automatically seeking the meanings of unknown or new concepts referred to by the user accessing resources such as, but not limited to, WordNet, Wolfram Alpha, OpenCyc, the Semantic Web, or the World Wide Web. It can compare information from different knowledge sources and decide on the most likely meaning using statistical techniques such as Bayesian inference. Property slots may be filled probabilistically (for example, using Bayesian inference), if the information required to fill the slot is uncertain.

The embodiments described herein may also be applied to home automation multi-modal devices, vehicles, or many other applications.

CONCLUSION

It is to be understood that the present embodiments are not limited to the illustrated user interfaces, computer machines, databases, etc. described herein which are only intended as example embodiments. Various types and styles may be used in accordance with the present embodiments without limitation. Modifications and variations of the above-described embodiments are possible, as appreciated by those skilled in the art in light of the above teachings. It is therefore to be understood that, within the scope of the appended claims and their equivalents, the embodiments may be practiced otherwise than as specifically described.

The invention claimed is:

1. A system comprising:
a processor;
a memory module communicatively coupled to the processor;
a data structure template stored in the memory module, wherein:
the data structure template is a graph data structure comprising a first plurality of nodes; and
the first plurality of nodes are connected by a first plurality of edges;
machine readable instructions stored in the memory module that cause the system to perform at least the following when executed by the processor:
receive a voice-based input;
in response to receiving the voice-based input, generate a data structure instantiation based on the data structure template, wherein:
the data structure instantiation is a graph data structure comprising a second plurality of nodes; and
the second plurality of nodes are connected by a second plurality of edges;
access the data structure template to determine a prompt to provide to a speaker;
provide the prompt to the speaker;
receive an input in response to providing the prompt to the speaker;
add a node to the data structure instantiation that includes the input, wherein the node added to the data structure instantiation is connected to at least one of the second plurality of nodes by a first edge; and
connect the node added to the data structure instantiation with at least one of the first plurality of nodes of the data structure template by a second edge.

2. The system of claim 1, wherein the machine readable instructions stored in the memory module further cause the system to perform at least the following when executed by the processor:
configure the data structure instantiation based on at least one input received from a speech recognition component or a type of entity associated with the speaker session;
define a relationship between the at least one input received from the speech recognition component and one or more of the second plurality of nodes of the data structure instantiation;
transform the input into structured meaning by processing a natural language expression of the input in order to establish one or more relationships between one or more concepts of the natural language expression, wherein each of the one or more relationships includes a key-value pair, an attribute-value pair, a semantic frame, or a logical form;
trigger a method in the data structure instantiation in response to the input; and
determine a response to be provided to the user based on one or more of the second plurality of nodes of the data structure instantiation.

3. The system of claim 1, further comprising at least one data repository stored in the memory module, wherein the at least one data repository includes a customer-relationship-management (CRM) data repository, a business-specific data repository, and a remotely connected third-party data repository, wherein:
the CRM data repository includes set of user preferences and a set of user data;
the business-specific data repository includes one or more business-knowledge-items, wherein the one or more business-knowledge items include an employee directory, a product list, an inventory list, a pricing list, or a company profile, wherein the company profile includes an hours of operation list and a locations list; and
the machine readable instructions stored in the memory module further cause the system to perform at least the following when executed by the processor:
query the at least one data repository; and
add the node to the data structure instantiation based on the query of the at least one data repository.

4. The system of claim 1, wherein:
the data structure template includes a goods template, a services template, or a combined template;
the goods template includes a store template;
the services template includes a restaurant template, a medical template, a legal template, or an office template;
the combined template includes a hybrid of the goods template and the services template;
the store template includes a set of states for an inquiry and a method to check an item from an inventory stored in the business-specific data repository;
the restaurant template includes a set of states for an order placement and a method to order a menu item from a menu stored in the business-specific data repository;
the medical template includes a set of states about a patient and a method to schedule a medical procedure;
the legal template includes a set of states about a client and a method to determine a type of legal services required and a second method to prompt the client for information regarding the type of legal services required;
the office template includes a set of states about the speaker and a method to schedule an appointment in an electronic appointment book;
the service template includes a set of states about service offerings offered by the business stored in a the business-specific data repository;
existing pre-configured templates can be modified, adapted, tailored, or customized to the specific business using them; and
additional templates can be created.

5. The system of claim 1, wherein the machine readable instructions stored in the memory module further cause the system to perform at least the following when executed by the processor:
process the input using a remotely connected third party data repository or a remote World Wide Web resource to determine at least one synonym for the input when the relationship between the input and the one or more of the second plurality of nodes of the data structure instantiation cannot be determined;

determine if the relationship between the input and the data structure template can be established based on the synonym; and add the input to a list of acceptable responses associated with a specific node of the data structure template or the data structure instantiation.

6. The system of claim 1, wherein the machine readable instructions stored in the memory module further cause the system to perform at least the following when executed by the processor:

determine whether any additional information is required to complete the specific data structure graph instantiation; and iteratively generate a series of prompts to request the additional information from the speaker when it is determined that additional information is required.

7. The system of claim 1, wherein the machine readable instructions stored in the memory module further cause the system to perform at least the following when executed by the processor:

receive the input from the speaker;

determine a language associated with the input;

translate each response provided by the system to the speaker to the language spoken by the speaker before providing the response back to the speaker;

produce a written transcript of a speaker session;

store the written transcript in the CRM data repository associated with the speaker; send the written transcript to the speaker;

send one or more computer machine outputs chosen from the group consisting of confirmations, alerts, uniform resource locator (URL) links, menus, advertisements, and promotions to the speaker;

update a CRM data repository associated with the speaker with each message sent to the speaker;

receive an original input;

match a speaker's voice to a voice data repository; and retrieve a previously created data structure instantiation associated with the speaker's voice from a CRM data repository.

8. The system of claim 7, wherein the system is an interactive voice response system, wherein the machine readable instructions stored in the memory module further cause the system to perform at least the following when executed by the processor:

determine if the input is a data item, command, or a query;

determining whether the speaker is recognized;

if the speaker is not recognized, instantiate the data structure instantiation based on the data structure template;

if the input is a first data item, fill in the first data item in the data structure instantiation;

if the input is a first command, automatically trigger a method associated with a state stored in the data structure instantiation;

determine if the method associated with the first command has a predetermined, sufficient number of required data items filled in on the data structure instantiation to trigger the method; and if the method cannot be executed, select and deliver a prompt from a phrase construct data repository to elicit one or more missing data items prior to triggering the method.

9. The system of claim 1, wherein the system is an interactive voice response system, wherein the machine readable instructions stored in the memory module further cause the system to perform at least the following when executed by the processor:

fill in at least one node in the data structure instantiation with the response;

define a contextual relationship between the response and at least one matched node to the response;

calculate and assign a weight to a relationship between the input and each node to which it is related, wherein a higher weight is assigned to the input if it has either previously occurred or has a high confidence match for contextual relevance to the node with which it is associated.

10. The system of claim 9, wherein the machine readable instructions stored in the memory module further cause the system to perform at least the following when executed by the processor:

analyze a plurality of specific data structure instantiations to determine if the input is more common than other inputs, and if the input is more common, determine if the system responded appropriately; and increase the weight of the relationship between the input and its node if the system responded appropriately; and decrease the weight of the relationship between the at least one input and its node if the system did not respond appropriately.

11. The system of claim 1, wherein:

the first plurality of nodes of the data structure template comprises one or more action nodes, one or more concept nodes, and one or more property nodes;

at least one of the one or more property nodes is a child of at least one of the one or more concept nodes;

the second plurality of nodes of the data structure instantiation includes a speaker information node, an events/actions node, and a business information/concepts node; and the node added to the data structure instantiation is added as a child node of at least one of the speaker information node, the events/actions node, or the business information/concepts node.

12. The system of claim 1, wherein the machine readable instructions stored in the memory module that further cause the system to perform at least the following when executed by the processor:

determine a time that the node was added to the data structure;

associate a timestamp that includes the time with the first edge; and traverse the second plurality of nodes of the data structure instantiation in forward or reverse sequential time order based on a plurality of timestamps to access specific data items or to analyze historical context of the conversation.

13. A system comprising:

a processor;

a memory module communicatively coupled to the processor;

a plurality of data structure templates stored in the memory module, wherein:

each of the plurality of data structure templates is a graph data structure comprising a first plurality of nodes; and the first plurality of nodes are connected by a first plurality of edges;

a plurality of data structure instantiations stored in the memory module, wherein:

each of the plurality of data structure instantiations is a graph data structure comprising a second plurality of nodes; and
the second plurality of nodes are connected by a second plurality of edges;
machine readable instructions stored in the memory module that cause the system to perform at least the following when executed by the processor:
receive an input from a speaker;
determining whether the speaker is recognized;
if the speaker is recognized:
selecting a data structure instantiation from the plurality of data structure instantiations, wherein the selected data structure instantiation was previously associated with the recognized speaker; and
determining a prompt having the highest likelihood of being relevant to the speaker session based on one or more nodes in the selected data structure instantiation; and
if the speaker is not recognized:
determining a type of business associated with the speaker session;
selecting a data structure template of the plurality of data structure templates that is associated with the speaker session; and
determining a prompt having the highest likelihood of being relevant to the speaker session based on one or more nodes in the plurality of data structure instantiations.

14. The system of claim 13, wherein the machine readable instructions stored in the memory module further cause the system to perform at least the following when executed by the processor:
determine a language associated with the input; and
translate subsequent input into a system default language when the determined language is not the system default language; and
translate output from the system to the determined language when the determined language is not the system default language.

15. The system of claim 14, wherein the machine readable instructions stored in the memory module further cause the system to perform at least the following when executed by the processor:
perform historical context analysis to calculate if other speakers are speaking with regard to a specific reason by analyzing the plurality of data structure instantiations, across a plurality of speakers, for a defined period of time, and if a predetermined threshold is reached increase a weight, associated with a node corresponding to that specific reason in at least one of the plurality of data structure instantiations.

16. A method of interactively responding to voice comprising:
receiving a voice-based input;
identifying a speaker associated with the voice-based input;
if the speaker is recognized, selecting a first data structure instantiation associated with the speaker from a memory module, wherein the first data structure instantiation includes a first plurality of nodes connected by a first plurality of edges;
if the speaker is not recognized, selecting a data structure template from the memory module, wherein the selected data structure template includes a third plurality of nodes connected by a third plurality of edges, and creating a second data structure instantiation that is associated with the speaker based on the selected data structure template, wherein the second data structure instantiation includes a second plurality of nodes connected by a second plurality of edges;
determining a phrase construct having the highest likelihood of being relevant to the speaker based on analysis of one or more contexts chosen from the first data structure instantiation associated with the speaker or a plurality of other data structure instantiations stored in the memory module; and
prompting the user with the phrase construct.

17. The method of claim 16, further comprising:
if the speaker is not recognized and the second data structure instantiation is created:
adding a first data item from a business-specific data repository to a first node of the second data structure instantiation;
prompting the speaker for a second data item;
receiving the second data item; and
adding the second data item to a second node of the second data structure instantiation.

18. The method of claim 16, further comprising:
receiving a response in response to prompting the user with the phrase construct;
determining whether the response is a data item, a command, or a query;
if the response is a data item, adding the data item to a first node of the data structure instantiation, prompting the speaker for a second data item, receiving a second data item, and adding the second data item to a second node of the data structure instantiation;
if the response is a command, checking the data structure instantiation to determine if a predetermined number of nodes have been filled in to execute the command; and if an insufficient number of nodes have been filled in, iteratively generating additional prompts to complete the data structure instantiation sufficiently to execute the command; and
if the response is a query: checking whether the query is related in context to a dialog; if the query is context-related, checking the data structure instantiation to determine if a node contains a responsive answer; and if there is no responsive answer, generating a responsive prompt.

19. The method of claim 18, further comprising: if any of the responses received are not recognized,
processing an unrecognized response to determine a context and meaning for the unrecognized response;
adding a node to the data structure instantiation and populating the node with the unrecognized response;
evaluating a plurality of data structure instantiations and increasing a weight associated with an added node each time it appears in a data structure instantiation; and
if a given added node reaches a predetermined threshold, adding a prompt to a data repository of phrase constructs.

20. The method of claim 16, wherein processing an unrecognized response includes:
accessing a third party data repository to determine a category or a synonym for the unrecognized response and attempting to find a node associated with the category or the synonym; or
searching one or more data structure instantiations stored in a memory module for a relationship between the unrecognized response and a concept.

21. The method of claim 16, further comprising:
receiving a set of inputs;

associating the set of inputs with one or more of the second plurality of nodes of the second data structure instantiation, wherein the second data structure instantiation is instantiated based upon a home automation template comprising a set of states relating to a set of appliances and a set of commands for controlling the set of appliances, wherein the set of commands comprises temperature adjustment commands, lighting commands, security commands, and appliance commands;

iteratively performing the receiving and associating steps until either a command input is received or the second data structure instantiation is complete; and upon completion of an activity, increasing a weight associated with a setting for an appliance according to a command received for the activity.

\* \* \* \* \*